United States Patent
Zhao et al.

(10) Patent No.: US 12,101,493 B2
(45) Date of Patent: Sep. 24, 2024

(54) ACT RESIDUAL-BASED IMAGE OR VIDEO CODING

(71) Applicant: LG Electronics Inc., Seoul (KR)

(72) Inventors: Jie Zhao, Seoul (KR); Seunghwan Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 123 days.

(21) Appl. No.: 17/795,137

(22) PCT Filed: Jan. 25, 2021

(86) PCT No.: PCT/KR2021/000979
§ 371 (c)(1),
(2) Date: Jul. 25, 2022

(87) PCT Pub. No.: WO2021/150086
PCT Pub. Date: Jul. 29, 2021

(65) Prior Publication Data
US 2023/0103632 A1 Apr. 6, 2023

Related U.S. Application Data

(60) Provisional application No. 62/965,876, filed on Jan. 25, 2020, provisional application No. 63/005,323, filed on Apr. 5, 2020.

(51) Int. Cl.
H04N 19/186 (2014.01)
H04N 19/176 (2014.01)
H04N 19/196 (2014.01)

(52) U.S. Cl.
CPC ......... H04N 19/198 (2014.11); H04N 19/176 (2014.11); H04N 19/186 (2014.11)

(58) Field of Classification Search
CPC .... H04N 19/12; H04N 19/176; H04N 19/186; H04N 19/198
See application file for complete search history.

(56) References Cited

U.S. PATENT DOCUMENTS

| | | | |
|---|---|---|---|
| 2016/0100168 A1* | 4/2016 | Rapaka | H04N 19/186 375/240.03 |
| 2016/0227224 A1* | 8/2016 | Hsieh | H04N 19/96 |
| 2022/0159301 A1* | 5/2022 | Zhang | H04N 19/174 |

FOREIGN PATENT DOCUMENTS

| | | |
|---|---|---|
| KR | 20160024886 | 3/2016 |
| KR | 20160132869 | 11/2016 |
| KR | 20170013274 | 2/2017 |
| KR | 20170056626 | 5/2017 |
| KR | 20170108964 | 9/2017 |
| WO | WO-2016040865 A1 * 3/2016 | ........... H04N 19/103 |

* cited by examiner

Primary Examiner — Md N Haque
(74) Attorney, Agent, or Firm — Fish & Richardson P.C.

(57) ABSTRACT

According to the disclosure of the present document, a residual sample can be derived by applying adaptive color transform (ACT) with respect to a current block on the basis of ACT-associated information, wherein the residual sample is derived by being clipped on the basis of a clipping boundary, wherein the clipping boundary is determined on the basis of a bit depth.

4 Claims, 11 Drawing Sheets

ACT RESIDUAL-BASED IMAGE OR VIDEO CODING

CROSS-REFERENCE TO RELATED APPLICATIONS

This application is a National Stage application under 35 U.S.C. § 371 of International Application No. PCT/KR2021/000979, filed on Jan. 25, 2021, which claims the benefit of U.S. Provisional Application No. 62/965,876, filed on Jan. 25, 2020 and U.S. Provisional Application No. 63/005,323, filed on Apr. 5, 2020. The disclosures of the prior applications are hereby incorporated by reference herein in their entirety.

BACKGROUND OF DISCLOSURE

Field of the Disclosure

The present technology relates to video or image coding, for example, to an adaptive color transform (ACT) residual-based image or video coding technology.

Related Art

The demands for high-resolution and high-quality images and video, such as an ultra high definition (UHD) image and video of 4K or 8K or more, are recently increasing in various fields. As image and video data become high resolution and high quality, the amount of information or the number of bits that is relatively transmitted is increased compared to the existing image and video data. Accordingly, if image data is transmitted using a medium, such as the existing wired or wireless wideband line, or image and video data are stored using the existing storage medium, transmission costs and storage costs are increased.

Furthermore, interests and demands for immersive media, such as virtual reality (VR), artificial reality (AR) content or a hologram, are recently increasing. The broadcasting of an image and video having image characteristics different from those of real images, such as game images, is increasing.

Accordingly, there is a need for a high-efficiency image and video compression technology in order to effectively compress and transmit or store and playback information of high-resolution and high-quality images and video having such various characteristics.

In addition, there have been discussions about an adaptive color transform (ACT) technology to support multiple color space conversions in order to improve compression efficiency and increase subjective/objective visual quality. There is a need for various methods for efficiently applying such a technology and a method for signaling related information.

SUMMARY

This document is to provide a method and apparatus for improving video/image coding efficiency.

This document is also to provide a method and apparatus for efficiently applying ACT in the coding process.

This document is also to provide a method and apparatus for effectively constructing a clipping range for residuals used in the process of applying ACT.

According to an embodiment of the present document, a residual sample can be derived by applying the ACT for the current block based on adaptive color transform (ACT)-related information. The ACT-related information may include information on whether to apply ACT to the current block. For example, based on ACT-related information on applying ACT to the current block, clipping can be performed on the residual sample based on the clipping range, and a modified residual sample can be derived by applying ACT to the clipped residual sample. The clipping range can be determined based on a bit depth.

According to an embodiment of this document, the clipping range may have a value between a maximum value and a minimum value derived based on a value obtained by increasing the bit depth by 1. Alternatively, the clipping range may have a value between a maximum value and a minimum value derived based on a smaller value of a value obtained by increasing the bit depth by 1, and 16. Alternatively, the clipping range may be determined based on a fixed bit depth. Alternatively, the clipping range may be set differently for the luma component and the chroma component.

According to an embodiment of the present document, a video/image decoding method performed by a decoding apparatus is provided. The video/image decoding method may include the method disclosed in the embodiments of this document.

According to an embodiment of the present document, a decoding apparatus for performing video/image decoding is provided. The decoding apparatus may include the method disclosed in the embodiments of this document.

According to an embodiment of the present document, a video/image encoding method performed by an encoding apparatus is provided. The video/image encoding method may include the method disclosed in the embodiments of this document.

According to an embodiment of the present document, an encoding apparatus for performing video/image encoding is provided. The encoding apparatus may include the method disclosed in the embodiments of this document.

According to an embodiment of the present document, a computer-readable digital storage medium storing encoded video/image information generated according to the video/image encoding method disclosed in at least one of the embodiments of this document is provided.

According to an embodiment of the present document, a computer-readable digital storage medium storing encoded information or encoded video/image information causing a decoding apparatus to perform the video/image decoding method disclosed in at least one of the embodiments of this document is provided.

The present document may have various effects. For example, according to an embodiment of the present document, it is possible to improve overall image/video compression efficiency. In addition, according to an embodiment of this document, it is possible to increase coding efficiency and improve subjective/objective visual quality by efficiently applying ACT in the coding process. In addition, according to an embodiment of this document, by effectively constructing a clipping range for the residual used in the process of applying the ACT, it is possible to compensate for the change in the dynamic range of the residual signal before and after color transform, and to minimize the loss of the residual signal.

Effects that can be obtained through a detailed example of the present document are not limited to the effects enumerated above. For example, there may be various technical effects that can be understood or induced by a person having ordinary skill in the related art from the present document. Accordingly, the detailed effects of the present document are not limited to those explicitly stated in the present document,

DESCRIPTION OF EMBODIMENTS

Figure 1:
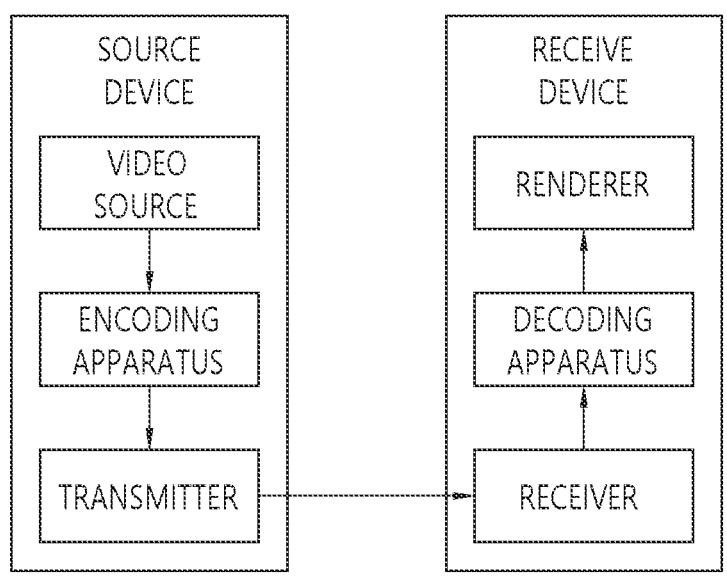
FIG. 1 briefly illustrates an example of a video/image coding device to which embodiments of the present document are applicable.

This document may be modified in various ways and may have various embodiments, and specific embodiments will be illustrated in the drawings and described in detail. However, this does not intend to limit this document to the specific embodiments. Terms commonly used in this specification are used to describe a specific embodiment and is not used to limit the technical spirit of this document. An expression of the singular number includes plural expressions unless evidently expressed otherwise in the context. A term, such as "include" or "have" in this specification, should be understood to indicate the existence of a characteristic, number, step, operation, element, part, or a combination of them described in the specification and not to exclude the existence or the possibility of the addition of one or more other characteristics, numbers, steps, operations, elements, parts or a combination of them.

Meanwhile, elements in the drawings described in this document are independently illustrated for convenience of description related to different characteristic functions. This does not mean that each of the elements is implemented as separate hardware or separate software. For example, at least two of elements may be combined to form a single element, or a single element may be divided into a plurality of elements. An embodiment in which elements are combined and/or separated is also included in the scope of rights of this document unless it deviates from the essence of this document.

In this document, "A or B" may mean "only A", "only B" or "both A and B". In other words, "A or B" in this document may be interpreted as "A and/or B". For example, in this document "A, B or C" means "only A", "only B", "only C", or "any combination of A, B and C".

A slash (/) or comma (,) used in this document may mean "and/or". For example, "A/B" may mean "A and/or B". Accordingly, "A/B" may mean "only A", "only B", or "both A and B". For example, "A, B, C" may mean "A, B, or C".

In this document, "at least one of A and B" may mean "only A", "only B" or "both A and B". Also, in this document, the expression "at least one of A or B" or "at least one of A and/or B" means "at least one It can be interpreted the same as "at least one of A and B".

Also, in this document, "at least one of A, B and C" means "only A", "only B", "only C", or "A, B and C" Any combination of A, B and C". Also, "at least one of A, B or C" or "at least one of A, B and/or C" means may mean "at least one of A, B and C".

Also, parentheses used in this document may mean "for example". Specifically, when "prediction (intra prediction)" is indicated, "intra prediction" may be proposed as an example of "prediction". In other words, "prediction" in this document is not limited to "intra prediction", and "intra prediction" may be proposed as an example of "prediction". Also, even when "prediction (ie, intra prediction)" is indicated, "intra prediction" may be proposed as an example of "prediction".

The present document relates to video/image coding. For example, a method/embodiment disclosed in the present document may be applied to a method disclosed in the versatile video coding (VVC) standard. In addition, a method/embodiment disclosed in the present document may be applied to a method disclosed in the essential video coding (EVC) standard, the AOMedia Video 1 (AV1) standard, the 2nd generation of audio video coding standard (AVS2) or the next generation video/image coding standard (e.g., H.267, H.268, or the like).

The present document suggests various embodiments of video/image coding, and the above embodiments may also be performed in combination with each other unless otherwise specified.

In the present document, a video may refer to a series of images over time. A picture generally refers to the unit representing one image at a particular time frame, and a slice/tile refers to the unit constituting a part of the picture in terms of coding. A slice/tile may include one or more coding tree units (CTUs). One picture may consist of one or more slices/tiles. A tile is a rectangular region of CTUs within a particular tile column and a particular tile row in a picture (A tile is a rectangular region of CTUs within a particular tile column and a particular tile row in a picture). The tile column is a rectangular region of CTUs, which has a height equal to the height of the picture and a width that may be specified by syntax elements in the picture parameter set (The tile column is a rectangular region of CTUs having a height equal to the height of the picture and a width specified by syntax elements in the picture parameter set). The tile row is a rectangular region of CTUs, which has a width specified by syntax elements in the picture parameter set and a height that may be equal to the height of the picture (The tile row is a rectangular region of CTUs having a height specified by syntax elements in the picture parameter set and a width equal to the width of the picture). A tile scan may represent a specific sequential ordering of CTUs partitioning a picture, and the CTUs may be ordered consecutively in a CTU raster scan in a tile, and tiles in a picture may be ordered consecutively in a raster scan of the tiles of the picture (A tile scan is a specific sequential ordering of CTUs partitioning a picture in which the CTUs are ordered consecutively in CTU raster scan in a tile whereas tiles in a picture are ordered consecutively in a raster scan of the tiles of the picture). A slice includes an integer number of complete tiles or an integer number of consecutive complete CTU rows within a tile of a picture that may be exclusively contained in a single NAL unit Meanwhile, one picture may be divided into two or more subpictures. A subpicture may be a rectangular region of one or more slices within a picture.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component.

A unit may represent a basic unit of image processing. The unit may include at least one of a specific region of the picture and information related to the region. One unit may include one luma block and two chroma (ex. cb, cr) blocks. The unit may be used interchangeably with terms such as block or area in some cases. In a general case, an M×N block may include samples (or sample arrays) or a set (or array) of transform coefficients of M columns and N rows.

Also, in this document, at least one of quantization/dequantization and/or transform/inverse transform may be omitted. When the quantization/dequantization is omitted, the quantized transform coefficient may be referred to as a transform coefficient. When the transform/inverse transform is omitted, transform coefficients may be called coefficients or residual coefficients, or may still be called transform coefficients for the sake of uniformity of expression.

In this document, a quantized transform coefficient and a transform coefficient may be referred to as a transform coefficient and a scaled transform coefficient, respectively. In this case, the residual information may include information about the transform coefficient(s), and the information about the transform coefficient(s) may be signaled through a residual coding syntax. Transform coefficients may be derived based on residual information (or information about transform coefficient(s)), and scaled transform coefficients may be derived through inverse transform (scaling) on the transform coefficients. Residual samples may be derived based on an inverse transform (transform) for the scaled transform coefficients. This may be applied/expressed in other parts of this document as well.

Technical features that are individually described in one drawing in this document may be implemented individually or may be implemented at the same time.

Hereinafter, preferred embodiments of this document are described more specifically with reference to the accompanying drawings. Hereinafter, in the drawings, the same reference numeral is used in the same element, and a redundant description of the same element may be omitted.

FIG. 1 illustrates an example of a video/image coding system to which the embodiments of the present document may be applied.

Referring to FIG. 1, a video/image coding system may include a source device and a reception device. The source device may transmit encoded video/image information or data to the reception device through a digital storage medium or network in the form of a file or streaming.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input video/image. The encoding apparatus may perform a series of procedures such as prediction, transform, and quantization for compaction and coding efficiency. The encoded data (encoded video/image information) may be output in the form of a bitstream.

The transmitter may transmit the encoded video/image information or data output in the form of a bitstream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

Figure 2:
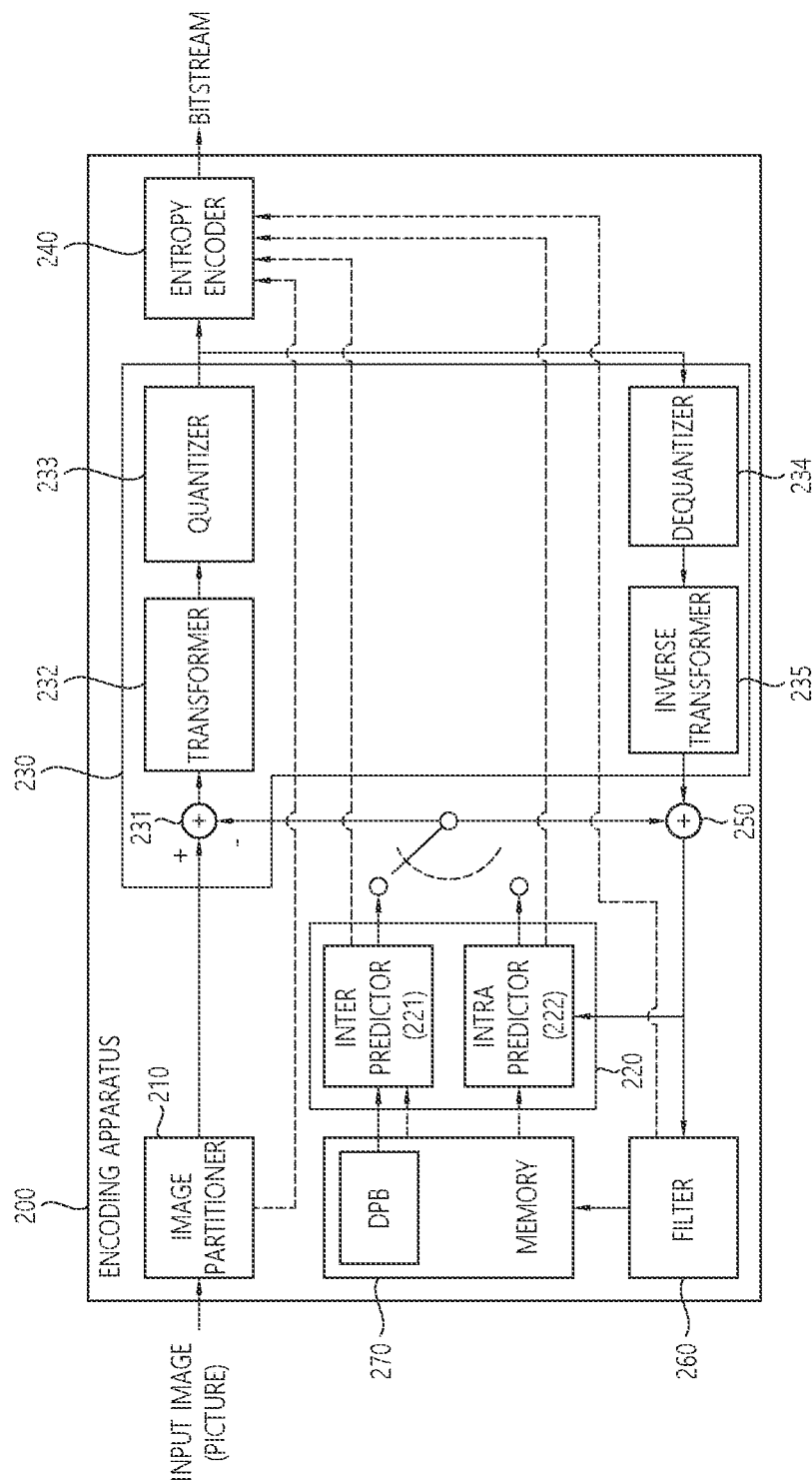
FIG. 2 is a schematic diagram illustrating a configuration of a video/image encoding apparatus to which the embodiment(s) of the present document may be applied.

FIG. 2 is a diagram schematically illustrating a configuration of a video/image encoding apparatus to which the embodiments of the present document may be applied. Hereinafter, what is referred to as the encoding apparatus may include an image encoding apparatus and/or a video encoding apparatus.

Referring to FIG. 2, the encoding apparatus 200 may include and be configured with an image partitioner 210, a predictor 220, a residual processor 230, an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or reconstructed block generator. The image partitioner 210, the predictor 220, the residual processor 230, the entropy encoder 240, the adder 250, and the filter 260, which have been described above, may be configured by one or more hardware components (e.g., encoder chipsets or processors) according to an embodiment. In addition, the memory 270 may include a decoded picture buffer (DPB), and may also be configured by a digital storage medium. The hardware component may further include the memory 270 as an internal/external component.

The image partitioner 210 may split an input image (or, picture, frame) input to the encoding apparatus 200 into one or more processing units. As an example, the processing unit may be called a coding unit (CU). In this case, the coding unit may be recursively split according to a Quad-tree binary-tree ternary-tree (QTBTTT) structure from a coding tree unit (CTU) or the largest coding unit (LCU). For example, one coding unit may be split into a plurality of coding units of a deeper depth based on a quad-tree structure, a binary-tree structure, and/or a ternary-tree structure. In this case, for example, the quad-tree structure is first applied and the binary-tree structure and/or the ternary-tree structure may be later applied. Alternatively, the binary-tree structure may also be first applied. A coding procedure according to the present document may be performed based on a final coding unit which is not split any more. In this case, based on coding efficiency according to image characteristics or the like, the maximum coding unit may be directly used as the final coding unit, or as necessary, the coding unit may be recursively split into coding units of a deeper depth, such that a coding unit having an optimal size may be used as the final coding unit. Here, the coding procedure may include a procedure such as prediction, transform, and reconstruction to be described later. As another example, the processing unit may further include a prediction unit (PU) or a transform unit (TU). In this case, each of the prediction unit and the transform unit may be split or partitioned from the aforementioned final coding unit. The prediction unit may be a unit of sample prediction, and the transform unit may be a unit for inducing a transform coefficient and/or a unit for inducing a residual signal from the transform coefficient.

The unit may be interchangeably used with the term such as a block or an area in some cases. Generally, an M×N block may represent samples composed of M columns and N rows or a group of transform coefficients. The sample may generally represent a pixel or a value of the pixel, and may also represent only the pixel/pixel value of a luma component, and also represent only the pixel/pixel value of a chroma component. The sample may be used as the term corresponding to a pixel or a pel configuring one picture (or image).

The encoding apparatus 200 may generate a residual signal (residual block, residual sample array) by subtracting a predicted signal (predicted block, prediction sample array) output from the inter predictor 221 or the intra predictor 222 from the input image signal (original block, original sample array), and the generated residual signal is transmitted to the transformer 232. In this case, as illustrated, the unit for subtracting the predicted signal (predicted block, prediction sample array) from the input image signal (original block, original sample array) within an encoder 200 may be called the subtractor 231. The predictor may perform prediction for a block to be processed (hereinafter, referred to as a current block), and generate a predicted block including prediction samples of the current block. The predictor may determine whether intra prediction is applied or inter prediction is applied in units of the current block or the CU. The predictor may generate various information about prediction, such as prediction mode information, to transfer the generated information to the entropy encoder 240 as described later in the description of each prediction mode. The information about prediction may be encoded by the entropy encoder 240 to be output in a form of the bitstream.

The intra predictor 222 may predict a current block with reference to samples within a current picture. The referenced samples may be located neighboring to the current block, or may also be located away from the current block according to the prediction mode. The prediction modes in the intra prediction may include a plurality of non-directional modes and a plurality of directional modes. The non-directional mode may include, for example, a DC mode or a planar mode. The directional mode may include, for example, 33 directional prediction modes or 65 directional prediction modes according to the fine degree of the prediction direction. However, this is illustrative and the directional prediction modes which are more or less than the above number may be used according to the setting. The intra predictor 222 may also determine the prediction mode applied to the current block using the prediction mode applied to the neighboring block.

The inter predictor 221 may induce a predicted block of the current block based on a reference block (reference sample array) specified by a motion vector on a reference picture. At this time, in order to decrease the amount of motion information transmitted in the inter prediction mode, the motion information may be predicted in units of a block, a sub-block, or a sample based on the correlation of the motion information between the neighboring block and the current block. The motion information may include a motion vector and a reference picture index. The motion information may further include inter prediction direction (L0 prediction, L1 prediction, Bi prediction, or the like) information. In the case of the inter prediction, the neighboring block may include a spatial neighboring block existing within the current picture and a temporal neighboring block existing in the reference picture. The reference picture including the reference block and the reference picture including the temporal neighboring block may also be the same as each other, and may also be different from each other. The temporal neighboring block may be called the name such as a collocated reference block, a collocated CU (colCU), or the like, and the reference picture including the temporal neighboring block may also be called a collocated picture (colPic). For example, the inter predictor 221 may configure a motion information candidate list based on the neighboring blocks, and generate information indicating what candidate is used to derive the motion vector and/or the reference picture index of the current block. The inter prediction may be performed based on various prediction modes, and for example, in the case of a skip mode and a merge mode, the inter predictor 221 may use the motion information of the neighboring block as the motion information of the current block. In the case of the skip mode, the residual signal may not be transmitted unlike the merge mode. A motion vector prediction (MVP) mode may indicate the motion vector of the current block by using the motion vector of the neighboring block as a motion vector predictor, and signaling a motion vector difference.

The predictor 200 may generate a predicted signal based on various prediction methods to be described later. For example, the predictor may not only apply the intra prediction or the inter prediction for predicting one block, but also simultaneously apply the intra prediction and the inter prediction. This may be called a combined inter and intra prediction (CIIP). Further, the predictor may be based on an intra block copy (IBC) prediction mode, or a palette mode in order to perform prediction on a block. The IBC prediction mode or palette mode may be used for content image/video coding of a game or the like, such as screen content coding (SCC). The IBC basically performs prediction in a current picture, but it may be performed similarly to inter prediction in that it derives a reference block in a current picture. That is, the IBC may use at least one of inter prediction techniques described in the present document. The palette mode may be regarded as an example of intra coding or intra prediction. When the palette mode is applied, a sample value in a picture may be signaled based on information on a palette index and a palette table.

The prediction signal generated by the predictor (including the inter predictor 221 and/or the intra predictor 222) may be used to generate a reconstructed signal or to generate a residual signal. The transformer 232 may generate transform coefficients by applying a transform technique to the residual signal. For example, the transform technique may include at least one of a discrete cosine transform (DCT), a discrete sine transform (DST), a karhunen-loève transform (KLT), a graph-based transform (GBT), or a conditionally non-linear transform (CNT). Here, the GBT means transform obtained from a graph when relationship information between pixels is represented by the graph. The CNT refers to transform generated based on a prediction signal generated using all previously reconstructed pixels. In addition, the transform process may be applied to square pixel blocks having the same size or may be applied to blocks having a variable size rather than square.

The quantizer 233 may quantize the transform coefficients to transmit the quantized transform coefficients to the entropy encoder 240, and the entropy encoder 240 may encode the quantized signal (information about the quantized transform coefficients) to the encoded quantized signal to the bitstream. The information about the quantized transform coefficients may be called residual information. The quantizer 233 may rearrange the quantized transform coefficients having a block form in a one-dimensional vector form based on a coefficient scan order, and also generate the information about the quantized transform coefficients based on the quantized transform coefficients of the one dimensional vector form. The entropy encoder 240 may perform various encoding methods, for example, such as an exponential Golomb coding, a context-adaptive variable length coding (CAVLC), and a context-adaptive binary arithmetic coding (CABAC). The entropy encoder 240 may also encode information (e.g., values of syntax elements and the like) necessary for reconstructing video/image other than the quantized transform coefficients together or separately. The encoded information (e.g., encoded video/image information) may be transmitted or stored in units of network abstraction layer (NAL) unit in a form of the bitstream. The video/image information may further include information about various parameter sets such as an adaptation parameter set (APS), a picture parameter set (PPS), a sequence parameter set (SPS), or a video parameter set (VPS). In addition, the video/image information may further include general constraint information. The signaled/transmitted information and/or syntax elements to be described later in the present document may be encoded through the aforementioned encoding procedure and thus included in the bitstream. The bitstream may be transmitted through a network, or stored in a digital storage medium. Here, the network may include a broadcasting network and/or a communication network, or the like, and the digital storage medium may include various storage media such as USB, SD, CD, DVD, Blue-ray, HDD, and SSD. A transmitter (not illustrated) for transmitting the signal output from the entropy encoder 240 and/or a storage (not illustrated) for storing the signal may be configured as the internal/external elements of the encoding apparatus 200, or the transmitter may also be included in the entropy encoder 240.

The quantized transform coefficients output from the quantizer 233 may be used to generate a predicted signal. For example, the dequantizer 234 and the inverse transformer 235 apply dequantization and inverse transform to the quantized transform coefficients, such that the residual signal (residual block or residual samples) may be reconstructed. The adder 250 adds the reconstructed residual signal to the predicted signal output from the inter predictor 221 or the intra predictor 222, such that the reconstructed signal (reconstructed picture, reconstructed block, reconstructed sample array) may be generated. As in the case where the skip mode is applied, if there is no residual for the block to be processed, the predicted block may be used as the reconstructed block. The adder 250 may be called a reconstructor or a reconstructed block generator. The generated reconstructed signal may be used for the intra prediction of the next block to be processed within the current picture, and as described later, also used for the inter prediction of the next picture through filtering.

Meanwhile, a luma mapping with chroma scaling (LMCS) may also be applied in a picture encoding and/or reconstruction process.

The filter 260 may apply filtering to the reconstructed signal, thereby improving subjective/objective image qualities. For example, the filter 260 may apply various filtering methods to the reconstructed picture to generate a modified reconstructed picture, and store the modified reconstructed picture in the memory 270, specifically, the DPB of the memory 270. Various filtering methods may include, for example, a deblocking filtering, a sample adaptive offset, an adaptive loop filter, a bilateral filter, and the like. The filter 260 may generate various kinds of filtering-related information to transfer the generated information to the entropy encoder 240, as described later in the description of each filtering method. The filtering-related information may be encoded by the entropy encoder 240 to be output in a form of the bitstream.

The modified reconstructed picture transmitted to the memory 270 may be used as the reference picture in the inter predictor 221. If the inter prediction is applied by the inter predictor, the encoding apparatus may avoid the prediction mismatch between the encoding apparatus 200 and the decoding apparatus, and also improve coding efficiency.

The DPB of the memory 270 may store the modified reconstructed picture to be used as the reference picture in the inter predictor 221. The memory 270 may store motion information of the block in which the motion information within the current picture is derived (or encoded) and/or motion information of the blocks within the previously reconstructed picture. The stored motion information may be transferred to the inter predictor 221 to be utilized as motion information of the spatial neighboring block or motion information of the temporal neighboring block. The memory 270 may store the reconstructed samples of the reconstructed blocks within the current picture, and transfer the reconstructed samples to the intra predictor 222.

Figure 3:
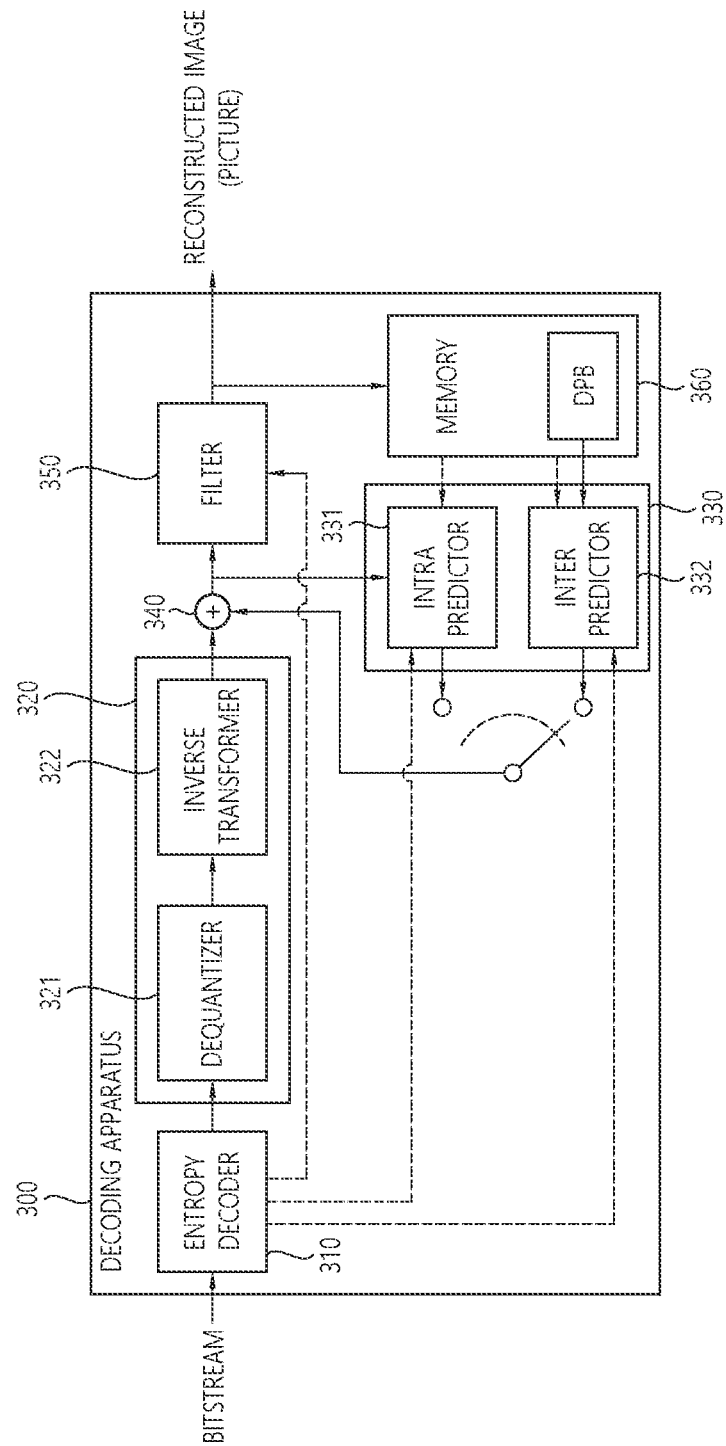
FIG. 3 is a schematic diagram illustrating a configuration of a video/image decoding apparatus to which the embodiment(s) of the present document may be applied.

FIG. 3 is a diagram for schematically explaining a configuration of a video/image decoding apparatus to which the embodiments of the present document may be applied. Hereinafter, what is referred to as the decoding apparatus may include an image decoding apparatus and/or a video decoding apparatus.

Referring to FIG. 3, the decoding apparatus 300 may include and configured with an entropy decoder 310, a residual processor 320, a predictor 330, an adder 340, a filter 350, and a memory 360. The predictor 330 may include an inter predictor 331 and an intra predictor 332. The residual processor 320 may include a dequantizer 321 and an inverse transformer 322. The entropy decoder 310, the residual processor 320, the predictor 330, the adder 340, and the filter 350, which have been described above, may be configured by one or more hardware components (e.g., decoder chipsets or processors) according to an embodiment. Further, the memory 360 may include a decoded picture buffer (DPB), and may be configured by a digital storage medium. The hardware component may further include the memory 360 as an internal/external component.

When the bitstream including the video/image information is input, the decoding apparatus 300 may reconstruct the image in response to a process in which the video/image information is processed in the encoding apparatus illustrated in FIG. 2. For example, the decoding apparatus 300 may derive the units/blocks based on block split-related information acquired from the bitstream. The decoding apparatus 300 may perform decoding using the processing unit applied to the encoding apparatus. Therefore, the processing unit for the decoding may be, for example, a coding unit, and the coding unit may be split according to the quad-tree structure, the binary-tree structure, and/or the ternary-tree structure from the coding tree unit or the maximum coding unit. One or more transform units may be derived from the coding unit. In addition, the reconstructed image signal decoded and output through the decoding apparatus 300 may be reproduced through a reproducing apparatus.

The decoding apparatus 300 may receive the signal output from the encoding apparatus illustrated in FIG. 2 in a form of the bitstream, and the received signal may be decoded through the entropy decoder 310. For example, the entropy decoder 310 may derive information (e.g., video/image information) necessary for the image reconstruction (or picture reconstruction) by parsing the bitstream. The video/image information may further include information about various parameter sets such as an adaptation parameter set (APS), a picture parameter set (PPS), a sequence parameter set (SPS), and a video parameter set (VPS). In addition, the video/image information may further include general constraint information. The decoding apparatus may decode the picture further based on the information about the parameter set and/or the general constraint information. The signaled/received information and/or syntax elements to be described later in the present document may be decoded through the decoding procedure and acquired from the bitstream. For example, the entropy decoder 310 may decode information within the bitstream based on a coding method such as an exponential Golomb coding, a CAVLC, or a CABAC, and output a value of the syntax element necessary for the image reconstruction, and the quantized values of the residual-related transform coefficient. More specifically, the CABAC entropy decoding method may receive a bin corresponding to each syntax element from the bitstream, determine a context model using syntax element information to be decoded and decoding information of the neighboring block and the block to be decoded or information of the symbol/bin decoded in the previous stage, and generate a symbol corresponding to a value of each syntax element by predicting the probability of generation of the bin according to the determined context model to perform the arithmetic decoding of the bin. At this time, the CABAC entropy decoding method may determine the context model and then update the context model using the information of the decoded symbol/bin for a context model of a next symbol/bin. The information about prediction among the information decoded by the entropy decoder 310 may be provided to the predictor (the inter predictor 332 and the intra predictor 331), and a residual value at which the entropy decoding is performed by the entropy decoder 310, that is, the quantized transform coefficients and the related parameter information may be input to the residual processor 320. The residual processor 320 may derive a residual signal (residual block, residual samples, and residual sample array). In addition, the information about filtering among the information decoded by the entropy decoder 310 may be provided to the filter 350. Meanwhile, a receiver (not illustrated) for receiving the signal output from the encoding apparatus may be further configured as the internal/external element of the decoding apparatus 300, or the receiver may also be a component of the entropy decoder 310. Meanwhile, the decoding apparatus according to the present document may be called a video/image/picture decoding apparatus, and the decoding apparatus may also be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and the intra predictor 331.

The dequantizer 321 may dequantize the quantized transform coefficients to output the transform coefficients. The dequantizer 321 may rearrange the quantized transform coefficients in a two-dimensional block form. In this case, the rearrangement may be performed based on a coefficient scan order performed by the encoding apparatus. The dequantizer 321 may perform dequantization for the quantized transform coefficients using a quantization parameter (e.g., quantization step size information), and acquire the transform coefficients.

The inverse transformer 322 inversely transforms the transform coefficients to acquire the residual signal (residual block, residual sample array).

The predictor 330 may perform the prediction of the current block, and generate a predicted block including the prediction samples of the current block. The predictor may determine whether the intra prediction is applied or the inter prediction is applied to the current block based on the information about prediction output from the entropy decoder 310, and determine a specific intra/inter prediction mode.

The predictor may generate the predicted signal based on various prediction methods to be described later. For example, the predictor may not only apply the intra prediction or the inter prediction for the prediction of one block, but also apply the intra prediction and the inter prediction at the same time. This may be called a combined inter and intra prediction (CIIP). Further, the predictor may be based on an intra block copy (IBC) prediction mode, or a palette mode in order to perform prediction on a block. The IBC prediction mode or palette mode may be used for content image/video coding of a game or the like, such as screen content coding (SCC). The IBC basically performs prediction in a current picture, but it may be performed similarly to inter prediction in that it derives a reference block in a current picture. That is, the IBC may use at least one of inter prediction techniques described in the present document. The palette mode may be regarded as an example of intra coding or intra prediction. When the palette mode is applied, information on a palette table and a palette index may be included in the video/image information and signaled.

The intra predictor 331 may predict the current block with reference to the samples within the current picture. The referenced samples may be located neighboring to the current block according to the prediction mode, or may also be located away from the current block. The prediction modes in the intra prediction may include a plurality of non-directional modes and a plurality of directional modes. The intra predictor 331 may also determine the prediction mode applied to the current block using the prediction mode applied to the neighboring block.

The inter predictor 332 may induce the predicted block of the current block based on the reference block (reference sample array) specified by the motion vector on the reference picture. At this time, in order to decrease the amount of the motion information transmitted in the inter prediction mode, the motion information may be predicted in units of a block, a sub-block, or a sample based on the correlation of the motion information between the neighboring block and the current block. The motion information may include a motion vector and a reference picture index. The motion information may further include inter prediction direction (L0 prediction, L1 prediction, Bi prediction, or the like) information. In the case of the inter prediction, the neighboring block may include a spatial neighboring block existing within the current picture and a temporal neighboring block existing in the reference picture. For example, the inter predictor 332 may configure a motion information candidate list based on the neighboring blocks, and derive the motion vector and/or the reference picture index of the current block based on received candidate selection information. The inter prediction may be performed based on various prediction modes, and the information about the prediction may include information indicating the mode of the inter prediction of the current block.

The adder 340 may add the acquired residual signal to the predicted signal (predicted block, prediction sample array) output from the predictor (including the inter predictor 332 and/or the intra predictor 331) to generate the reconstructed signal (reconstructed picture, reconstructed block, reconstructed sample array). As in the case where the skip mode is applied, if there is no residual for the block to be processed, the predicted block may be used as the reconstructed block.

The adder 340 may be called a reconstructor or a reconstructed block generator. The generated reconstructed signal may be used for the intra prediction of a next block to be processed within the current picture, and as described later, may also be output through filtering or may also be used for the inter prediction of a next picture.

Meanwhile, a luma mapping with chroma scaling (LMCS) may also be applied in the picture decoding process.

The filter 350 may apply filtering to the reconstructed signal, thereby improving the subjective/objective image qualities. For example, the filter 350 may apply various filtering methods to the reconstructed picture to generate a modified reconstructed picture, and transmit the modified reconstructed picture to the memory 360, specifically, the DPB of the memory 360. Various filtering methods may include, for example, a deblocking filtering, a sample adaptive offset, an adaptive loop filter, a bidirectional filter, and the like.

The (modified) reconstructed picture stored in the DPB of the memory 360 may be used as the reference picture in the inter predictor 332. The memory 360 may store motion information of the block in which the motion information within the current picture is derived (decoded) and/or motion information of the blocks within the previously reconstructed picture. The stored motion information may be transferred to the inter predictor 260 to be utilized as motion information of the spatial neighboring block or motion information of the temporal neighboring block. The memory 360 may store the reconstructed samples of the reconstructed blocks within the current picture, and transfer the stored reconstructed samples to the intra predictor 331.

In the present document, the exemplary embodiments described in the filter 260, the inter predictor 221, and the intra predictor 222 of the encoding apparatus 200 may be applied equally to or to correspond to the filter 350, the inter predictor 332, and the intra predictor 331 of the decoding apparatus 300, respectively.

As described above, in performing video coding, prediction is performed to improve compression efficiency. Through this, a predicted block including prediction samples for a current block as a block to be coded (i.e., a coding target block) may be generated. Here, the predicted block includes prediction samples in a spatial domain (or pixel domain). The predicted block is derived in the same manner in an encoding apparatus and a decoding apparatus, and the encoding apparatus may signal information (residual information) on residual between the original block and the predicted block, rather than an original sample value of an original block, to the decoding apparatus, thereby increasing image coding efficiency. The decoding apparatus may derive a residual block including residual samples based on the residual information, add the residual block and the predicted block to generate reconstructed blocks including reconstructed samples, and generate a reconstructed picture including the reconstructed blocks.

The residual information may be generated through a transform and quantization procedure. For example, the encoding apparatus may derive a residual block between the original block and the predicted block, perform a transform procedure on residual samples (residual sample array) included in the residual block to derive transform coefficients, perform a quantization procedure on the transform coefficients to derive quantized transform coefficients, and signal related residual information to the decoding apparatus (through a bit stream). Here, the residual information may include value information of the quantized transform coefficients, location information, a transform technique, a transform kernel, a quantization parameter, and the like. The decoding apparatus may perform dequantization/inverse transform procedure based on the residual information and derive residual samples (or residual blocks). The decoding apparatus may generate a reconstructed picture based on the predicted block and the residual block. Also, for reference for inter prediction of a picture afterward, the encoding apparatus may also dequantize/inverse-transform the quantized transform coefficients to derive a residual block and generate a reconstructed picture based thereon.

In general, in video/image coding, a quantization rate may be changed, and compression rate may be adjusted using the changed quantization rate. In terms of implementation, a quantization parameter QP may be used instead of using the quantization rate directly in consideration of complexity. For example, quantization parameters of integer values from 0 to 63 may be used, and each quantization parameter value may correspond to an actual quantization rate. Further, for example, a quantization parameter $QP_Y$ for a luma component (luma sample) and a quantization parameter $QP_C$ for a chroma component (chroma sample) may be set differently.

The quantization process takes a transform coefficient C as an input, divides it by a quantization rate Qstep, and based on this, a quantized transform coefficient C' may be obtained. In this case, under the consideration of computational complexity, a quantization rate may be multiplied by a scale to form an integer, and a shift operation may be performed by a value corresponding to the scale value. A quantization scale may be derived based on the product of the quantization rate and the scale value. That is, the quantization scale may be derived depending on the QP. For example, by applying the quantization scale to the transform coefficient C, a quantized transform coefficient C' may be derived based thereon.

The dequantization process is the inverse process of the quantization process, and may obtain a reconstructed transform coefficient C" based on what is obtained by multiplying the quantized transform coefficient C' by the quantization rate Qstep. In this case, a level scale may be derived depending on the quantization parameter, and a reconstructed transform coefficient C" may be derived based on what is obtained by applying the level scale to the quantized transform coefficient C'. The reconstructed transform coefficient C" may be slightly different from the original transform coefficient C due to loss in the transform and/or quantization process. Therefore, the encoding apparatus performs dequantization in the same manner as in the decoding apparatus.

Figure 4:
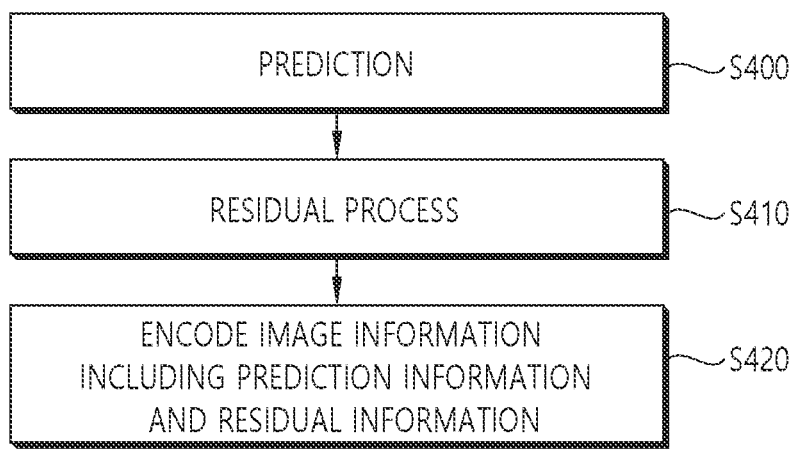
FIG. 4 represents an example of a schematic video/image encoding process to which an embodiment or embodiments of this document is/are applicable.

FIG. 4 illustrates an example of the schematic video/image encoding procedure to which the exemplary embodiment (s) of the present document is (are) applicable. In FIG. 4, S400 may be performed by the predictor 220 of the encoding apparatus described above with reference to FIG. 2, S410 may be performed by the residual processor 230 thereof, and S420 may be performed by the entropy encoder 240 thereof. S400 may include the inter/intra prediction procedures described in the present document, S410 may include the residual processing procedure described in the present document, and S420 may include the information encoding procedure described in the present document.

Referring to FIG. 4, the video/image encoding procedure may schematically include a procedure of generating the reconstructed picture for the current picture and a procedure (optional) of applying the in-loop filtering to the reconstructed picture as well as a procedure of encoding information (e.g., prediction information, residual information, or partitioning information) for reconstructing the picture to output the encoded information in the form of the bitstream as described with reference to FIG. 2. The encoding apparatus may derive (modified) residual samples from the quantized transform coefficient by the dequantizer 234 and the inverse transformer 235, and generate the reconstructed picture based on the predicted samples which are the output in S400 and the (modified) residual samples. The thus generated reconstructed picture may be the same as the aforementioned reconstructed picture generated by the decoding apparatus. The modified reconstructed picture may be generated by the in-loop filtering procedure for the reconstructed picture, and may be stored in the decoding picture buffer or the memory 270, and as in the case of the decoding apparatus, used as the reference picture in the inter prediction procedure upon encoding the picture later. As described above, in some cases, some or all of the in-loop filtering procedure may be omitted. If the in-loop filtering procedure is performed, the (in-loop) filtering-related information (parameter) is encoded by the entropy encoder 240 and outputted in the form of the bitstream, and the decoding apparatus may perform the in-loop filtering procedure in the same method as that of the encoding apparatus based on the filtering-related information.

It is possible to reduce noises generated upon coding the image/the video, such as blocking artifact and ringing artifact by the in-loop filtering procedure, and to enhance subjective/objective visual qualities. Further, by performing the in-loop filtering procedure both in the encoding apparatus and the decoding apparatus, the encoding apparatus and the decoding apparatus may derive the same prediction results, increase reliability of the picture coding, and reduce an amount of data to be transmitted for coding the picture.

As described above, the picture reconstruction procedure may be performed in the encoding apparatus as well as in the decoding apparatus. The reconstructed block may be generated based on the intra prediction/the inter prediction in units of each block, and the reconstructed picture including the reconstructed blocks may be generated. If a current picture/slice/tile group is an I picture/slice/tile group, blocks included in the current picture/slice/tile group may be reconstructed based on only the intra prediction. Meanwhile, if the current picture/slice/tile group is a P or B picture/slice/tile group, blocks included in the current picture/slice/tile group may be reconstructed based on the intra prediction or the inter prediction. In this case, the inter prediction may be applied to some blocks in the current picture/slice/tile group, and the intra prediction may also be applied to other blocks. A color component of the picture may include a luma component and a chroma component, and the methods and exemplary embodiments proposed in the present document may be applied to the luma component and the chroma component unless explicitly limited in the present document.

Figure 5:
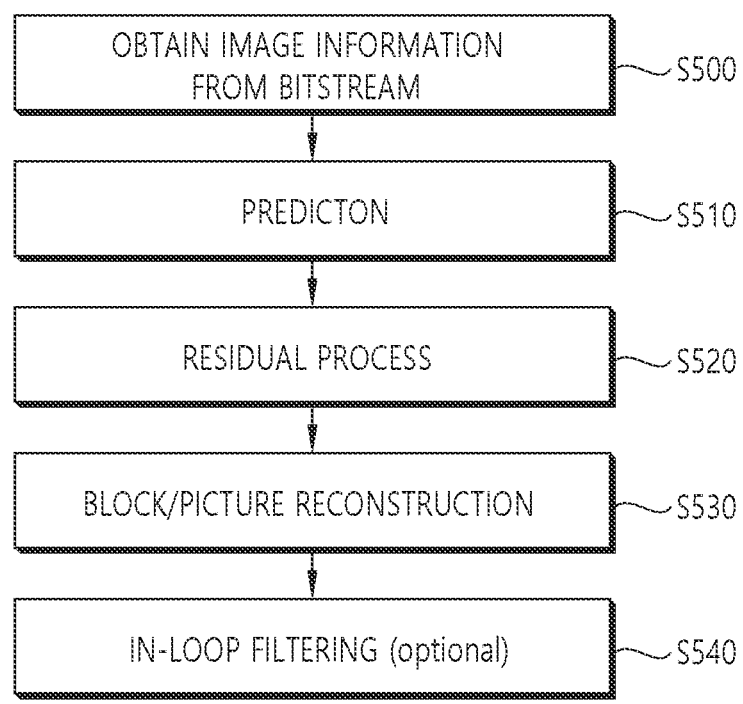
FIG. 5 represents an example of a schematic video/image decoding process to which an embodiment or embodiments of this document can be applied.

FIG. 5 represents an example of a schematic video/image decoding process to which an embodiment or embodiments of this document can be applied. In FIG. 5, S500 may be performed in the entropy decoder 310 of the decoding apparatus described above in FIG. 3; S510 may be performed in the predictor 330; S520 may be performed in the residual processor 320; S530 may be performed in the adder 340; and S540 may be performed in the filter 350. S500 may include the information decoding process described in the present document; S510 may include the inter/intra prediction process described in the present document; S520 may include the residual processing process described in the present document; S530 may include the block/picture reconstruction process described in the present document; and S540 may include the in-loop filtering process described in the present document.

Referring to FIG. 5, as represented in the description with regard to FIG. 3, the picture decoding process may schematically include an image/video information obtaining process S500 from a bitstream (through decoding), a picture reconstruction process S510 to S530, and an in-loop filtering process S540 for the reconstructed picture. The picture reconstruction process may be performed based on the residual samples and the prediction samples obtained through the inter/intra prediction S510 and the residual processing S520 (dequantization for the quantized transform coefficient, inverse transform) process described in the present document. Through the in-loop filtering process for the reconstructed picture which has been generated though the picture reconstruction process, a modified reconstructed picture may be generated, which may be output as a decoded picture, and may also be stored in the decoding picture buffer or a memory 360 of the decoding apparatus and be used as a reference picture in the inter prediction process of the later picture decoding.

According to circumstances, the in-loop filtering process may be skipped, and in this case, the reconstructed picture may be output as a decoded picture, and may also be stored in the decoding picture buffer or a memory 360 of the decoding apparatus and be used as a reference picture in the inter prediction process of the later picture decoding. The in-loop filtering process S540 may include the deblocking filtering process, the sample adaptive offset (SAO) process, the adaptive loop filter (ALF) process, and/or the bi-lateral filter process as described above, and all or some of them may be skipped. Further, one or some of the deblocking filtering process, the sample adaptive offset (SAO) process, the adaptive loop filter (ALF) process, and the bi-lateral filter processes may be sequentially applied, or all of them may be sequentially applied. For example, after the deblocking filtering process is applied to the reconstructed picture, the SAO process may be performed thereon. Alternatively, for example, after the deblocking filtering process is applied to the reconstructed picture, the ALF process may be performed thereon. This may be likewise performed in the encoding apparatus.

Meanwhile, an adaptive color transform (ACT) is a technology existing in HEVC screen content extension to use in-loop color space conversion to remove inter-color-component redundancy. The ACT was also adopted for 444 content in the VVC standard.

In the HEVC screen content coding (SCC) extension, the ACT was used to adaptively transform prediction residuals from one color space to YCgCo space. Two color spaces are adaptively selected by signaling one ACT flag for each transform unit (TU). When the flag is equal to 1, it is indicated that the residual of the TU is coded in the YCgCo space. If not (i.e., when the flag is equal to 0), it is indicated that the residual of the TU is coded in the original color space.

Figure 6:
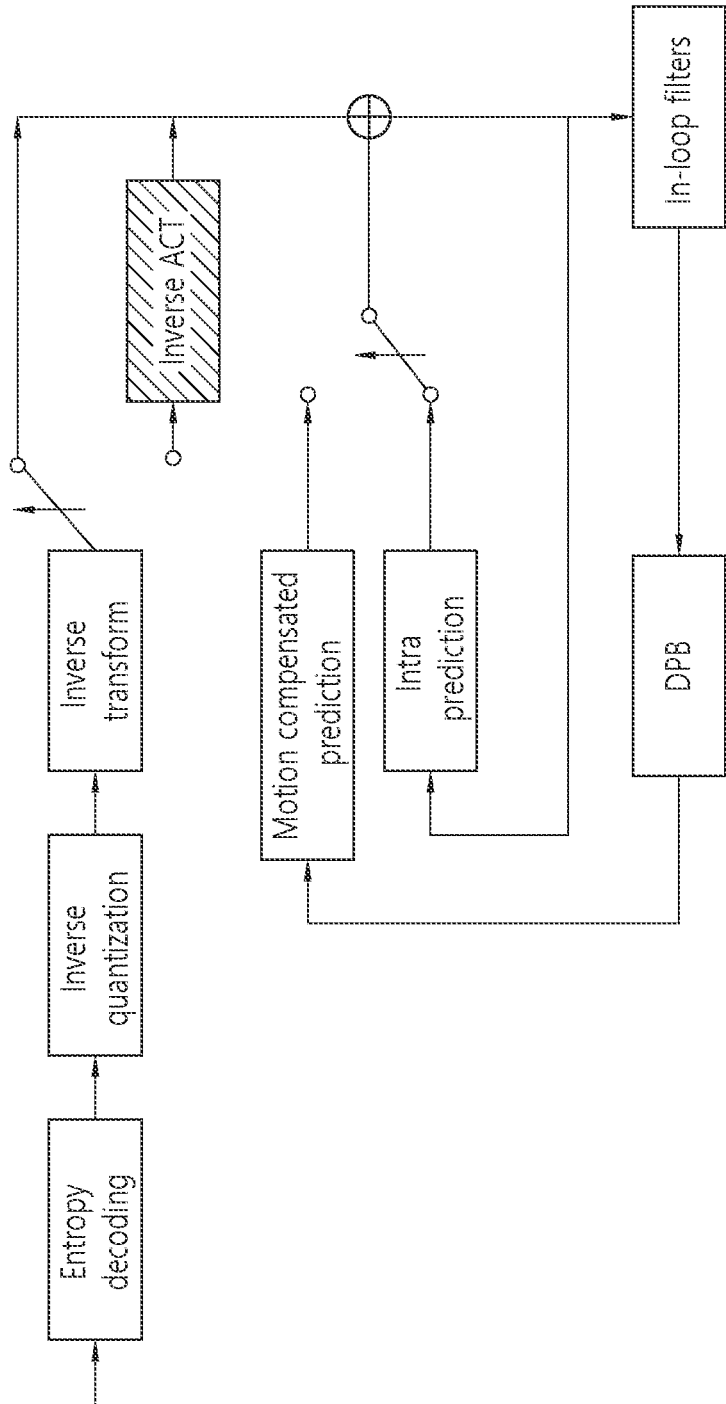
FIG. 6 is a diagram for explaining an example of a video/image decoding process using ACT to which an embodiment or embodiments of this document can be applied.

The ACT has also been adopted in the VVC standard for 444 content (4:4:4 chroma format content), and a decoding process using the ACT may be performed as shown in FIG. 6.

FIG. 6 is a diagram for explaining an example of a video/image decoding process using ACT to which an embodiment or embodiments of this document can be applied.

Here, motion compensated prediction may be referred to as inter prediction in this document. As shown in FIG. 6, the reconstructed picture (or reconstructed block, reconstructed sample array, reconstructed sample(s), reconstructed signal) may be generated based on a prediction output and a residual output (inverse transform (inverse normal transform) (e.g.: inverse MTS-based transform and/or inverse LFNST, etc.) or residual output of inverse ACT). The prediction output may include a prediction block, an array of prediction samples, a prediction sample or prediction samples, or a prediction signal. The residual output may include a residual block, a residual sample array, residual sample or residual samples, or a residual signal. For example, on the encoding side, the ACT process may be performed on residual samples derived based on the predicted samples, and the output of the ACT process may be the input of a normal transform (e.g., an MTS-based transform and/or LFNST). (Inverse) ACT-related information (parameters) may be generated/encoded by an encoding apparatus, and may be transmitted to a decoding apparatus through a bitstream. The decoding apparatus may obtain/parse/decode information (parameters) related to (inverse) ACT, and may perform inverse ACT based on information (parameters) related to (inverse) ACT. Based on the inverse ACT, a (modified) residual sample (or residual block) may be derived. Specifically, the (transform) coefficient may be derived by dequantization on the quantized (transform) coefficient; the residual sample may be derived by performing an inverse transform; and the inverse ACT may be further performed to obtain the (modified) residual sample.

The core transform (the transform kernel) used for color space conversion may remain the same as that used for HEVC. Specifically, forward and inverse YCgCo color transform matrices may be applied as follows.

$$\begin{bmatrix} C'_0 \\ C'_1 \\ C'_2 \end{bmatrix} = \begin{bmatrix} 2 & 1 & 1 \\ 2 & -1 & -1 \\ 0 & -2 & 2 \end{bmatrix} \begin{bmatrix} C_0 \\ C_1 \\ C_2 \end{bmatrix} / 4$$ [Equation 1]

$$\begin{bmatrix} C_0 \\ C_1 \\ C_2 \end{bmatrix} = \begin{bmatrix} 1 & 1 & 0 \\ 1 & -1 & -1 \\ 1 & -1 & 1 \end{bmatrix} \begin{bmatrix} C'_0 \\ C'_1 \\ C'_2 \end{bmatrix}$$

where $C_0$, $C_1$, and $C_2$ may correspond to G, B, and R, and $C_0'$, $C_1'$ and $C_2'$ may correspond to Y, Cg, and Co.

Additionally, to compensate the dynamic range change of residuals signals before and after color transform, the QP adjustments of (−5, −5, −3) may be applied to the transform residuals. The details of QP adjustment will be described later.

In the case of ACT adopted in the VVC, there are some restrictions on when the ACT can be applied and on interaction with other tools.

The ACT becomes disabled for the dual tree. That is, the ACT becomes enabled only for the single tree.

The ACT becomes disabled for the Intra sub-partition prediction (ISP).

The ACT becomes disabled for the block differential pulse coded modulation (BDPCM) chroma, and becomes enabled only for the BDPCM luma.

When the ACT becomes enabled, the cross-component linear model prediction (CCLM) becomes disabled.

Whether to apply the above-described ACT in the encoding/decoding process for image/video may be determined based on ACT-related information (that is, ACT-related syntax elements) signaled through the syntax shown in Tables 1 and 2 below. That is, whether or not to apply the ACT is determined based on the ACT-related information included in the image information, and when the ACT is applied according to the determination, it may be applied to a residual sample, so that a modified residual sample may be derived.

For example, the following Tables 1 and 2 show an example of a syntax structure in which ACT-related information (i.e., ACT-related syntax elements) is signaled.

TABLE 1

|  | Descriptor |
|---|---|
| seq_parameter_set_rbsp( ) { |  |
|   sps_decoding_parameter_set_id | u(4) |
|   ..... |  |
|   if( chroma_format_idc == 3 ) { |  |
|     sps_palette_enabled_flag | u(1) |
|     sps_act_enabled_flag | u(1) |
|   } |  |

TABLE 2

| | Descriptor |
|---|---|
| coding_unit( x0, y0, cbWidth, cbHeight, cqtDepth, treeType, modeType ) { .....   if( CuPredMode[ chType ][ x0 ][ y0 ]  = =   MODE_INTRA  &&     sps_act_enabled_flag && treeType  = =  SINGLE_TREE )     cu_act_enabled_flag | ae(v) |
| .....   if( sps_act_enabled_flag &&     CuPredMode[ chType ][ x0 ][ y0 ]  != MODE_INTRA  &&     treeType  = =  SINGLE_TREE )     cu_act_enabled_flag | ae(v) |
| ..... } | |

Table 3 below represents semantics of syntax elements included in the syntax tables of Tables 1 and 2 above.

TABLE 3 sps_act_enabled_flag specifies that whether adaptive colour transform is enabled, If sps_act_enabled_flag is equal to 1, adaptive colour transform may be used and the flag cu_act_enabled_flag may be present in the coding unit syntax. If sps_act_enabled_flag is equal to 0, adaptive colour transform is not used and cu_act_enabled_flag is not present in the coding unit syntax When sps_act_enabled_flag is not present, it is inferred to be be equal to 0.
cu_act_enabled_flag equal to 1 specifies that the residuals of the current coding unit are coded in $YC_gC_o$ colour space. cu_act_enabled_flag is equal to 0 specifies that the residuals of the current coding unit are coded in original colour space. When cu_act_enabled_flag is not present, it is inferred to be equal to 0.

Referring to Tables 1 to 3, information indicating whether the ACT is enabled may be signaled/parsed through a sequence parameter set (SPS). For example, information indicating whether ACT is enabled may be a sps_act_enabled_flag syntax element. When the value of sps_act_enabled_flag is 1, it may be indicated that the ACT is enabled, and in this case, information indicating whether to apply the ACT to the residual of the current block (i.e., the current coding unit) in the coding unit syntax may be present. Alternatively, when the value of sps_act_enabled_flag is 0, it may be indicated that the ACT is not enabled, and in this case, information indicating whether to apply the ACT to the residual of the current block (i.e., the current coding unit) in the coding unit syntax may not be present.

Based on information (e.g., sps_act_enabled_flag) indicating whether ACT signaled through the SPS is available, information indicating whether to apply ACT to the residual of the current block (i.e., the current coding unit) through the coding unit syntax may be signaled/parsed. For example, the information indicating whether to apply ACT to the residual of the current block (ie, the current coding unit) may be a cu_act_enabled_flag syntax element. When the value of cu_act_enabled_flag is 1, it may be indicated that ACT is applied to the residual of the current block (that is, it indicates coding in the YCgCo color space), and when the value of cu_act_enabled_flag is 0, it may be indicated that ACT is not applied to the residual of the current block (that is, it indicates being coded in the original color space). Here, applying the ACT may mean using color space conversion.

In one embodiment, when the value of information indicating whether the ACT signaled/parsed through the SPS is available (e.g., sps_act_enabled_flag) is 1, in the coding unit syntax, information indicating whether to apply the ACT to the residual of the current block (i.e., the current coding unit) (e.g., cu_act_enabled_flag) may be signaled/parsed. Alternatively, when the value of information indicating whether the ACT signaled/parsed through the SPS is available (e.g., sps_act_enabled_flag) is 0, in the coding unit syntax, information indicating whether to apply the ACT to the residual of the current block (i.e., the current coding unit) (e.g., cu_act_enabled_flag) may not be signaled/parsed.

In addition, based on the case where the value of information indicating whether to apply ACT to the residual of the current block (i.e., the current coding unit) (e.g., cu_act_enabled_flag) signaled/parsed through the coding unit syntax is 1, the ACT (i.e., color space conversion) may be applied to the residual of the current block.

Meanwhile, as described above, ACT color transform in the VVC may use the same equation as in Equation 1 above. This transform is called YCgCo transform. Matrix multiplication as in Equation 1 may be expressed as in Equation 2 below.

| [Equation 2] | |
|---|---|
| Forward Conversion: GBR to YCgCo | Backward Conversion: YCgCo to GBR |
| Y = ((G<<1) + R + B + 2) >> 2 | t = Y − Cg |
| Cg = ((G<<1) − R − B + 2) >> 2 | G = Y + Cg |
| Co = ((R−B) << 1) + 2) >> 2 | B = t − Co = Y − Cg − Co |
| | R = t + Co = Y − Cg + Co |

The transform is not completely reversible (not perfect reconstruction due to loss of precision for Co and Cg handling). Therefore, it cannot be used in applications that require lossless coding. One direct way of enabling lossless coding is to turn off ACT. Its disadvantage is that lossless coding applications cannot benefit from ACT. Embodiments of this document to be described later provide methods for enabling ACT in both lossy and lossless coding applications.

Hereinafter, in this document, methods for alleviating the above-described ACT problems and increasing coding efficiency in applying the ACT-based encoding/decoding process are proposed.

In the current VVC, ACT QP adjustment may be applied, and in this case, there may be two problems. First, each color component may have a different ACT Qp offset, which is not accurately reflected in the QP derivation process. Second, the derived QP may have a negative value. Accordingly, embodiments of the present document propose a method of deriving a QP in which the ACT Qp offset for each color component is reflected, and of preventing the derived QP from having a negative value. In this document, the quantization parameter for the luma component may be represented as $Qp'_y$; the quantization parameter for the chroma Cb component may be represented as $Qp'_{Cb}$; the quantization parameter for the chroma cr component may be represented as $Qp'_{Cr}$; and the quantization parameter for the joint Cb-Cr coding may be represented as $Qp'_{Cbcr}$.

As an embodiment, as shown in Table 1 below, the QP derived based on the ACT QP offset of each color component may be clipped.

TABLE 4

The quantization parameter qP is derived as follows:
- If cIdx is equal to 0, the following applies:
    qP = $Qp'_Y$
    ActQpOffset = −5
- Otherwise, if TuCResMode[ xTbY ][ yTbY ] is equal to 2, the following applies:
    qP = $Qp'_{CbCr}$
    ActQpOffset =−5
- Otherwise, if cIdx is equal to 1, the following applies:
    qP = $Qp'_{Cb}$
    ActQpOffset = −5
- Otherwise (cIdx is equal to 2), the following applies:
    qP = $Qp'_{Cr}$
    ActQpOffset = −3
The quantization parameter qP is modified as follows:
- If transform_skip_flag[ xTbY ][ yTbY ][ cIdx ] is equal to 0, the following applies:
    qP = Max(0, qP + (cu_act_enabled_flag[ xTbY ][ yTbY ] ? ActQpOffset : 0 ))
- Otherwise, if transform_skip_flag[ xTbY ][ yTbY ][ cIdx ] is equal to 1, the following applies:
    qP = Max(0, Max( QpPrimeTsMin, qP ) +
    ( cu_act_enabled_flag[ xTbY ][ yTbY ] ? ActQpOffset: 0))

Referring to Table 4, an ACT QP offset (e.g., ActQpOffset) for each color component may be derived. For example, the ACT QP offset (e.g. ActQpOffset) for the luma component may be −5; the ACT QP offset (e.g., ActQpOffset) for the joint Cb-Cr coding may be −5; the ACT QP offset for the chroma Cb component (e.g., ActQpOffset) may be −5; and the ACT QP offset (e.g., ActQpOffset) for the chroma Cr component may be −3. In this case, the quantization parameter (e.g., qP) may be modified based on the value of the ACT QP offset (e.g., ActQpOffset) for each color component. For example, based on the quantization parameters derived for each color component (e.g., $Qp'_y$, $Qp'_{Cb}$, $Qp'_{Cr}$, $Qp'_{Cbcr}$) and the ACT QP offset of each color component (e.g., ActQpOffset), the quantization parameter (e.g., qP) may be modified. Here, based on the value of information indicating whether the residual of the current block is applied using color space conversion (e.g., cu_act_enabled_flag), the ACT QP offset (e.g., ActQpOffset) may be reflected in the quantization parameter (e.g., $Qp'_y$, $Qp'_{Cb}$, $Qp'_{Cr}$, $Qp'_{Cbcr}$). In this regard, in order to prevent the quantization parameter (e.g., qP) from having a negative value, the quantization parameter (e.g., qP) may be clipped. For example, as shown in Table 4 above, the quantization parameter (e.g., qP) may be determined as a larger value among a quantization parameter derived based on a value of an ACT QP offset (e.g., ActQpOffset) for each color component, and a value 0.

As another example, the QP may be clipped as shown in Table 5 below. Table 5 shows an example in which, when the value of information (e.g., transform_skip_flag) on whether transform/inverse transform is skipped in Table 4 is 1 instead of 0, QP is clipped based on the minimum quantization parameter value in the transform skip mode (e.g., QpPrimeTsMin). Here, when the value of information on whether transform/inverse transform is skipped (e.g., transform_skip_flag) is 1, it may be indicated that transform/inverse transform is skipped, which may be referred to as a transform skip mode. When the value of information on whether transform/inverse transform is skipped (e.g., transform_skip_flag) is 0, it may be indicated that transform/inverse transform is applied. The minimum quantization parameter value (e.g., QpPrimeTsMin) in the transform skip mode may be a value derived based on the min_qp_prime_ts_minus4 syntax element, and the min_qp_prime_ts_minus4 syntax element may indicate a minimum quantization parameter allowed for the transform skip mode signaled in the SPS.

TABLE 5 qP = Max( QpPrimeTsMin, qP+ ( cu_act_enabled_flag[ xTbY ][ yTbY ] ? ActQpOffset : 0))

Here, Y and Cb may represent three color components; Y may correspond to Co; Cb may correspond to $C_1$ or Cg; and Cr may correspond to $C_2$ or Co in the ACT transform.

The above-described embodiment may be applied to the specification of the VVC as shown in Table 6 below. Table 6 represents an example of applying the above-described embodiment to the scaling process and the residual correction process in the specification.

TABLE 6

8.7.3 Scaling (dequantization) process for transform coefficients
Inputs to this process are:
- a luma location (xTbY, yTbY) specifying the top-left sample of the current luma transform block relative to the top-left luma sample of the current picture,
- a variable nTbW specifying the transform block width,
- a variable nTbH specifying the transform block height,
- a variable predMode specifying the prediction mode of the coding unit,
- a variable cIdx specifying the colour component of the current block.
Output of this process is the (nTbW)x(nTbH) array d of scaled transform coefficients with elements d[ x ][ y ].
    The quantization parameter qP and the variable QpActOffset are derived as follows:
- If cIdx is equal to 0, the following applies:
    qP = $Qp'_Y$     (1129)
    QpActOffset = cu_act_enabled_flag[ xTbY ][ yTbY ] ? 5 : 0     (xxxx)

TABLE 6-continued

- Otherwise, if TuCResMode[ xTbY ][ yTbY ] is equal to 2, the following applies:
    qP = Qp'$_{CbCr}$ (1130)
    QpActOffset = cu_act_enabled_flag[ xTbY ][ yTbY ] ? 5 : 0 (xxxx)
- Otherwise, if cIdx is equal to 1, the following applies:
    qP = Qp'$_{Cb}$ (1131)
    QpActOffset = cu_act_enabled_flag[ xTbY ][ yTbY ] ? 5 : 0 (xxxx)
Otherwise (cIdx is equal to 2), the following applies:
    qP = Qp'$_{Cr}$ (1132)
    QpActOffset = cu_act_enabled_flag[ xTbY ][ yTbY ] ? 3 : 0 (xxxx)
The quantization parameter qP is modified and the variables rectNonTsFlag and bdShift are derived as follows:
- If transform_skip_flag[ xTbY ][ yTbY ][ cIdx ] is equal to 0, the following applies:
    qP = Max( 0, qP − QpActOffset) (1133)
    rectNonTsFlag = ( ( ( Log2( nTbW ) + Log2( nTbH ) ) & 1 ) == 1 ) ? 1 : 0 (1134)
    bdShift = BitDepth + rectNonTsFlag + (1135)
      ( ( Log2( nTbW ) + Log2( nTbH ) ) / 2 ) − 5 + pic_dep_quant_enabled_flag
- Otherwise (transform_skip_flag[ xTbY ][ yTbY ][ cIdx ] is equal to 1), the following applies:
    qP = Max( QpPrimeTsMin, qP − QpActOffset ) (1136)
    rectNonTsFlag = 0 (1137)
    bdShift = 10 (1138)
8.7.4.6 Residual modification process for blocks using colour space conversion
[...]
The (nTbW)x(nTbH) arrays of residual samples r$_Y$, r$_{Cb}$ and r$_{Cr}$ are modified as follows:
    r$_Y$[ x ][ y ] = Clip3( −( 1 << BitDepth ), ( 1 << BitDepth ) − 1, r$_Y$[ x ][ y ] ) (xxxx)
    r$_{Cb}$[ x ][ y ] = Clip3( −( 1 << BitDepth ), ( 1 << BitDepth ) − 1, r$_{Cb}$[ x ][ y ] ) (xxxx)
    r$_{Cr}$[ x ][ y ] = Clip3( −( 1 << BitDepth ), ( 1 << BitDepth ) − 1, r$_{Cr}$[ x ][ y ] ) (xxxx)
    tmp = r$_Y$[ x ][ y ] − r$_{Cb}$[ x ][ y ] (1191)
    r$_Y$ x ][ y ] = r$_Y$[ x ][ y ] + r$_{Cb}$[ x ][ y ] (1192)
    r$_{Cb}$[x][y] = tmp − r$_{Cr}$[ x ][ y ] (1193)
    r$_{Cr}$[ x ][ y ] = tmp + r$_{Cr}$[ x ][ y ] (1194)

In Table 4, the values of ACTQpOffset for the three color components were derived as −5, −5, and −3, and in Table 6, the values of ACTQpOffset for the three color components were derived as 5, 5, and 3, which however is only an example and may be substituted with other values or variables.

Meanwhile, in the current VVC case, the adjustment for the ACT QP offset is fixed to −5 for the Y, Cg, Co components and YCbCr. In one embodiment of this document, in consideration of the case where the ACT QP offset may be signaled through the bitstream and may have a wider offset range, there is proposed a method by which the QP can be clipped within the minimum and maximum ranges in order to prevent the ACT QP offset-based modified QP from going out of the range.

In an embodiment, the ACT QP offset may be a value derived based on signaled information, or be a predefined number. For example, as shown in Table 4 below, the ACT QP offset may be represented by variables PpsActQpOffsetY, PpsActQpOffsetCb, PpsActQpOffsetCr, and PpsActQpOffsetCbCr. The variables may be a predefined number or a value derived from a signaled ACT QP offset. Signaling of the ACT QP offset will be described later. For example, the values of PpsActQpOffsetY, PpsActQpOffsetCbCr, PpsActQpOffsetCb, and PpsActQpOffsetCr must exist in the range of −12 to +12, which may be a requirement for bitstream conformance.

For example, when the value of the QP offset is signaled instead of a fixed value and the range of the value of the QP offset is between −12 and 12, in order to avoid a negative QP, it is necessary to clip not only the minimum value of the derived QP but also the maximum value of the derived QP. The minimum value of qP may become 0 to avoid negative values, or may become the minimum allowable qP limited by the signaled syntax element (e.g., minimum quantization parameter value in transform skip mode; QpPrimeTsMin).

The maximum value of qP may be a possible maximum qP value (e.g., 63) or a maximum allowable qP limited by a signaled syntax element.

Table 7 below shows an example of an algorithm to which the above-described embodiment can be applied.

TABLE 7

The quantization parameter qP is derived as follows:
-  If cIdx is equal to 0, the following applies:
     qP = Qp'$_Y$
     ActQpOffset = PpsActQpOffsetY
-  Otherwise, if TuCResMode[ xTbY ][ yTbY ] is equal to 2, the following applies:
     qP = Qp'$_{CbCr}$
     ActQpOffset = PpsActQpOffsetCbCr
-  Otherwise, if cIdx is equal to 1, the following applies:
     qP = Qp'$_{Cb}$
     ActQpOffset = PpsActQpOffsetCb
-  Otherwise (cIdx is equal to 2), the following applies:
     qP = Qp'$_{Cr}$
     ActQpOffset = PpsActQpOffsetCr
The quantization parameter qP is modified as follows:
-  If transform_skip_flag[ xTbY ][ yTbY ][ cIdx ] is equal to 0, the following applies:
     qP = Clip3(0, 63+ QnBdOffset, qP + (cu_act_enabled_flag[ xTbY ][ yTbY ] ? ActQpOffset : 0 ))
-  Otherwise, if transform_skip_flag[ xTbY ][ yTbY ][ cIdx ] is equal to 1, the following applies:
     qP = Clip3(0, 63+ QpBdOffset, Max( QpPrimeTsMin, qP ) + ( cu_act_enabled_flag[ xTbY ][ yTbY ] ? ActQpOffset: 0 )

In another example, the QP may be clipped within the minimum and maximum ranges as shown in Table 8 below. Table 8 represents an example in which the minimum qP is clipped based on QpPrimeTsMin instead of 0 when the value of information on whether transform/inverse transform is skipped in Table 7 above (e.g., transform_skip_flag) is 1.

TABLE 8

The quantization parameter qP is modified as follows:
- If transform_skip_flag[ xTbY ][ yTbY ][ cIdx ] is equal to 0, the following applies:
  qP = Clip3(0, 63+ QpBdOffset, qP + ( cu_act_enabled_flag[ xTbY ][ yTbY ] ? ActQpOffset : 0 ))
- Otherwise, if transform_skip_flag[ xTbY ][ yTbY ][ cIdx ] is equal to 1, the following applies:
  qP = Clip3(QpPrimeTsMin, 63+ QpBdOffset, qP + cu_act_enabled_flag[ xTbY ][ yTbY ] ? ActQpOffset: 0 )

Meanwhile, the combination of BDPCM for ACT and luma components is allowed in the current VVC. However, BDPCM for chroma component and ACT is not allowed (disabled). Therefore, in one embodiment of the present document, it is proposed to allow a combination of ACT and BDPCM for the chroma component.

When first looking at BDPCM, in the encoding/decoding process, a block differential pulse coded modulation (BDPCM) or block-based Delta Pulse Code Modulation (BDPCM) technique may be used. BDPCM may also be referred to as quantized residual block-based Delta Pulse Code Modulation (RDPCM).

When predicting a block by applying BDPCM, reconstructed samples may be utilized to predict a row or column of the block line-by-line. In this regard, the used reference sample may be an unfiltered sample. The BDPCM direction may indicate whether vertical direction or horizontal direction prediction is used. That is, when BDPCM is applied, a vertical direction or a horizontal direction may be selected as the BDPCM direction, and prediction may be performed in the BDPCM direction. The prediction error may be quantized in the spatial domain, and the sample may be reconstructed by adding the dequantized prediction error to the prediction (i.e., the prediction sample). The prediction error may mean a residual. As an alternative to this BDPCM, a quantized residual domain BDPCM may be proposed, and the prediction direction or signaling may be the same as the BDPCM applied to the spatial domain. That is, the quantization coefficient itself may be accumulated like delta pulse code modulation (DPCM) through the quantized residual domain BDPCM, and then the residual may be reconstructed through dequantization. Accordingly, the quantized residual domain BDPCM may be used in the sense of applying DPCM in the residual coding stage. A quantized residual domain used below is a residual derived based on prediction that is quantized without transform, and refers to a domain for a quantized residual sample. For example, the quantized residual domain may include quantized residuals (or quantized residual coefficients) to which transform skip is applied, that is, the transform is skipped for residual samples, but the quantization is applied. Alternatively, for example, the quantized residual domain may include the quantized transform coefficient.

As described above, the BDPCM may be applied to a quantized residual domain, and the quantized residual domain may include a quantized residual (or quantized residual coefficient), in which case transform skip may be applied to the residual. That is, when BDPCM is applied, transform may be skipped for the residual sample, and quantization may be applied to the same. Alternatively, the quantized residual domain may include the quantized transform coefficient. A flag indicating whether or not BDPCM is applicable may be signaled in a sequence level (SPS), and this flag may also be signaled only when it is signaled that a transform skip mode is possible in the SPS. The flag may be referred to as a BDPCM enabled flag or an SPS BDPCM enabled flag.

When BDPCM is applied, intra prediction may be performed on the entire block by sample copy according to a prediction direction (e.g., vertical prediction or horizontal prediction) similar to the intra prediction direction. The residual, which is the difference value between the original and the prediction block, is quantized by skipping the transform, and the delta value, that is, the difference value between the quantized residual and the predictor in the horizontal or vertical direction (that is, the quantized residual in the horizontal or vertical direction) may be coded.

In the case that BDPCM is applicable, when the CU size is less than or equal to MaxTsSize (maximum transform skip block size) for a luma sample, and the CU is coded with intra prediction, the flag information may be transmitted in the CU level. The flag information may be referred to as a BDPCM flag. Here, MaxTsSize may mean the maximum block size for allowing the transform skip mode. The flag information may indicate whether conventional intra coding or BDPCM is applied. When BDPCM is applied, a BDPCM prediction direction flag indicating whether the prediction direction is a horizontal direction or a vertical direction may be transmitted. The BDPCM prediction direction flag may be referred to as a BDPCM direction flag. Thereafter, the block may be predicted through a conventional horizontal or vertical intra prediction process using an unfiltered reference sample. In addition, the residual may be quantized, and a difference value between each quantized residual and its predictor, for example, a residual of neighboring position already quantized in a horizontal or vertical direction according to a BDPCM prediction direction, may be coded.

In applying the above-described BDPCM together with the ACT, this document proposes a method that can be applied not only to the luma component but also the chroma component. In an embodiment, the following Table 9 represents a part of the coding unit syntax, and represents an example of a syntax structure to allow BDPCM for ACT and chroma components.

TABLE 9

| | Descriptor |
|---|---|
| Coding_unit( x0, y0, cbWidth, cbHeight, cqtDepth, treeType, modeType) { ......   if( ( treeType = = SINGLE_TREE │ │ treeType = = DUAL_TREE_CHROMA ) &&     ChromaArrayType != 0 ) {     if( pred_mode_plt_flag && treeType = = DUAL_TREE_CHROMA )       palette_coding( x0, y0, cbWidth / SubWidthC, cbHeight / SubHeightC, 1, 2 )     else {       if( cbWidth <= MaxTsSize && cbHeight <= MaxTsSize &&         sps_bdpcm_chroma_enabled_flag) {         intra_bdpcm_chroma_flag | ae(v) |

TABLE 9-continued

| | Descriptor |
|---|---|
|           if( intra_bdpcm_chroma_flag) | |
|             intra_bdpcm_chroma_dir_flag | ae(v) |
|         } else { | |
|           if( CclmEnabled ) | |
|             cclm_mode_flag | ae(v) |
|           if( cclm_mode_flag ) | |
|             cclm_mode_idx | ae(v) |
|           else | |
|             intra_chroma_pred_mode | ae(v) |
|         } | |
|     } | |
|   } | |
| } else if( treeType != DUAL_TREE_CHROMA ) { /* MODE_INTER or MODE_IBC */ | |
| ... | |

Referring to Table 9 above, by information indicating whether the residual of the current block is applied using color space conversion (e.g., cu_act_enabled_flag), the syntax structure of the coding unit may be changed so that it is not determined whether BDPCM for the chroma component is applied. For example, only when the value of cu_act_enabled_flag is not 1, the condition under which BDPCM for the chroma component is applied (e.g., ! cu_act_enabled_flag) may be removed. In this case, both ACT and BDPCM may be applied to the chroma component of the current block. Information on whether BDPCM for the chroma component is applied may be an intra_bdpcm_chroma_flag syntax element. For example, when the value of intra_bdpcm_chroma_flag is 1, it may be indicated that BDPCM is applied to the chroma component of the current block, and when the value of intra_bdpcm_chroma_flag is 0, it may be indicated that BDPCM is not applied to the chroma component of the current block.

Meanwhile, both ACT and CCLM may be used to remove inter-component redundancy. These two tools sometimes overlap each other, but after applying either tool, the redundancy between the components is not removed. Therefore, it may be useful to allow the two tools to be applied together. An embodiment of this document proposes a method which allows a combination of ACT and CCLM. In this case, CCLM may be applied first and ACT may be applied later on the decoder side.

In an embodiment, the following Table 10 represents a part of the coding unit syntax, and represents an example of a syntax structure that allows a combination of ACT and CCLM.

TABLE 10

| | Descriptor |
|---|---|
| Coding_unit( x0, y0, cbWidth, cbHeight, cqtDepth, treeType, modeType) { | |
|   ...... | |
|   if( ( treeType = = SINGLE_TREE \| \| treeType = = DUAL_TREE_CHROMA ) && | |
|     ChromaArrayType != 0 ) { | |
|     if( pred_mode_plt_flag && treeType = = DUAL_TREE_CHROMA ) | |
|       palette_coding( x0, y0, cbWidth / SubWidthC, cbHeight / SubHeightC, 1, 2 ) | |
|     else { | |
|       if( cbWidth <= MaxTsSize && cbHeight <= MaxTsSize && | |
|         sps_bdpcm_chroma_enabled_flag) { | |
|         intra_bdpcm_chroma_flag | ae(v) |
|         if( intra_bdpcm_chroma_flag) | |
|           intra_bdpcm_chroma_dir_flag | ae(v) |
|       } else { | |
|         if( CclmEnabled ) | |
|           cclm_mode_flag | ae(v) |
|         if( cclm_mode_flag ) | |
|           cclm_mode_idx | ae(v) |
|         else | |
|           intra_chroma_pred_mode | ae(v) |
|       } | |
|     } | |
|   } | |
| } else if( treeType != DUAL_TREE_CHROMA ) { /* MODE_INTER or MODE_IBC */ | |
| ... | |

Referring to Table 10 above, by information indicating whether the residual of the current block is applied using color space conversion (e.g., cu_act_enabled_flag), the syntax structure of the coding unit may be changed so that it is not determined whether CCLM is applied. For example, only when the value of cu_act_enabled_flag is not 1, the condition under which CCLM is applied (e.g., !cu_act_enabled_flag) may be removed. In this case, both ACT and CCLM may be applied to the current block. Information on whether CCLM is applied may be a cclm_mode_flag syntax element. For example, when the value of cclm_mode_flag is 1, it may be indicated that CCLM is applied to the current block, and when the value of cclm_mode_flag is 0, it may be indicated that CCLM is not applied to the current block.

The syntax structure may be changed to allow ACT as well as BDPCM and CCLM for chroma components. For example, as shown in Tables 9 and 10 above, it may be implemented by removing the constraint "! cu_act_enabled_flag" for signaling of the intra_bdpcm_chroma_flag and cclm_mode_flag syntax elements.

Meanwhile, in the ACT mode, the prediction residual is converted from one color space (GBR or YCbCr) to the YCgCo space, and the residual of the TU is coded in the YCgCo space. The ACT core conversion (conversion kernel) used for color space conversions is expressed by Equation 3 below. where $C_0$, $C_1$, and $C_2$ may correspond to G, B, and R, and $C_0'$, $C_1'$ and $C_2'$ may correspond to Y, Cg, and Co.

$$\begin{bmatrix} C_0' \\ C_1' \\ C_2' \end{bmatrix} = \begin{bmatrix} 2 & 1 & 1 \\ 2 & -1 & -1 \\ 0 & -2 & 2 \end{bmatrix} \begin{bmatrix} C_0 \\ C_1 \\ C_2 \end{bmatrix} / 4 \quad \text{[Equation 3]}$$

$$\begin{bmatrix} C_0 \\ C_1 \\ C_2 \end{bmatrix} = \begin{bmatrix} 1 & 1 & 0 \\ 1 & -1 & -1 \\ 1 & -1 & 1 \end{bmatrix} \begin{bmatrix} C_0' \\ C_1' \\ C_2' \end{bmatrix}$$

As shown in Equation 3 above, the $C_0'$, $C_1'$ and $C_2'$ (here $C_0'$=Y, $C_1'$=Cg, $C_2'$=Co) transform are not normalized (i.e., L2norm is not equal to 1). For example, the L2norm of the transform for each component is approximately equal to 0.6 for $C_0'$ and $C_1'$ and 0.7 for $C_2'$. L2norm may be obtained by the square root of the sum of each squared coefficient. For example, $C_0'$=2/4*$C_0$+1/4*$C_1$+1/4*$C_2$. Therefore, the norm of $C_0'$ is equal to the square root of {(2/4)*(2/4)+(1/4)*(1/4)+(1/4)*(1/4)}=the square root of (6/16=0.375).=0.375). The square root of 0.375 is about 0.6.

If the transform is not normalized, the dynamic range of each component becomes irregular, which may cause coding performance degradation in the conventional video compression system. In order to compensate for the change in the dynamic range of the residual signal, a QP adjustment method may be used by transmitting a QP offset value for compensating for the change in the dynamic range for each transform component. Therefore, one embodiment of this document focuses on joint CbCr as well as general QP adjustment control method for ACT transform. In the joint CbCr method, change in the dynamic range may occur between respective color components because each color component is coded jointly rather than independently.

When looking at the joint CbCr coding method, a jointly coded mode for chroma residuals in the VVC supports, which may be referred to as a joint chroma coding mode or a joint CbCr mode. The use (enabled) of the joint chroma coding mode may be indicated by the TU level flag tu_joint_cbcr_residual_flag, and the selected mode may be indicated implicitly by the chroma CBF. When one or both of the chroma CBFs for the TU is or are 1, the tu_joint_cbcr_residual_flag flag may be present. In the PPS and slice header, the chroma QP offset value may be signaled for the joint chroma residual coding mode, in order to distinguish it from the general chroma QP offset value signaled for the normal chroma residual coding mode. This chroma QP offset value may be used to derive a chroma QP value for a block coded using the joint chroma residual coding mode. When the corresponding joint chroma coding mode (mode 2 of Table 11) is enabled in the TU, this chroma QP offset may be added to the luma-derived chroma QP applied during quantization and decoding of the corresponding TU. For other modes (modes 1 and 3 in Table 11), chroma QP may be derived in the same way as the conventional Cb or Cr block. The reconstruction process of the chroma residual (resCb and resCr) in the transmitted transform block is as shown in Table 11. When this mode is enabled, one single joint chroma residual block (resJointC [x] [y] in Table 11) is signaled, and a residual block for Cb (resCb) and a residual block for Cr (resCr) may be derived in consideration of information such as tu_cbf_cb, tu_cbf_cr, and CSign, which are sign values specified in the slice header.

Table 11 below represents an example of reconstructing the chroma residual according to the joint CbCr mode. Here, the CSign value is a sign value (+1 or −1) specified in the slice header, and resJointC [ ][ ] is the transmitted residual.

TABLE 11

| tu_cbf_cb | tu_cbf cr | reconstruction of Cb and Cr residuals | mode |
|---|---|---|---|
| 1 | 0 | resCb[ x ][ y ] = resJointC[ x ][ y ]<br>resCr[ x ][ y ] = ( CSign * resJointC[ x ][ y ] ) >> 1 | 1 |
| 1 | 1 | resCb[ x ][ y ] = resJointC[ x ][ y ]<br>resCr[ x ][ y ] = CSign * resJointC[ x ][ y ] | 2 |
| 0 | 1 | resCb[ x ][ y ] = ( CSign * resJointC[ x ][ y ] ) >> 1<br>resCr[ x ][ y ] = resJointC[ x ][ y ] | 3 |

On the encoder side, the joint chroma component may be derived as shown in Table 12 below. According to the mode disclosed in Table 11, resJointC {1,2} may be generated by the encoder as in the algorithm in Table 12 below.

TABLE 12

- If mode is equal to 2 (single residual with reconstruction Cb = C, Cr = CSign * C), the joint residual is determined according to resJointC[ x ][ y ] = (resCb[ x ][ y ] + CSign * resCr[ x ][ y ] ) / 2.
- Otherwise, if mode is equal to 1 (single residual with reconstruction Cb = C, Cr = (CSign * C) / 2), the joint residual is determined according to resJointC[ x ][ y ] = (4 * resCb[ x ][ y ] + 2 * CSign * resCr[ x ][ y ]) / 5.
- Otherwise (mode is equal to 3, i. e., single residual, reconstruction Cr = C, Cb = (CSign * C) / 2), the joint residual is determined according to resJointC[ x ][ y ] = ( 4 * resCr[ x ][ y ] + 2 * CSign * resCb[ x ][ y ] ) / 5.

The three joint chroma coding modes described above are supported only in the I slice, and only mode 2 is supported in the P and B slices. Therefore, in P and B slices, the syntax element tu_joint_cbcr_residual_flag may exist only when two chroma cbf is 1. Transform depth may be removed from context modeling of tu_cbf_luma and tu_cbf_cb.

The ACT QP offset adjustment in the current VVC is fixed to −5, and is the same for Y, Cg, Co components and joint CbCr. An embodiment of the present document allows different ACT QP offset values for Y, Cb, Cr and/or joint CbCr to provide flexibility in QP control of each component and joint CbCr. The ACT QP offset value may vary depending on whether it is a joint CbCr and/or the component index and/or a joint CbCr mode.

In one embodiment, using the variables ppsActQpOffsetY, ppsActQpOffsetCb, and ppsActQpOffsetCr derived based on the information on the ACT QP offset as described above, the ACT QP offset for Y, Cb, and Cr may be indicated, and the variable ppsActQpOffsetCbCr may be used for the ACT QP offset of joint CbCr mode 2 (i.e., there is a non-zero cbf in both cb and cr components). The values of the variables may be defined or signaled from the bitstream. There may be several variations in the ACT QP offset of the joint CbCr mode.

In an example, the ACT QP offset of the joint CbCr mode 2 may have its own offset value. For other joint CbCr modes, the ACT QP offset of the corresponding component may be used. In this case, the algorithm may be implemented as shown in Table 13 below.

TABLE 13

The quantization parameter qP is derived as follows:
- If cIdx is equal to 0, the following applies:
  qP = Qp'$_Y$
  ActQpOffset = PpsActQpOffsetY
- Otherwise, if TuCResMode[ xTbY ][ yTbY ] is equal to 2, the following applies:
  qP = Qp'$_{CbCr}$
  ActQpOffset = PpsActQpOffsetCbCr
- Otherwise, if cIdx is equal to 1, the following applies:
  qP = Qp'$_{Cb}$
  ActQpOffset = PpsActQpOffsetCb
- Otherwise (cIdx is equal to 2), the following applies:
  qP = Qp'$_{Cr}$
  ActQpOffset = PpsActQpOffsetCr The quantization parameter qP is modified as follows:
- If transform_skip_flag[ xTbY ][ yTbY ][ cIdx ] is equal to 0, the following applies:
  qP = Clip3(0, 63+ QnBdOffset, qP + (cu_act_enabled_flag[ xTbY ][ yTbY ] ? ActQpOffset : 0 ))
- Otherwise, if transform_skip_flag[ xTbY ][ yTbY ][ cIdx ] is equal to 1, the following applies:
  qP = Clip3(QpPrimeTsMin, 63+ QpBdOffset, qP + cu_act_enabled_flag[ xTbY ][ yTbY ] ? ActQpOffset : 0 )

In another example, for the joint CbCr mode with tu_cbf_cb !=0 (i.e., modes 1 and 2), ppsActQpOffsetCb may be used, and for the joint CbCr mode with tu_cbf_cb==0 (i.e., mode 3), ppsActQpOffsetCr may be used. In this case, the algorithm may be implemented as shown in Table 14 below.

TABLE 14

The quantization parameter qP is derived as follows:
- If cIdx is equal to 0, the following applies:
  qP = Qp'$_Y$
  ActQpOffset = PpsActQpOffsetY
- Otherwise, if TuCResMode[ xTbY ][ yTbY ] is equal to 2, the following applies:
  qP = Qp'$_{CbCr}$
- Otherwise, if cIdx is equal to 1, the following applies:
  qP = Qp'$_{Cb}$
  ActQpOffset = PpsActQpOffsetCb
- Otherwise (cIdx is equal to 2), the following applies:
  qP = Qp'$_{Cr}$
  ActQpOffset = PpsActQpOffsetCr
ActQpOffset in joint CbCr mode is derived as follows
if cIdx is not euqal to 0 and TuCResMode[ xTbY ][ yTbY ] is not euqal to 0, the following applies:
- if TuCResMode[ xTbY ][ yTbY ] is euqal to 1 or 2
  ActQpOffset= ppsActQpOffsetCb
- Otherwise
  ActQpOffset= ppsActQpOffsetCr The quantization parameter qP is modified as follows:
- If transform_skip_flag[ xTbY ][ yTbY ][ cIdx ] is equal to 0, the following applies:
  qP = Clip3(0, 63+ QnBdOffset, qP + (cu_act_enabled_flag[ xTbY ][ yTbY ] ? ActQpOffset : 0 ))
- Otherwise, if transform_skip_flag[ xTbY ][ yTbY ][ cIdx ] is equal to 1, the following applies:
  qP = Clip3(QpPrimeTsMin, 63+ QpBdOffset, qP + cu_act_enabled_flag[ xTbY ][ yTbY ] ? ActQpOffset : 0 )

In another example, regardless of the CbCr joint mode, if the component index is Y, ppsActQpOffsetY may be used; if the component index is Cb, ppsActQpOffsetCb may be used; and if the component index is Cr, ppsActQpOffsetCr may be used. In this case, the algorithm may be implemented as shown in Table 15 below.

TABLE 15

The quantization parameter qP is derived as follows:
- If cIdx is equal to 0, the following applies:
  qP = Qp'$_Y$
  ActQpOffset = PpsActQpOffsetY
- Otherwise, if TuCResMode[ xTbY ][ yTbY ] is equal to 2, the following applies:
  qP = Qp'$_{CbCr}$
  ActQpOffset = (cIdz==1)? ppsActQpOffsetCb: ppsActQpOffsetCr
- Otherwise, if cIdx is equal to 1, the following applies:
  qP = Qp'$_{Cb}$
  ActQpOffset = ppsActQpOffsetCb
- Otherwise (cIdx is equal to 2), the following applies:
  qP = Qp'$_{Cr}$
  ActQpOffset = ppsActQpOffsetCr The quantization parameter qP is modified as follows:
- If transform_skip_flag[ xTbY ][ yTbY ][ cIdx ] is equal to 0, the following applies:
  qP = Clip3(0, 63+ QnBdOffset, qP + (cu_act_enabled_flag[ xTbY ][ yTbY ] ? ActQpOffset : 0 ))
- Otherwise, if transform_skip_flag[ xTbY ][ yTbY ][ cIdx ] is equal to 1, the following applies:
  qP = Clip3(QpPrimeTsMin, 63+ QpBdOffset, qP + cu_act_enabled_flag[ xTbY ][ yTbY ] ? ActQpOffset : 0 )

Meanwhile, in an embodiment of the present disclosure, it may be signaled via the bitstream to allow more flexibility for the ACT QP offset. To this end, information on the ACT QP offset may be placed in an appropriate header and signaled. For example, it may be signaled via SPS, PPS, picture header, slice header and/or other header sets. The ACT QP offset of the joint CbCr may be signaled individually, or derived from the ACT QP offset of Y, Cb, Cr.

As an example, the ACT QP offset may be signaled in the PPS without a general loss, and may be signaled as in the syntax table of Table 16 below. In the example of Table 16, one ACT QP offset may be signaled for the joint CbCr.

Following Table 16 is an example of a syntax table signaling information related to the ACT QP offset in the PPS, and following Table 17 represents semantics for syntax elements included in the syntax table of Table 16.

TABLE 16

| | Descriptor |
|---|---|
| pic_parameter_set_rbsp () { | |
| ...... | |
| pps_act_qp_offsets_present_flag | u(1) |
| if (pps_act_qp_offsets_present_flag) { | |
|     pps_act_y_qp_offset_plusX1 | se(v) |
|     pps_act_cb_qp_offset_plusX2 | se(v) |
|     pps_act_cr_qp_offset_plusX3 | se(v) |
|     pps_act_cbcr_qp_offset_plusX4 | se(v) |
| } | |
| ... | |
| } | |
| ... | |

TABLE 17 pps_act_qp_offsets_present_flag equal to 1 specifies that pps_act_y_qp_offset_plusX1 and pps_act_cb_qp_offset_plusX2, pps_act_cr_qp_offset_plusX3 and pps_act_cbcr_qp_offset_plusX4 are present in the PPS syntax structure. Pps_act_qp_offsets_present_flag equal to 0 specifies that pps_act_y_qp_offset_plusX1 , pps_act_cb_qp_offset _plusX2, pps_act_cr_qp_offset_plusX3 and pps_act_cbcr_qp_offset_plusX4 are not present in the PPS RBSP syntax structure. When sps_act_enabled_flag is equal to 0, the value of pps_act_qp_offsets_present_flag shall be equal to 0.

TABLE 17-continued pps_act_y_qp_offset_plusX1, pps_act_cb_qp_offset_plusX2, pps_act_cr_qp_offset_plusX3, pps_act_cbcr_qp_offset_plusX4 are used to determine the offsets that a re applied to the quantization parameter values qP for the luma, Cb, Cr components and joint CbCr, respectively, when cu_act_enabled_flag is equal to 1. When not present, the values of pps_act_y_qp_offset_plusX1, pps_act_cb_qp_offset_plusX2, pps_act_cr_qp_offset_plusX3, pps_act_cbcr_qp_offset_plusX4 are inferred to be equal to 0.
The variable PpsActQpOffsetY is set equal to pps_act_y_qp_offset_plusX1 − X1.
The variable PpsActQpOffsetCb is set equal to pps_act_cb_qp_offset_plusX2 −X2.
The variable PpsActQpOffsetCr is set equal to pps_act_cr_qp_offset_plusX3 − X3.
The variable PpsActQpOffsetCbCr is set equal to pps_act_cbcr_qp_offset plusX4 − X4
NOTE - X1,X2, X3 and X4 above denote some constant values.
It is a requirement of bitstream conformance that the values of PpsActQpOffsetY, PpsActQpOffsetCb, and PpsActQpOffsetCr, PpsActQpOffsetCbCr shall be in the range of −12 to +12, inclusive.

Referring to Tables 16 and 17 above, the pps_act_qp_offsets_present_flag syntax element may be parsed/signaled in the PPS. Here, pps_act_qp_offsets_present_flag may be information indicating whether information related to the ACT QP offset exists in the PPS. For example, when the value of pps_act_qp_offsets_present_flag is 1, it may be indicated that information related to the ACT QP offset is present in the PPS, and when the value of pps_act_qp_offsets_present_flag is 0, it may be indicated that information related to the ACT QP offset is not present in the PPS.

For example, when the value of pps_act_qp_offsets_present_flag is 1, information related to the ACT QP offset may be parsed/signaled in the PPS. Here, the information related to the ACT QP offset may include pps_act_y_qp_offset_plusX1, pps_act_cb_qp_offset_plusX2, pps_act_cr_qp_offset_plusX3, and pps_act_cbcr_qp_offset_plusX4 syntax elements.

pps_act_y_qp_offset_plusX1, pps_act_cb_qp_offset_plusX2, pps_act_cr_qp_offset_plusX3, pps_act_cbcr_qp_offset_plusX4 may be used to determine the offset applied to the quantization parameter value qP for the luma, Cb, Cr components and joint CbCr. As shown in Table 17, an ACT QP offset (e.g., PpsActQpOffsetY, PpsActQpOffsetCb, PpsActQpOffsetCr, PpsActQpOffsetCbCr) value may be derived based on information related to the ACT QP offset signaled in the PPS (e.g., pps_act_y_qp_offset_plusX1, pps_act_cb_qp_offset_plusX2, pps_act_cr_qp_offset_plusX3, pps_act_cbcr_qp_offset_plusX4). Based on the ACT QP offset value derived as described above, quantization parameter values qP for luma, Cb, Cr components and joint CbCr may be derived as in the algorithm of Table 18 below.

TABLE 18

The quantization parameter qP is derived as follows:
- If cIdx is equal to 0, the following applies:
    qP = Qp'$_Y$
    ActQpOffset = PpsActQpOffsetY
- Otherwise, if TuCResMode[ xTbY ][ yTbY ] is equal to 2, the following applies:
    qP = Qp'$_{CbCr}$
    ActQpOffset = PpsActQpOffsetCbCr
- Otherwise, if cIdx is equal to 1, the following applies:
    qP = Qp'$_{Cb}$
    ActQpOffset = PpsActQpOffsetCb TABLE 18-continued

- Otherwise (cIdx is equal to 2), the following applies:
    qP = Qp'$_{Cr}$
    ActQpOffset = PpsActQpOffsetCr Alternatively, as another example, in signaling the ACT QP offset, multiple ACT QP offsets may be signaled for other modes of joint CbCr referred to as mode A and mode B. The joint CbCr mode A is mode 1 and mode 2 in Table 11 above, and may indicate a joint CbCr mode in which tu_cbf_cb is not 0. The joint CbCr mode B is mode 3 in Table 11 above, and may indicate a joint CbCr mode in which tu_cbf_cb is 0.

The following Table 19 is an example of a syntax table for signaling information related to multiple ACT QP offsets according to the joint CbCr mode in the PPS, and following Table 20 represents semantics for syntax elements included in the syntax table of Table 19.

TABLE 19

|  | Descriptor |
|---|---|
| pic_parameter_set_rbsp( ) { |  |
| ...... |  |
| pps_act_qp_offsets_present_flag | u(1) |
| if (pps_act_qp_offsets_present_flag) { |  |
|   pps_act_y qp_offset_plusX1 | se(v) |
|   pps_act_cb_qp_offset_plusX2 | se(v) |
|   pps_act_cr_qp_offset_plusX3 | se(v) |
|   pps_act_cbcr_qp_offset_modeA_plusX4 | se(v) |
|   pps_act_cbcr_qp_offset_modeB_plusX5 | se(v) |
|   } |  |
| ... |  |
| } |  |

TABLE 20 pps_act_y_qp_offset_plusX1, pps_act_cb_qp_offset plusX2, pps_act_cr_qp_offset_plusX3, pps_act_cbcr_qp_offset_modeA_plusX4 and pps_act_cbcr_ap_offset_modeB_plusX5 are used to determine the offsets that are applied to the quantization parameter values qP for the luma, Cb, Cr components and joint CbCr, respectively, when cu_act_enabled_flag is equal to 1. When not present, the values of pps_act_y_qp_offset_plusX1, pps_act_cb_qp_offset_plusX2 and pps_act_cr_qp_offset_plusX3 and pps_act_cbcr_qp_offset_modeA_plusX4 and pps_act_cbcr_qp_offset_modeB_plusX5 are inferred to be equal to 0.
The variable PpsActQpOffsetY is set equal to pps_act_y_qp_offset_plusX1 − X1.
The variable PpsActQpOffsetCb is set equal to pps_act_cb_qp_offset_plusX2 − X2.
The variable PpsActQpOffsetCr is set equal to pps_act_cr_qp_offset_plusX3 − X3.
The variable PpsActQpOffsetCbCrModeA is set equal to pps_act_cbcr_qp_offset_modeA_plusX4 − X4.
The variable PpsActQpOffsetCbCrModeB is set equal to pps_act_cbcr_qp_offset_modeB_plusX5 − X5.
NOTE - X1,X2, X3,X4, X5 above denote some constant values.
It is a requirement of bitstream conformance that the values of PpsActQpOffsetY, PpsActQpOffsetCb, and PpsActQpOffsetCr, PpsActQpOffsetCbCModeA, PpsActQpOffsetCbCrModeB shall be in the range of −12 to +12, inclusive.

Referring to Tables 19 and 20 above, the pps_act_qp_offsets_present_flag syntax element may be parsed/signaled in the PPS. Here, pps_act_qp_offsets_present_flag may be information indicating whether information related to the ACT QP offset exists in the PPS. For example, when the value of pps_act_qp_offsets_present_flag is 1, it may be indicated that information related to the ACT QP offset is present in the PPS, and when the value of pps_act_qp_offsets_present_flag is 0, it may be indicated that information related to the ACT QP offset is not present in the PPS.

For example, when the value of pps_act_qp_offsets_present_flag is 1, information related to the ACT QP offset may be parsed/signaled in the PPS. Here, the information related to the ACT QP offset may include pps_act_y_qp_offset_plusX1, pps_act_cb_qp_offset_plusX2, pps_act_cr_qp_offset_plusX3, pps_act_cbcr_qp_offset_modeA_plusX4, and pps_act_cbcr_qp_offset modeB_plusX5 syntax elements. pps_act_y_qp_offset_plusX1, pps_act_cb_qp_offset_plusX2, pps_act_cr_qp_offset_plusX3, pps_act_cbcr_qp_offset_modeA_plusX4, and pps_act_cbcr_qp_offset_modeB_plusX5 may be used to determine the offset applied to the quantization parameter value qP for the luma, Cb, Cr components and joint CbCr. As shown in Table 20, an ACT QP offset (e.g., PpsActQpOffsetY, PpsActQpOffsetCb, PpsActQpOffsetCr, PpsActQpOffsetCbCrModeA, PpsActQpOffsetCbCrModeB) value may be derived based on information related to the ACT QP offset signaled in the PPS (e.g., pps_act_y_qp_offset_plusX1, pps_act_cb_qp_offset_plusX2, pps_act_cr_qp_offset_plusX3, pps_act_cbcr_qp_offset_modeA_plusX4, pps_act_cbcr_qp_offset_modeB_plusX5). Based on the ACT QP offset value derived as described above, quantization parameter values qP for luma, Cb, Cr components and joint CbCr may be derived as in the algorithm of Table 21 below.

TABLE 21

The quantization parameter qP is derived as follows:
- If cIdx is equal to 0, the following applies:
  $qP = Qp'_Y$
  ActQpOffset = PpsActQpOffsetY
- Otherwise, if TuCResMode[ xTbY ][ yTbY ] is equal to 2, the following applies:
  $qP = Qp'_{CbCr}$
- Otherwise, if cIdx is equal to 1, the following applies:
  $qP = Qp'_{Cb}$
  ActQpOffset = PpsActQpOffsetCb
- Otherwise (cIdx is equal to 2), the following applies:
  $qP = Qp'_{Cr}$
  ActQpOffset = PpsActQpOffsetCr
if cIdx is not equal to 0 and TuCResMode[ xTbY ][ yTbY ] is not equal to 0, the following applies:
- ActQpOffset = (tu_cbf_cb[xTbY ][ yTbY ])? PpsActQpOffsetCbCrModeA: PpsActQpOffsetCbCrModeB Alternatively, as another example, in signaling the ACT QP offset, only the ACT QP offset for Y, Cb, and Cr may be signaled. In this case, the ACT QP offset for the joint CbCr may be derived based on PpsActQpOffsetY, PpsActQpOffsetCb, and/or PpsActQpOffsetCr. For example, the ACT QP offset for the joint CbCr may be set equal to PpsActQpOffsetCb. Alternatively, for example, when the joint CbCr mode is tu_cbf_cb!=0 (i.e., mode 1 and mode 2), the ACT QP offset for joint CbCr may be set as PpsActQpOffsetCb, while, when the joint CbCr mode is tu_cbf_cb==0 (i.e., mode 0), the ACT QP offset for the joint CbCr may be set as PpsActQpOffsetCr.

Table 22 below represents an example of a syntax table for signaling only information related to ACT QP offsets for Y, Cb, and Cr in PPS.

TABLE 22

| | Descriptor |
|---|---|
| pic_parameter_set_rbsp( ) { | |
| ...... | |
| pps_act_qp_offsets_present_flag | u(1) |

TABLE 22-continued

| | Descriptor |
|---|---|
| if (pps_act_qp_offsets_present_flag) { | |
| pps_act_y_qp_offset_plusX1 | se(v) |
| pps_act_cb_qp_offset_plusX2 | se(v) |
| pps_act_cr_qp_offset_plusX3 | se(v) |
| } | |
| ... | |
| } | |

Referring to Table 22 above, the pps_act_qp_offsets_present_flag syntax element may be parsed/signaled in the PPS. Here, pps_act_qp_offsets_present_flag may be information indicating whether information related to the ACT QP offset exists in the PPS. For example, when the value of pps_act_qp_offsets_present_flag is 1, it may be indicated that information related to the ACT QP offset is present in the PPS, and when the value of pps_act_qp_offsets_present_flag is 0, it may be indicated that information related to the ACT QP offset is not present in the PPS.

For example, when the value of pps_act_qp_offsets_present_flag is 1, information related to the ACT QP offset may be parsed/signaled in the PPS. Here, the information related to the ACT QP offset may include pps_act_y_qp_offset_plusX1, pps_act_cb_qp_offset_plusX2, and pps_act_cr_qp_offset_plusX3 syntax elements. pps_act_y_qp_offset_plusX1, pps_act_cb_qp_offset_plusX2, and pps_act_cr_qp_offset_plusX3 may be used to determine the offset applied to the quantization parameter value qP for the luma, Cb, Cr components and joint CbCr. As shown in Table 22, an ACT QP offset (e.g., PpsActQpOffsetY, PpsActQpOffsetCb, PpsActQpOffsetCr) value may be derived based on information related to the ACT QP offset signaled in the PPS (e.g., pps_act_y_qp_offset_plusX1, pps_act_cb_qp_offset_plusX2, pps_act_cr_qp_offset_plusX3). Based on the ACT QP offset value derived as described above, quantization parameter values qP for luma, Cb, Cr components and joint CbCr may be derived as in the algorithm of Table 23 below.

TABLE 23

The quantization parameter qP is derived as follows:
- If cIdx is equal to 0, the following applies:
  $qP = Qp'_Y$
  ActQpOffset = PpsActQpOffsetY
- Otherwise, if TuCResMode[ xTbY ][ yTbY ] is equal to 2, the following applies:
  $qP = Qp'_{CbCr}$
  ActQpOffset = (cIdx==1)? PpsActQpOffsetCb: PpsActQpOffsetCr
- Otherwise, if cIdx is equal to 1, the following applies:
  $qP = Qp'_{Cb}$
  ActQpOffset = PpsActQpOffsetCb
- Otherwise (cIdx is equal to 2), the following applies:
  $qP = Qp'_{Cr}$
  ActQpOffset = PpsActQpOffsetCr Meanwhile, an embodiment of this document proposes that the ACT QP offset is signaled at multiple levels. As described above, the ACT QP offset may be signaled at one level, such as the PPS, and the ACT QP offset may be signaled at a lower level, such as a slice header, a picture header, or other suitable header, to allow for finer QP control.

In one embodiment, ACT QP offset-related information may be signaled through multiple levels (i.e., PPS and slice header), and may be signaled as in the syntax tables of Tables 24 and 25 below. In this embodiment, a slice header is proposed as an example of a lower level, and however it is only an example, and ACT QP offset-related information may be signaled through a picture header (PH) or another header in a similar manner.

TABLE 24

| | Descriptor |
|---|---|
| pic_parameter_set_rbsp( ) { | |
| ...... | |
| pps_slice_act_qp_offsets_present_flag | u(1) |
| ... | |
| ... | |

TABLE 25

| | Descriptor |
|---|---|
| slice_header_rbsp( ) { | |
| ...... | |
| if (pps_slice_act_qp_offsets_present_flag) { | |
|   slice_act_y_qp_offset | se(v) |
|   slice_act_cb_qp_offset | se(v) |
|   slice_act_cr_qp_offset | se(v) |
|   if( sps_joint_cbcr_enabled_flag ) | |
|     slice_act_cbcr_qp_offset | se(v) |
|   ... | |
| } | |
| } | |

Table 26 below represents semantics of syntax elements included in the syntax tables of Tables 24 and 25.

TABLE 26 pps_slice_act_qp_offsets_present_flag equal to 1 specifies that slice_act_y_qp_offset, slice_act_cb_qp_offset, slice_act_cr_qp_offset and slice_act_cbcr_qp offset are present in the slice header. pps_slice_act_qp_offsets_present_flag equal to 0 specifies that slice_act_y_qp_offset, slice_act_cb_qp_offset, slice_act_cr_qp_offset are not present in the slice header. slice_act_y_qp_offset, slice_act_cb_qp_offset, slice_act_cr_qp_offset and slice_act_cbcr_qp_offset specify offsets to the quantization parameter values qP for luma, Cb, Cr components and joint CbCr, respectively. The values of slice_act_y_qp_offset, slice_act_cb_qp_offset, slice_act_cr_qp_offset and slice_act_cbcr_qp_offset shall be in the range of −12 to +12, inclusive. When not present, the values of slice_act_y_qp_offset, slice_act_cb_qp_offset, and slice_act_cr_qp_offset are inferred to be equal to 0. The value of PpsActQpOffsetY + slice_act_y_qp_offset, the value of PpsActQpOffsetCb + slice_act_cb_qp_offset, the value of PpsActQpOffsetCr + slice_act_cr_qp_offset and the value of PpsActQpOffsetCbCr + slice_act_cbcr_qp_offset shall all be in the range of −12 to +12, inclusive.

Referring to Tables 24 to 26, the pps_act_qp_offsets_present_flag syntax element may be parsed/signaled at a higher level (e.g., PPS). Here, pps_act_qp_offsets_present_flag may be information indicating whether information related to the ACT QP offset is present in a lower level (e.g., a slice header). For example, when the value of pps_act_qp_offsets_present_flag is 1, it may be indicated that information related to the ACT QP offset is present at a lower level (e.g., slice header), and when the value of pps_act_qp_offsets_present_flag is 0, it may be indicated that information related to the ACT QP offset is not present at a lower level (e.g., slice header).

Based on pps_act_qp_offsets_present_flag signaled at a higher level (e.g., PPS), information related to an ACT QP offset may be parsed/signaled at a lower level (e.g., slice header). Here, information related to the ACT QP offset may include slice_act_y_qp_offset, slice_act_cb_qp_offset, slice_act_cr_qp_offset, and slice_act_cbcr_qp_offset syntax elements.

Additionally, in signaling ACT QP offset-related information through multiple levels, a method of deriving the ACT QP offset for the joint CbCr based on the ACT QP offset (ACTQpOffset) of Y, Cb, Cr and/or the joint CbCr mode may be applied without 1) signaling one ACT QP offset for joint CbCr or 2) signaling multiple ACT QP offsets for other modes of joint CbCr or 3) signaling ACT QP offset for the joint CbCr as in the above-described embodiments. For example, as shown in Table 24 above, pps_act_qp_offsets_present_flag may be signaled in the PPS, and ACT QP offset related-information may be signaled in the slice header based on the pps_act_qp_offsets_present_flag.

Following Table 27 is a syntax table representing an example of signaling multiple ACT QP offsets in a slice header for the above-described 2) other modes of joint CbCr, and following Table 28 is a syntax table representing an example of a method of deriving the ACT QP offset for the joint CbCr based on the ACT QP offset (ACTQpOffset) of Y, Cb, Cr and/or the joint CbCr mode without 3) signaling the ACT QP offset for the joint CbCr as described above.

TABLE 27

| | Descriptor |
|---|---|
| slice_header_rbsp( ) { | |
| ...... | |
| if (pps_slice_act_qp_offsets_present_flag) { | |
|   slice_act_y_qp_offset | se(v) |
|   slice_act_cb_qp_offset | se(v) |
|   slice_act_cr_qp_offset | se(v) |
|   if( sps_joint_cbcr_enabled_flag ) | |
|     slice_act_cbcr_qp_offset | se(v) |
|     slice_act_cbcr_qp_offset_modeB | se(v) |
|   } | |
| ... | |
| } | |
| } | |

TABLE 28

| | Descriptor |
|---|---|
| slice_header_rbsp( ) { | |
| ...... | |
| if (pps_slice_act_qp_offsets_present_flag) { | |
|   slice_act_y_qp_offset | se(v) |
|   slice_act_cb_qp_offset | se(v) |
|   slice_act_cr_qp_offset | se(v) |
| } | |
| ... | |
| } | |

In Table 28 above, only the ACT QP offsets of Y, Cb, and Cr are signaled, and the ACT QP offset at the slice level for the joint CbCr may be derived based on slice_act_y_qp_offset, slice_act_cb_qp_offset and/or slice_act_cr_qp_offset. Additionally, it may also vary depending on the mode type of the joint CbCr. For example, the ACT QP offset (QpOffset) at the slice level for CbCr may be set equal to slice_act_cb_qp_offset. Alternatively, for example, when the joint CbCr mode is tu_cbf_cb!=0 (i.e., mode 1 and mode 2), the ACT QP offset at the slice level for the joint CbCr may be set as slice_act_cb_qp_offset, while, when the joint CbCr mode is tu_cbf_cb==0 (i.e., mode 0), the ACT QP offset at the slice level for the joint CbCr may be set as slice_act_cr_qp_offset.

Also, in an embodiment, when signaling ACT QP offset-related information through multiple levels, one of a slice header or a picture header may signal ACT QP offset-related information. This method may be applied as follows.

A flag (e.g., referred to as pps_picture_slice_act_qp_offsets_present_flag) may be signaled in the PPS, and the pps_picture_slice_act_qp_offsets_present_flag may indicate whether the ACT QP offset may be present in either the picture header or the slice header.

When ACT is enabled and pps_picture_slice_act_qp_offsets_present_flag is 1, a flag (e.g., referred to as pic_act_qp_offsets_present_flag) may be signaled in the picture header. The pic_act_qp_offsets_present_flag may indicate whether the ACT QP offset is present in the picture header. When the value of pic_act_qp_offsets_present_flag is 1, ACT QP offsets for all slices of the picture associated with the picture header may be present in the picture header.

When ACT is enabled and pps_picture_slice_act_qp_offsets_present_flag is 1 and pic_act_qp_offsets_present_flag is 0, the ACT QP offset for the slice may be present in the slice header.

The method of signaling ACT QP offset-related information in one of a slice header or a picture header together with signaling at a higher level (e.g., PPS) as described above may be implemented as in the syntax tables of Tables 29 to 31 below.

TABLE 29

| | Descriptor |
|---|---|
| pic_parameter_set_rbsp( ) { | |
|   pps_pic_slice_act_qp_offsets_present_flag | u(1) |

TABLE 30

| | Descriptor |
|---|---|
| picture_header_rbsp( ) { | |
|   if( pps_pic_slice_act_qp_offsets_present_flag) { | |
|     pic_act_qp_offsets_present_flag | u(1) |

TABLE 30-continued

| | Descriptor |
|---|---|
|     if( pic_act_qp_offsets_present_flag ) { | |
|       slice_act_y_qp_offset | se(v) |
|       slice_act_cb_qp_offset | se(v) |
|       slice_act_cr_qp_offset | se(v) |
|     } | |
|   } | |
| } | |

TABLE 31

| | Descriptor |
|---|---|
| slice_header_rbsp( ) { | |
|   if( pps_pic_slice_act_qp_offsets_present_flag | |
|     && !pic_act_qp_offsets_present_flag) { | |
|     slice_act_y_qp_offset | se(v) |
|     slice_act_cb_qp_offset | se(v) |
|     slice_act_cr_qp_offset | se(v) |
|   } | |
| } | |

The following Table 32 represents the semantics of the syntax elements included in the syntax table of Table 29; the following Table 33 represents the semantics of the syntax elements included in the syntax table of Table 30; and the following Table 34 represents the semantics of the syntax elements included in the syntax table of Table 31.

TABLE 32 pps_pic_slice_act_qp_offsets_present_flag equal to 1 specifies that ACT Qp offsets may be present either in picture header or in slices header. pps_pic_slice_act_qp_offsets_present_flag equal to 0 specifies that no ACT Qp offsets are present in picture header nor in slice header. When not present, the value of pps_pic_slice_act_qp_offsets_present_flag is inferred to be equal to 0.

TABLE 33 pic_act_qp_offsets_present_flag equal to 1 specifies that ACT Qp offsets are present in picture header. pic_act_qp_offsets_present_flag equal to 0 specifies that no ACT Qp offsets are present in picture header but may be present in slice header. When not present, the value of pic_act_qp_offsets_present flag is inferred to be equal to 0.

TABLE 34 slice_act_y_qp_offset, slice_act_cb_qp_offset, slice_act_cr_qp_offset and slice_act_cbcr_qp_offset specify offsets to the quantization parameter values qP for luma, Cb, and Cr components, respectively. The values of slice_act_y_qp_offset, slice_act_cb_qp_offset, slice_act_cr_qp_offset and slice_act_cbcr_qp_offset shall be in the range of −12 to +12, inclusive. The value of PpsActQpOffsetY + slice_act_y_qp_offset shall be in the range of −12 to +12, inclusive. The value of PpsActQpOffsetCb + slice_act_cb_qp_offset shall be in the range of −12 to +12, inclusive. The value of PpsActQpOffsetCr + slice_act_cr_qp_offset shall be in the range of −12 to +12, inclusive.
When not present, the following applies:
  - If pps_pic_slice_act_qp_offsets_present_flag is equal to 0, the values of slice_act_y_qp_offset, slice_act_cb_qp_offset, and slice_act_cr_qp_offset are inferred to be equal to 0.
  - Otherwise (i e., pic_act_qp_offsets_present_flag is equal to 1), the values of slice_act_y_qp_offset, slice_act_cb_qp_offset, and slice_act_cr_qp_offset are inferred to be equal to pps_act_y_qp_offset, pps_act_cb_qp_offset, and pps_act_cr_qp_offset, respectively.

Further, in one embodiment, when the ACT QP offset is also present in the slice header or the picture header, the final offset used to derive the qP value may be the offset derived by the sum of the offsets signaled in the PPS and the slice header/picture header. In this case, the final offset (ActQpOffset) used to derive the qP value may be derived as in the algorithms of Tables 35 to 37 below.

TABLE 35

The quantization parameter qP is derived as follows:
- If cIdx is equal to 0, the following applies:
  $qP = Qp'_Y$
  ActQpOffset = PPsQpOffsetY + slice_act_y_qp_offset
- Otherwise, if TuCResMode[ xTbY ][ yTbY ] is equal to 2, the following applies:
  $qP = Qp'_{CbCr}$
  ActQpOffset = PPsQpOffsetCbCr + slice_act_CbCr_qp_offset
Otherwise, if cIdx is equal to 1, the following applies:
  $qP = Qp'_{Cb}$
  ActQpOffset = PpsActQpOffsetCb + slice_act_Cb_qp_offset
Otherwise (cIdx is equal to 2), the following applies:
  $qP = Qp'_{Cr}$
  ActQpOffset = PpsActQpOffsetCr + slice_act_Cr_qp_offset Alternatively, in an example, when multiple ACT QP offsets for the joint CbCr mode are signaled, the ACT QP offsets (ActQpOffset) for the joint CbCr may be set as in the algorithm of Table 36 below.

TABLE 36

- If cIdx is equal to 0, the following applies:
  $qP = Qp'_Y$
  ActQpOffset = PPsQpOffsetY + slice_act_y_qp_offset
Otherwise, if TuCResMode[ xTbY ][ yTbY ] is equal to 2, the following applies:
  $qP = Qp'_{CbCr}$
Otherwise, if cIdx is equal to 1, the following applies:
  $qP = Qp'_{Cb}$
  ActQpOffset = PpsActQpOffsetCb + slice_act_Cb_qp_offset
Otherwise (cIdx is equal to 2), the following applies:
  $qP = Qp'_{Cr}$
  ActQpOffset = PpsActQpOffsetCr + slice_act_Cr_qp_offset
If (cIdx is not equal to 0 and TuCResMode[ xTbY ][ yTbY ] is not equal to 0, the following applies:
  ActQpOffset = (tu_cbf_cb[xTbY ][ yTbY ])?
  (PPsQpOffsetCbCrModeA+ slice_act_CbCr_qp_offset_ModeA):
  (PPsQpOffsetCbCrModeB + slice _act_CbCr_qp_offset_ModeB)

Also, in one embodiment, when there is no ACT QP offset for joint CbCr and the ACT QP offset for joint CbCr is derived using the ACT QP offset of Y, Cb and/or Cr components, the ACT QP offset (ActQpOffset) for the joint CbCr mode may be set as in the algorithm of Table 37 below.

TABLE 37

- Otherwise, if TuCResMode xTbY ][ yTbY ] is equal to 2, the following applies:
  $qP = Qp'_{CbCr}$
  ActQpOffset = (cIdx==1 ] )? (PPsQpOffsetCb + slice_act_Cb_qp_offset):
  (PPsQpOffsetCr + slice_act_Cr_qp_offset)

Meanwhile, an embodiment of the present document proposes a method of having a list of ACT QP offsets. This method may be applied as follows.
a) Multiple ACT QP offset sets may be signaled as a list in a parameter set (e.g., SPS or PPS). Each set in the list may include ACT QP offsets for Y, Cb, Cr and joint CbCr components.
  For simplicity, the ACT QP offset list may be signaled in the same parameter set as the signaling of the chroma QP offset list.

b) The number of ACT QP offsets set in the list may be the same as the number of chroma QP offset sets signaled in the PPS.
c) When deriving the qP for each CU, the ACT QP offset used may be one offset indicated by an index (i.e., cu_chroma_qp_offset_idx) to the CU chroma QP offset in the list.
d) Alternatively, the following may be applied to for items b) and c).
  The number of ACT QP offset sets in the list may be signaled, which may be different from the number of chroma QP offset sets.
  When the ACT is enabled, an index for indicating the index of the AQT QP offset used for the CU may be signaled.

As an example, the above-described method of having the list of ACT QP offsets may be implemented as in the syntax table of Table 38 below.

TABLE 38

| | Descriptor |
|---|---|
| pic_parameter_set_rbsp( ) { | |
| ... | |
| pps_cb_qp_offset | se(v) |
| pps_cr_ap_offset | se(v) |
| pps_joint_cbcr_qp_offset_present_flag | u(1) |
| if( pps_joint_cbcr_qp_offset_present_flag ) | |
|   pps_joint_cbcr_qp_offset_value | se(v) |
| pps_slice_chroma_qp_offsets_present_flag | u(1) |
| pps_cu_chroma_qp_offset_list_enabled_flag | u(1) |
| if( pps_cu_chroma_qp_offset_list_enabled_flag ) { | |
|   chroma_qp_offset_list_len_minus1 | ue(v) |
|   for( i = 0; i <= chroma_qp_offset_list_len_minus1; i++ ) { | |
|     cb_ap_offset_list[ i ] | se(v) |
|     cr_qp_offset_list[ i ] | se(v) |
|     if( pps_joint_cbcr_qp_offset_present_flag ) | |
|       joint_cbcr_qp_offset_list[ i ] | se(v) |
|   } | |
| } | |
| pps_act_qp_offsets_present_flag | u(1) |
| if( pps_act_qp_offsets_present_flag ) | |
|   pps_act_y_qp_offset | se(v) |
|   pps_act_cb_qp_offset | se(v) |
|   pps_act_cr_qp_offset | se(v) |
|   if( pps_joint_cbcr_qp_offset_present_flag ) | |
|     pps_act_cbcr_qp_offset | se(v) |
| pps_cu_act_qp_offset_list_enabled_flag | u(1) |
| if( pps_cu_act_qp_offset_list_enabled_flag ) { | |
|   for( i = 0; i <= chroma_qp_offset_list_len_minus1; i++ ) { | |
|     act_y_qp_offset_list[ i ] | se(v) |
|     act_cb_qp_offset_list[ i ] | se(v) |
|     act_cr_qp_offset_list[ i ] | se(v) |
|     if( pps_joint_cbcr_qp_offset_present_flag ) | |
|       act_cbcr_qp_offset_list[ i ] | se(v) |
|   } | |
| } | |
| } | |
| ... | |
| } | |

Table 39 below represents semantics of syntax elements included in the syntax tables of Table 38.

TABLE 39 pps_act_y_qp_offset, pps_act_cb_qp_offset, pps_act_cr_qp_offset, and pps_act_cbcr_qp_offset are used to determine the offsets that are applied to the quantization parameter values qP for the luma, Cb, Cr components and joint CbCr, respectively, when cu_act_enabled_flag is equal to 1.
When not present, the values of pps_act_y_qp_offset, pps_act_cb_qp_offset and pps_act_cr_qp_offset, and pps_act_cbcr_qp_offset are inferred to be equal to 0.

TABLE 39-continued act_y_qp_offset_list[ i ], act_cb_qp_offset_list[ i ], act_cr_qp_offset_list[ i ], and act_cbcr_qp_offset_list[ i ] are used to determine the offsets that are applied to the quantization parameter values qP for the luma, Cb, Cr components and joint CbCr, respectively, when cu_act_enabled_flag is equal to 1 and cu_chroma_qp_offset_flag is equal to 1. When not present, the values of act_y_qp_offset_list[ i ], act_cb_qp_offset_list[ i ] and act_cr_qp_offset_list[ i ], and act_cbcr_qp_offset_list [ i ] are inferred to be equal to 0.

In addition, the following Table 40 represents an example of an algorithm for deriving the final offset (ActQpOffset) used to derive the qP value for each component based on the syntax elements related to the ACT QP offset signaled in Table 39 above.

TABLE 40

The quantization parameter qP is derived as follows:
- If cIdx is equal to 0, the following applies:
  qP = Qp'$_Y$
  ActQpOffset = pps_act_y_qp_offset + ( cu_chroma_qp_offset_flag ) ? act_y_qp_offset_list[ cu_chroma_qp_offset_idx ] : 0 + slice_act_y_qp_offset
Otherwise, if TuCResMode[ xTbY ][ yTbY ] is equal to 2, the following applies:
  qP = Qp'$_{CbCr}$
  ActQpOffset = pps_act_cbcr_qp_offset + ( cu_chroma_qp_offset_flag) ? act_cbcr_qp_offset_list[ cu_chroma_qp_offset_idx ] : 0 + slice_act_cbcr_qp_offset
Otherwise, if cIdx is equal to 1, the following applies:
  qP = Qp'$_{Cb}$
  ActQpOffset = pps_act_cb_qp_offset + ( cu_chroma_qp_offset_flag) ? act_cb_qp_offset_list[ cu_chroma_qp_offset_idx ] : 0 + slice_act_cb_qp_offset
Otherwise (cIdx is equal to 2), the following applies:
  qP = Qp'$_{Cr}$
  ActQpOffset = pps_act_cr_qp_offset + ( cu_chroma_qp_offset_flag ) ? act_cr_qp_offsetjist[ cu_chroma_qp_offset_idx ] : 0 + slice_act_crqp_offset Meanwhile, in one embodiment of this document, it is proposed that ACT uses reversible color conversion to support both lossless and lossy coding. This reversible color transform may replace the conventional lossy color transform in current VVC. The ACT QP offset may also be adjusted to conform to the color transform. As an example, the reversible color transform may be as in Table 41 below.

TABLE 41

| Forward Conversion: GBR to YCgCo | Backward Conversion: YCgCo to GBR |
|---|---|
| Co = R−B; | t = Y − (Cg>>1) |
| t = B + (Co>>1); | G = Cg + t |
| Cg = G − t; | B = t − (Co>>1) |
| Y = t + (Cg>>1); | R = Co + B |

The transform is a reversible (full reconstruction support) YCgCo-R color transform, where R represents reversibility. This YCgCo-R transform increases the bit depths of Cg and Co by 1. Other types of reversible transform may also be used.

Because reversible color transform may have a different standard than that of VVC's conventional YCgCo color transform, the ACT QP offsets for Y, Cg, and Co must be adjusted to compensate for change in the dynamic range due to color transform. In the current VVC, ACT QP offsets (−5, −5, −5) are used for Y, Cg, and Co. For the reversible transform, an ACT QP offset value other than (−5, −5, −5) may be defined. For example, in YCgCo-R transform, ACT QP offsets (−5, 1, 3) for Y, Cg, and Co may be used.

Alternatively, the ACT QP offset may be signaled as in the embodiments described in Tables 16 to 36 above. In particular, when the above-described YCgCo-R transform uses the ACT QP offset (−5, 1, 3) together, it was reported that no coding loss was observed in the lossy coding environment (QP 22,27,32,37) as shown in Table 42 below. In addition, ACT may be utilized for lossless coding that can obtain coding performance of 5% or more.

TABLE 42

| Sequence | Y | U | V |
|---|---|---|---|
| RGB, TGM 1080p | 0.0% | 0.2% | 0.1% |
| RGB, TGM 720p | 0.2% | −0.1% | 0.1% |
| RGB, Animation | −0.1% | −0.1% | 0.0% |
| RGB, Mixed content | −0.1% | 0.0% | −0.1% |
| RGB, Camera-Captured content | −0.3% | 0.2% | −0.3% |
| Overall All (RGB) | 0.0% | 0.0% | 0.0% |

Table 43 below represents a part of the VVC specification including the unified ACT matrix, and is modified to implement the above-described embodiment.

TABLE 43

Residual modification process for blocks using colour space conversion

Inputs to this process are:
- a variable nTbW specifying the block width,
- a variable nTbH specifying the block height,
- an (nTbW)×(nTbH) array of luma residual samples r$_Y$ with elements r$_Y$[ x ][ y ],
- an (nTbW)×(nTbH) array of chroma residual samples T$_{Cb}$ with elements r$_{Cb}$[ x ][ y ],
- an (nTbW)×(nTbH) array of chroma residual samples r$_{Cr}$ with elements r$_{Cr}$[ x ][ y ].
Outputs of this process are:
- a modified (nTbW)×(nTbH) array r$_Y$ of luma residual samples,
- a modified (nTbW)×(nTbH) array r$_{Cb}$ of chroma residual samples,
- a modified (nTbW)×(nTbH) array r$_{Cr}$ of chroma residual samples.
The (nTbW)×(nTbH) arrays of residual samples r$_Y$, r$_{Cb}$ and r$_{Cr}$ are modified as follows:
  tmp = r$_Y$[ x ][ y ] − (r$_{Cb}$[ x ][ y ] >>1)
  r$_Y$[ x ][ y ] = tmp + r$_{Cb}$[ x ][ y ]
  r$_{Cb}$[ x ][ y ]= tmp − (r$_{Cr}$[ x ][ y ] >>1)
  r$_{Cr}$[ x ][ y ] = r$_{Cb}$[ x ][ y ] + r$_{Cr}$[ x ][ y ]

Meanwhile, an embodiment of this document proposes a method for enabling one or more color transform to be used in ACT. The color transform to be used may vary according to flag(s) signaled through the bitstream. The flag(s) may be signaled at multiple levels or granularity including SPS, PPS, picture header and slice.

In an example, a flag may be signaled to indicate which ACT is to be applied. For example, when the flag is 1, reversible color transform-based ACT may be applied. When the flag is 0, the irreversible color transform-based ACT may be applied.

In another example, a flag specifying ACT may be signaled to indicate color transform to be used. In this case, an example of the syntax element signaled by the SPS may be as in Table 44 below.

TABLE 44

| | Descriptor |
|---|---|
| seq_parameter_set_rbsp( ) { | |
| ... | |
| sps_act_reversible_conversion | u(1) |

Table 45 below represents semantics of syntax elements included in the syntax tables of Table 44.

TABLE 45 sps_act_ reversible_conversion equal to 1 specifies that Adaptive Color Transform (ACT) uses reversible conversion formula, equal to 0 specifies that ACT uses non-reversible conversion formula.
Variable lossyCoding is set as ( !sps_act_ reversible _conversion)

In addition, based on the lossyCoding flag (e.g., sps_act_reversible_conversion) used to derive the value for the variable lossyCoding in Table 45 above, the decoder may perform inverse transform from YCgCo to GBR, which may be implemented with pseudo code as in Table 46 and Table 47 below.

TABLE 46

```
If (sps_act_ reversible _conversion == 1)
{
    // YCgCo-R reversible conversion
    t = Y - (Cg>>1)
    G = Cg + t
    B = t - (Co>>1)
    R = Co + B
}
else {
    t = Y - Cg
    G = Y + Cg
    B = t - Co
    R = t + Co
}
```

TABLE 47

Residual modification process for blocks using colour space conversion
Inputs to this process are:
- a variable nTbW specifying the block width,
- a variable nTbH specifying the block height,
- an (nTbW)×(nTbH) array of luma residual samples $r_Y$ with elements $r_Y[\ x\ ][\ y\ ]$,
an (nTbW)×(nTbH) array of chroma residual samples $r_{Cb}$ with elements $r_{Cb}[\ x\ ][\ y\ ]$,
- an (nTbW)×(nTbH) array of chroma residual samples $r_{Cr}$ with elements $r_{Cr}[\ x\ ][\ y\ ]$.
Outputs of this process are:
- a modified (nTbW)×(nTbH) array $r_Y$ of luma residual samples.
- a modified (nTbW)×(nTbH) array $r_{Cb}$ of chroma residual samples,
- a modified (nTbW)×(nTbH) array $r_{Cr}$ of chroma residual samples.
The (nTbW)×(nTbH) arrays of residual samples $r_Y$, $r_{Cb}$ and $r_{Cr}$ are modified as follows:
- If sps_act_ reversible _conversion equal to 1, the (nTbW)×(nTbH) arrays of residual samples $r_Y$, $r_{Cb}$ and $r_{Cr}$ are modified as follows
    tmp = $r_Y[\ x\ ][\ y\ ]$ - ($r_{Cb}[\ x\ ][\ y\ ]$ >>1)
    $r_Y[\ x\ ][\ y\ ]$ = tmp + $r_{Cb}[\ x\ ][\ y\ ]$
    $r_{Cb}[\ x\ ][\ y\ ]$ = tmp - ($r_{Cr}[\ x\ ][\ y\ ]$ >>1)
    $r_{Cr}[\ x\ ][\ y\ ]$ = $r_{Cb}[\ x\ ][\ y\ ]$ + $r_{Cr}[\ x\ ][\ y\ ]$
- Otherwise, the (nTbW)×(nTbH) arrays of residual samples $r_Y$, $r_{Cb}$ and $r_{Cr}$ are modified as follows
    tmp = $r_Y[\ x\ ][\ y\ ]$ - $r_{Cb}[\ x\ ][\ y\ ]$
    $r_Y[\ x\ ][\ y\ ]$ = $r_Y[\ x\ ][\ y\ ]$ + $r_{Cb}[\ x\ ][\ y\ ]$
    $r_{Cb}[\ x\ ][\ y\ ]$ = tmp - $r_{Cr}[\ x\ ][\ y\ ]$
    $r_{Cr}[\ x\ ][\ y\ ]$ = tmp + $r_{Cr}[\ x\ ][\ y\ ]$ Meanwhile, there are some similarities between the YCgCo inverse transform and the YCgCo-R inverse transform. In the reversible transform, when Cg and Co are replaced by Cg'=Cg<<1 and $C_0$'=Co<<1, it becomes the same as the lossy inverse transform. It may be performed as in Table 48 below.

TABLE 48

```
t = Y - (Cg'>>1) = Y - Cg
G = Cg' + t = Y +Cg
```

TABLE 48-continued

```
B = t - (Co'>>1) = t - Co = Y - Cg - Co
R = Co' + B = t + Co = Y - Cg + Co
```

Thus, in another embodiment, instead of maintaining two color transforms, only a reversible transform may be used. For lossy coding, the Cg, Co components are scaled by ½ at the encoder side and scaled by 2 at the decoder side. The advantage to this is that there is only one unified transform for the lossy and lossless cases and the bit depth is kept unchanged for lossy coding.

Table 49 below represents an example of inverse transform from YCgCo to GBR.

TABLE 49

Backward Conversion: YCgCo to GBR

```
If (lossyCoding)
{
    Cg = Cg << 1;
    Co = Co << 1;
}
t = Y - (Cg>>1)
G = Cg + t
B = t - (Co>>1)
R = Co + B
```

For example, a flag (e.g., actShiftFlag) for indicating the ACT transform to be used may be used as in Table 50 below. Table 50 below represents an example of signaling a flag (e.g., actShiftFlag) for indicating which ACT transform is used in the SPS.

TABLE 50

| | Descriptor |
|---|---|
| seq_parameter_set_rbsp( ) { | |
| ... | |
| sps_act_shift_flag | u(1) |
| ... | |

Table 51 below represents semantics of syntax elements included in the syntax tables of Table 50.

TABLE 51 sps_act_ shift_flag equal to 1 specifies that a step to shift color component is applied during Adaptive Color Transform (ACT), equal to 0 specifies that the step to shfit the color component is not applied during ACT.
Variable actShift Flag is set equal to sps_act_shift_flag.

In addition, when the actShiftFlag of Table 50 above is used, the decoder may perform inverse transform from YCgCo to GBR based on the flag actShiftFlag, which may be implemented in a pseudo code as in Table 52 below.

TABLE 52

Backward Conversion: YCgCo to GBR

```
If (actShiftFlag)
{
    Cg = Cg << 1;
    Co = Co << 1;
}
t = Y - (Cg>>1)
G = Cg + t
B = t - (Co>>1)
R = Co + B
```

Meanwhile, an embodiment of this document proposes a method for enabling one or more color transform to be used in ACT. In this case, the color transform type to be used may be inferred from other information signaled through the bitstream.

In an example, two types of ACT transform, including a reversible ACT transform and an irreversible ACT transform, may be available. The ACT transform type may be inferred from the transform type. For example, if the transform type is transform skip (indicated by the variable tuIsTransformSkip), a reversible ACT transform may be used. Otherwise, an irreversible ACT transform can be used. The two ACT transform types may be implemented in pseudo codes as in Tables 53 and 54 below.

TABLE 53

Backward Conversion: YCgCo to GBR

```
If (tuIsTransformSkip)
{
    // YCgCo-R reversible conversion
    t = Y - (Cg>>1)
    G = Cg + t
    B = t - (Co>>1)
    R = Co + B
}
else {
    t = Y - Cg
    G = Y + Cg
    B = t - Co
    R = t + Co
}
```

TABLE 54

Backward Conversion: YCgCo to GBR

```
If (tuIsTransformSkip)
{
    Cg = Cg << 1;
    Co = Co << 1;
}
t = Y - (Cg>>1)
G = Cg + t
B = t - (Co>>1)
R = Co + B
```

In another example, the ACT transform type may vary according to the QP value. If the QP value is less than or equal to a threshold value (e.g., QpPrimeTsMin), reversible ACT transform may be used. Otherwise, an irreversible ACT transform can be used.

Meanwhile, in the embodiment described above with reference to Tables 4 to 8, a method of clipping the QP derived based on the ACT QP offset of each color component has been proposed. More specifically, the proposed method assumes that QP including Qp'y, Qp'$_{Cbcr}$, Qp'$_{Cb}$, and Qp'$_{Cr}$ has already been derived. And, to modify the derived QP (Qp'y, Qp'$_{Cbcr}$, Qp'$_{Cb}$, Qp'$_{Cr}$) based on the ACT QP offset, and to ensure that the modified QP for transform coefficient scaling does not go out of range, the necessary clipping process is added.

In this regard, an embodiment of the present document proposes a method of unifying the ACT QP offset into the QP derivation process for deriving Qp'y, Qp'$_{Cbcr}$, Qp'$_{Cb}$, and Qp'$_{Cr}$. Since the QP derivation process already includes clipping steps to prevent the derived QP from going out of range, the unifying of the ACT QP offset into the QP derivation process can ensure that the final QP does not go out of range, and it is possible to avoid additional clipping steps and simplify the whole QP derivation process for the transform coefficient scaling process.

As described above, the ACT QP offset may be defined as a constant or signaled. For example, the ACT QP offset for each color component Y, Cb, Cr, and CbCr may be expressed as ppsActQpOffsetY, ppsActQpOffsetCb, ppsActQpOffsetCr, ppsActQpOffsetCbCr as in Table 55 below. Also, the ACT QP offset for each color component Y, Cb, Cr and CbCr may be a constant or variable ranging from −M to +N, where M and N may become, for example, 12 for lossy and 0 for lossless. One or more ACT QP offsets may be derived from other ACT QP offset values. For example, ppsActQpOffsetCbCr may be set to ppsActQpOffsetCb and ppsActQpOffsetCr according to the joint CbCr mode.

In an embodiment, the above-described ACT QP offset-based QP derivation process may be implemented as in Table 55 below. Table 55 represents an example of applying the above-described embodiment to a scaling process for a transform coefficient and a derivation process for a quantization parameter in the specification of VVC.

TABLE 55

8.7.1 Derivation process for quantization parameters

Inputs to this process are:
- a luma location (xCb, yCb) specifying the top-left luma sample of the current coding block relative to the top-left luma sample of the current picture,
- a variable cbWidth specifying the width of the current coding block in luma samples,
- a variable cbHeight specifying the height of the current coding block in luma samples,
- a variable treeType specifying whether a single tree (SINGLE TREE) or a dual tree is used to partition the coding tree node and, when a dual tree is used, whether the luma (DUAL_TREE_LUMA) or chroma components (DUAL_TREE_CHROMA) are currently processed.

In this process, the luma quantization parameter Qp'y and the chroma quantization parameters Qp'$_{Cb}$, Qp'$_{Cr}$ and Qp'$_{CbCr}$ are derived.

.........

The variable Qp$_Y$ is derived as follows:

Qp$_Y$ = ( ( qP$_{Y\_pred}$ + CuQpDeltaVal + 64 + 2 * QpBdOffset) % ( 64 + QpBdOffset ) ) − QpBdOffset         (1116)

The luma quantization parameter Qp'$_Y$ is derived as follows:
    actQpOffsetY = cu_act_enabled_flag[ xCb ][ yCb ] ? ppsActQpOffsetY : 0
    Qp'$_Y$ = Qp$_Y$ + QpBdOffset + actQpOffsetY         (1117)
    Qp'$_Y$ = Clip3(0, 63+ QpBdOffset, Qp'$_Y$)

TABLE 55-continued

When ChromaArrayType is not equal to 0 and treeType is equal to SINGLE_TREE
or DUAL_TREE_CHROMA, the following applies:
- When treeType is equal to DUAL_TREE_CHROMA, the variable $Qp_Y$ is set equal to
the luma quantization parameter $Qp_Y$ of the luma coding unit that covers the luma
location (xCb + cbWidth / 2, yCb + cbHeight / 2 ).
- The variables $qP_{Cb}$, $qP_{Cr}$ and $qP_{CbCr}$ are derived as follows:
    $qP_{Chroma}$ = Clip3 ( -QpBdOffset, 63, $Qp_Y$ )     (1118)
    $qP_{Cb}$ = ChromaQpTable[ 0 ][ $qP_{Chroma}$ ]     (1119)
    $qP_{Cr}$ = ChromaQpTable[ 1 ][ $qP_{Chroma}$ ]     (1120)
    $qP_{CbCr}$ = ChromaQpTable[ 2 ] [ $qP_{Chroma}$ ]     (1121)
- The chroma quantization parameters for the Cb and Cr components, $Qp'_{Cb}$ and
$Qp'_{Cr}$, and joint Cb-Cr coding $Qp'_{CbCr}$ are derived as follows:
    actQpOffsetCb = cu_act_enabled_flag[ xCb ][ yCb ] ? ppsActQpOffsetCb : 0
    actQpOffsetCr = cu_act_enabled_flag[ xCb ][ yCb ] ? ppsActQpOffsetCr : 0
    actQpOffsetCbCr = cu_act_enabled_flag[ xCb ][ yCb ] ? ppsActQpOffsetCbCr : 0
    $Qp'_{Cb}$ = Clip3( -QpBdOffset, 63, $qP_{Cb}$ + pps_cb_qp_offset + slice_cb_qp_offset
+ CuQpOffset$_{Cb}$ + actQpOffsetCb) + QpBdOffset     (1122)
    $Qp'_{Cr}$ = Clip3( -QpBdOffset, 63, $qP_{Cr}$ + pps_cr_qp_offset + slice_cr_qp_offset + CuQpOffset$_{Cr}$ + actQpOffsetCr) + QpBdOffset     (1123)
    $Qp'_{CbCr}$ = Clip3( -QpBdOffset, 63, qPcbCr + pps_joint_cbcr_qp_offset +
slice_joint_cbcr_ap_offset +CuQpOffset$_{CbCr}$ +
actQpOffsetCbCr) + QpBdOffset     (1124)

8.7.3 Scaling process for transform coefficients

Inputs to this process are:
a luma location (xTbY, yTbY) specifying the top-left sample of the current luma
transform block relative to the top-left luma sample of the current picture,
- a variable nTbW specifying the transform block width,
a variable nTbH specifying the transform block height,
- a variable predMode specifying the prediction mode of the coding unit,
a variable cIdx specifying the colour component of the current block.
Output of this process is the (nTbW)x(nTbH) array d of scaled transform coefficients with
    elements d[ x ][ y ].
The quantization parameter qP is derived as follows:
- If cIdx is equal to 0, the following applies:
    qP = $Qp'_Y$     (1129)
- Otherwise, if TuCResMode xTbY ][ yTbY ] is equal to 2, the following applies:
    qP = $Qp'_{CbCr}$     (1130)
Otherwise, if cIdx is equal to 1, the following applies:
    qP = $Qp'_{Cb}$     (1131)
Otherwise (cIdx is equal to 2), the following applies:
    qP = $Qp'_{Cr}$     (1132)
The quantization parameter qP is modified and the variables rectNonTsFlag and bdShift
are derived as follows:
- If transform_skip_flag[ xTbY ][ yTbY ][ cIdx ] is equal to 0, the following applies:
    rectNonTsFlag = ( ( ( Log2( nTbW ) + Log2( nTbH ) ) & 1 ) = = 1 )? 1:0     (1134)
    bdShift = BitDepth + rectNonTsFlag +
      ( ( Log2( nTbW ) + Log2( nTbH)) / 2 ) − 5 + pic_dep_quant_enabled_flag     (1135)
Otherwise (transform_skip_flag[ xTbY ][ yTbY ][ cIdx ] is equal to 1}, the following
applies:
    qP = Max( QpPrimeT sMin, qP )     (1136)
    rectNonTsFlag = 0     (1137)
    bdShift = 10     (1138)
...

Meanwhile, in video coding, the residual maintained in the intermediate decoding process is made to be within the dynamic range of a 16-bit signed integer. In the VVC, the input residual for the inverse ACT transform is clipped according to the inner coding bit depth as in Equation 4 below.

$$rY[x][y]=\text{Clip3}(-(1<<\text{BitDepth}),(1<<\text{BitDepth})-1,rY[x][y])$$

$$rCb[x][y]=\text{Clip3}(-(1<<\text{BitDepth}),(1<<\text{BitDepth})-1,rCb[x][y])$$

$$rCr[x][y]=\text{Clip3}(-(1<<\text{BitDepth}),(1<<\text{BitDepth})-1,rCr[x][y])$$ [Equation 4]

However, the clipping as in Equation 4 may cause a problem in the reversible ACT transform. Because the reversible ACT transform increases the bit depth of the Cg and Co components by 1, a problem may occur when clipping in the range of (−(1<<BitDepth), (1<<BitDepth)−1).

Accordingly, in one embodiment of this document, a clipping range of the ACT residual is proposed in order to solve a problem that may occur during the clipping process of the ACT residual as described above. Here, the ACT residual may refer to a residual derived by applying color space conversion to a residual of a current block (i.e., a current coding unit) when ACT is enabled.

In one embodiment, the clipping range of the ACT residual may be increased to BitDepth+1. That is, the ACT residual sample may be derived based on the clipping range in which the bit depth is increased by 1.

As an example, Table 56 below represents an example of a process of deriving a residual sample for each color component based on a clipping range in which the bit depth is increased by 1.

TABLE 56

8.7.4.6 Residual modification process for blocks using colour space conversion

[...]
ACTClipBitDepth = min(BitDepth+1, 16)
The (nTbW)×(nTbH) arrays of residual samples $r_Y$, $r_{Cb}$ and $r_{Cr}$ are modified as follows: (xxxx)
   $r_Y[ x ][ y ]$ = Clip3( −( 1 << ACTClipBitDepth), (1 << ACTClipBitDepth) − 1, $r_Y[ x ][ y ]$ )
   $t_{Cb}[ x ][ y ]$ = Clip3( −(1 << BitDepth ), (1 << ACTClipBitDepth) − 1, $r_{Cb}[ x ][ y ]$ ) (xxxx)
   $r_{Cr}[ x ][ y ]$ = Clip3(−( 1 << BitDepth ), (1 << ACTClipBitDepth) − 1, $r_{Cr}[ x ][ y ]$ ) (xxxx)

Referring to Table 56, residual samples to which ACT is applied may apply the clipping to have a value within a specific range, and in this case, the clipping range may be determined based on the bit depth. For example, the clipping range may be determined as a range between a minimum value and a maximum value for clipping, and may be determined based on a value of BitDepth+1. In an example, the clipping range may be determined based on a value (or variable) ACTClipBitDepth used to designate the clipping range, and the ACTClipBitDepth may be determined as a smaller value of (BitDepth+1) and 16. In this case, the clipping range (i.e., the minimum value and the maximum value) may be determined as (−(1<<ACTClipBitDepth), (1 ACTClipBitDepth)−1)). Clipping may be applied to the residual sample ($r_Y$, $r_{Cb}$, $r_{Cr}$) for each color component based on the determined clipping range. In addition, the ACT residual sample may be finally compensated based on the clipped residual samples ($r_Y$, $r_{Cb}$, $r_{Cr}$) for each color component.

Alternatively, in an example, the process disclosed in Table 56 above may also be represented as in Table 57 below.

TABLE 57

8.7.4.6 Residual modification process for blocks using colour space conversion

[...]
actClipRange = 1<<(BifDepth+1)−1
The (nTbW)×(nTbH) arrays of residual samples $r_Y$, $r_{Cb}$ and $r_{Cr}$ are modified as follows:
   $r_Y[ x ][ y ]$ = Clip3( −actClipRange, actClipRange, $r_Y[ x ][ y ]$ ) (xxxx)
   $r_{Cb}[ x ][ y ]$ = Clip3( −actClipRange, actClipRange, $r_{Cb}[ x ][ y ]$ ) (xxxx)
   $r_{Cr}[ x ][ y ]$ = Clip3( −actClipRange, actClipRange, $r_{Cr}[ x ][ y ]$ ) (xxxx)

Referring to Table 57, the ACT residual sample may be clipped based on a clipping range (e.g., actClipRange). That is, in Table 57, the clipping range used to derive the ACT residual sample may be represented by actClipRange derived based on the value of BitDepth+1. For example, a value (or variable) actClipRange used to designate a clipping range may be derived as 1<<(BitDepth+1)−1. In this case, the clipping range (i.e., the minimum value and the maximum value) may be determined as (−actClipRange, actClipRange). Clipping may be applied to the residual sample ($r_Y$, $r_{Cb}$, $r_{Cr}$) for each color component based on the determined clipping range. In addition, the ACT residual sample may be finally compensated based on the clipped residual samples ($r_Y$, $r_{Cb}$, $r_{Cr}$) for each color component.

Alternatively, as an example, a process of deriving a residual sample for each color component based on a clipping range in which the bit depth is increased by 1 may be represented as in Table 58 below.

TABLE 58

8.7.4.6 Residual modification process for blocks using colour space conversion

[...]
ACTClipBitDepth = BitDepth+1
Or ACTClipBitDepth may be clipped within a range. E.g. 16
   ACTClipBitDepth = min(BitDcpth+1, 16)
The (nTbW)×(nTbH) arrays of residual samples $r_Y$, $r_{Cb}$ and $r_{Cr}$ are modified as follows:
      $r_Y[ x ][ y ]$ = Clip3( −( 1 << ACTClipBitDepth), ( 1 << ACTClipBitDepth) − 1, $r_Y[ x ][ y ]$ ) (xxxx)
      $r_{Cb}[ x ][ y ]$ = Clip3( −( 1 << ACTClipBitDepth), ( 1 << ACTClipBitDepth) − 1, $r_{Cb}[ x ][ y ]$ ) (xxxx)
      $r_{Cr}[ x ][ y ]$ = Clip3(−( 1 << ACTClipBitDepth), ( 1 << ACTClipBitDepth) − 1, $r_{Cr}[ x ][ y ]$ ) (xxxx)

Referring to Table 58, residual samples to which ACT is applied may apply the clipping to have a value within a specific range, and in this case, the clipping range may be determined based on a value obtained by increasing the bit depth by 1. For example, the clipping range may be determined as a range between a minimum value and a maximum value for clipping, and may be determined based on a value of BitDepth+1. For example, the clipping range may be determined based on a value (or variable) ACTClipBitDepth used to designate the clipping range, and the ACTClipBitDepth may be derived as a value of BitDepth+1. In this case, the clipping range (i.e., the minimum value and the maximum value) may be determined as (−(1<<ACTClipBitDepth), (1<<ACTClipBitDepth)). Alternatively, according to an embodiment, the ACTClipBitDepth may be clipped within a specific range (e.g., 16), or may be a value derived based on min(BitDepth+1, 16). Clipping may be applied to the residual sample ($r_Y$, $r_{Cb}$, $r_{Cr}$) for each color component based on the clipping range determined as above. In addition, the ACT residual sample may be finally compensated based on the clipped residual samples ($r_Y$, $r_{Cb}$, $r_{Cr}$) for each color component.

Alternatively, in an example, the process disclosed in Table 58 above may also be represented as in Table 59 below.

TABLE 59

| 8.7.4.6 Residual modification process for blocks using colour space conversion |
| --- |
| [...] |
| actClipRange = 1<<(BitDepth+1) |
| The (nTbW)×(nTbH) arrays of residual samples $r_Y$, $r_{Cb}$ and $r_{Cr}$ are modified as follows: |
|     $r_Y$[ x ][ y ] = Clip3( −actClipRange, actClipRange−1, $r_Y$[ x ][ y ] )     (xxxx) |
|     $r_{Cb}$[ x ][ y ] = Clip3( −actClipRange, actClipRange−1, $r_{Cb}$[ x ][ y ] )     (xxxx) |
|     $r_{Cr}$[ x ][ y ] = Clip3( −actClipRange, actClipRange−1, $r_{Cr}$[ x ][ y ] )     (xxxx) |

Referring to Table 59, the ACT residual sample may be clipped based on a clipping range (e.g., actClipRange). That is, in Table 59, the clipping range used to derive the ACT residual sample may be represented by actClipRange derived based on the value of BitDepth+1. For example, a value (or variable) actClipRange used to designate a clipping range may be derived as 1<<(BitDepth+1). In this case, the clipping range (i.e., the minimum value and the maximum value) may be determined as (−actClipRange, actClipRange−1). Clipping may be applied to the residual sample ($r_Y$, $r_{Cb}$, $r_{Cr}$) for each color component based on the determined clipping range. In addition, the ACT residual sample may be finally compensated based on the clipped residual samples ($r_Y$, $r_{Cb}$, $r_{Cr}$) for each color component.

Additionally, according to an embodiment, the clipping range of the ACT residual may be fixed to 16 bits. This may not only ensure that the ACT residual is within the dynamic range of 16 bits, but also may ensure safety for lossless coding in which the internal bit depth is not properly set.

As an example, Table 60 below represents an example of a process of deriving a residual sample for each color component based on a fixed clipping range of 16 bits.

TABLE 60

| 8.7.4.6 Residual modification process for blocks using colour space conversion |
| --- |
| [...] |
| The (nTbW)×(nTbH) arrays of residual samples $r_Y$, $r_{Cb}$ and $r_{Cr}$ are modified as follows: |
|     $r_Y$[ x ][ y ] = Clip3( −( 1 << 16), ( 1 << 16) − 1, $r_Y$[ x ][ y ] )     (xxxx) |
|     $r_{Cb}$[ x ][ y ] = Clip3( −( 1 << 16), ( 1 << 16) − 1, $r_{Cb}$[ x ][ y ] )     (xxxx) |
|     $r_{Cr}$[ x ][ y ] = Clip3( −( 1 << 16), ( 1 << 16) − 1, $r_{Cr}$[ x ][ y ] )     (xxxx) |

Referring to Table 60, residual samples to which ACT is applied may apply the clipping to have a value within a specific range, and in this case, the clipping range may be determined based on the fixed bit depth. For example, the fixed bit depth may be set to 16 bits, which may be an internal bit depth used in a coding system. In this case, the clipping range (i.e., the range between the minimum and maximum values for clipping) may be determined as (−(1<<16), (1<<16)). Clipping may be applied to the residual sample ($r_Y$, $r_{Cb}$, $r_{Cr}$) for each color component based on the determined clipping range. In addition, the ACT residual sample may be finally compensated based on the clipped residual samples ($r_Y$, $r_{Cb}$, $r_{Cr}$) for each color component.

Alternatively, in an example, the process disclosed in Table 60 above may also be represented as in Table 61 below.

TABLE 61

8.7.4.6 Residual modification process for blocks using colour space conversion

[...]
The (nTbW)×(nTbH) arrays of residual samples $r_Y$, $r_{Cb}$ and $r_{Cr}$ are modified as follows:

| | |
|---|---|
| $r_Y[\ x\ ][\ y\ ]$ = Clip3( −65536, 65535, $r_Y[\ x\ ][\ y\ ]$ ) | (xxxx) |
| $r_{Cb}[\ x\ ][\ y\ ]$ = Clip3( −65536, 65535, $r_{Cb}[\ x\ ][\ y\ ]$ ) | (xxxx) |
| $r_{Cr}[\ x\ ][\ y\ ]$ = Clip3( −65536, 65535, $r_{Cr}[\ x\ ][\ y\ ]$ ) | (xxxx) |

Referring to Table 61, the ACT residual sample may be clipped by a clipping range determined based on a fixed bit depth. For example, the fixed bit depth may be determined as 16 bits, and in this case, the clipping range (i.e., the range between the minimum and maximum values for clipping) may be determined as (−65536, 65535). Clipping may be applied to the residual sample ($r_Y$, $r_{Cb}$, $r_{Cr}$) for each color component based on the clipping range determined as above. In addition, the ACT residual sample may be finally compensated based on the clipped residual samples ($r_Y$, $r_{Cb}$, $r_{Cr}$) for each color component.

Also, in an embodiment, the clipping range of the ACT residual may be set differently for the luma and chroma components respectively. That is, the clipping range applied to the ACT residual sample for the luma component and the ACT residual sample for the chroma component may have different dynamic ranges. For example, in the case of the ACT residual for the chroma component, a clipping range in which the bit depth is increased by 1 may be used, and in the case of the ACT residual for the luma component, an unchanged clipping range may be used.

As an example, Table 62 below represents an example of a process in which the luma component is clipped based on the clipping range in which the bit depth value is not changed, and the chroma component is clipped based on the clipping range in which the bit depth is increased by 1.

Referring to Table 62, the ACT residual sample may be clipped by applying different clipping ranges to the luma component and the chroma component, respectively. For example, in the case of an ACT residual of a luma component (e.g., $r_Y$), a clipping range may be derived based on a value of a bit depth (e.g., BitDepth), and in the case of an ACT residual (e.g., $r_{Cb}$, $r_{Cr}$) of a chroma component, the clipping range may be derived based on a value obtained by increasing the bit depth by 1 (e.g., BitDepth+1). At this time, the ACTClipBitDepthLuma variable may be used to specify the clipping range of the ACT residual (e.g., $r_Y$) of the luma component, and the ACTClipBitDepthChroma variable may be used to specify the clipping range of the ACT residual of the chroma component (e.g., $r_{Cb}$, $r_{Cr}$). That is, the clipping range used for the luma component may be determined as (−(1<<ACTClipBitDepthLuma), (1<<ACTClipBitDepth-Luma)−1), and the clipping range used for the chroma component may be determined as (−(1<<ACTClipBitDepthChroma), (1<<ACTClipBitDepthChroma)−1). Alternatively, according to an embodiment, the clipping range ACTClipBitDepthChroma used for the chroma component may also be clipped within a specific range (e.g., 16), or may also be a value derived based on min(BitDepth+1, 16). Clipping may be applied to the residual sample ($r_Y$, $r_{Cb}$, $r_{Cr}$) for each color component based on the clipping range determined as above. In addition, the ACT residual sample may be finally compensated based on the clipped residual samples ($r_Y$, $r_{Cb}$, $r_{Cr}$) for each color component.

Alternatively, in an example, the process disclosed in Table 62 above may also be represented as in Table 63 below.

TABLE 63

8.7.4.6 Residual modification process for blocks using colour space conversion

[...]
The (nTBW)×(nTbH) arrays of residual samples $r_Y$, $r_{Cb}$, and $r_{Cr}$ are modified as follows:

TABLE 62

8.7.4.6 Residual modification process for blocks using colour space conversion

[...]
ACTClipBitDepthLuma = BitDepth
ACTClipBitDepthChroma = BitDepth+1
Note that ACTClipBitDepthChroma may be clipped within a range. E.g. 16
    ACTClipBitDepthChroma = min(BitDepth+1, 16)
The (nTbW)×(nTbH) arrays of residual samples $r_Y$, $r_{Cb}$ and $r_{Cr}$ are modified as follows:

| | |
|---|---|
| $r_Y[\ x\ ][\ y\ ]$ = Clip3( −( 1 << ACTClipBitDepthLuma), ( 1 << ACTClipBitDepthLuma) − 1, $r_Y[\ x\ ][\ y\ ]$ ) | (xxxx) |
| $r_{Cb}[\ x\ ][\ y\ ]$ = Clip3( −( 1 << ACTClipBitDepthChroma ), ( 1 << ACTClipBitDepthChroma) − 1, $r_{Cb}[\ x\ ][\ y\ ]$ ) | (xxxx) |
| $r_{Cr}[\ x\ ][\ y\ ]$ = Clip3( −( 1 << ACTClipBitDepthChroma ), (1 << ACTClipBitDepthChroma) − 1, $r_{Cr}[\ x\ ][\ y\ ]$ ) | (xxxx) |

TABLE 63-continued 8.7.4.6 Residual modification process for blocks using colour space conversion $r_Y[\ x\ ][\ y\ ] = \text{Clip3}(-\text{BitDepth}\ll 1), (\text{BitDepth} \ll 1)-1,, r_Y[\ x\ ][\ y\ ])$ (xxxx)
$r_{Cb}[\ x\ ][\ y\ ] = \text{Clip3}(-((\text{BitDepth}+1)\ll 1), ((\text{BitDepth}+1) <\ < 1)-1, r_{Cb}[\ x\ ][\ y\ ])$ (xxxx)
$r_{Cr}[\ x\ ][\ y\ ] = \text{Clip3}(-((\text{BitDepth}+1)\ll 1), ((\text{BitDepth}+1) <\ < 1)-1, r_{Cr}[\ x\ ][\ y\ ])$ (xxxx)

Referring to Table 63, the ACT residual sample may be clipped by applying different clipping ranges to the luma component and the chroma component, respectively. For example, in the case of an ACT residual of a luma component (e.g., $r_Y$), a clipping range may be derived based on a value of a bit depth (e.g., BitDepth), and in the case of an ACT residual (e.g., $r_{Cb}$, $r_{Cr}$) of a chroma component, the clipping range may be derived based on a value obtained by increasing the bit depth by 1 (e.g., BitDepth+1). In this case, the clipping range used for the luma component may be determined as (−(BitDepth<<1), (BitDepth<<1)−1), and the clipping range used for the chroma component may be determined as (−((BitDepth+1)<<1), ((BitDepth+1) <<1)−1). Clipping may be applied to the residual sample ($r_Y$, $r_{Cb}$, $r_{Cr}$) for each color component based on the clipping range determined as above. In addition, the ACT residual sample may be finally compensated based on the clipped residual samples ($r_Y$, $r_{Cb}$, $r_{Cr}$) for each color component.

The following drawings were prepared to explain a specific example of the present document. Since the names or specific terms, or names of specific devices described in the drawings (e.g., names of syntax/syntax elements, etc.) are presented as examples, the technical features of the present document are not limited to the specific names used in the following drawings.

Figure 7:
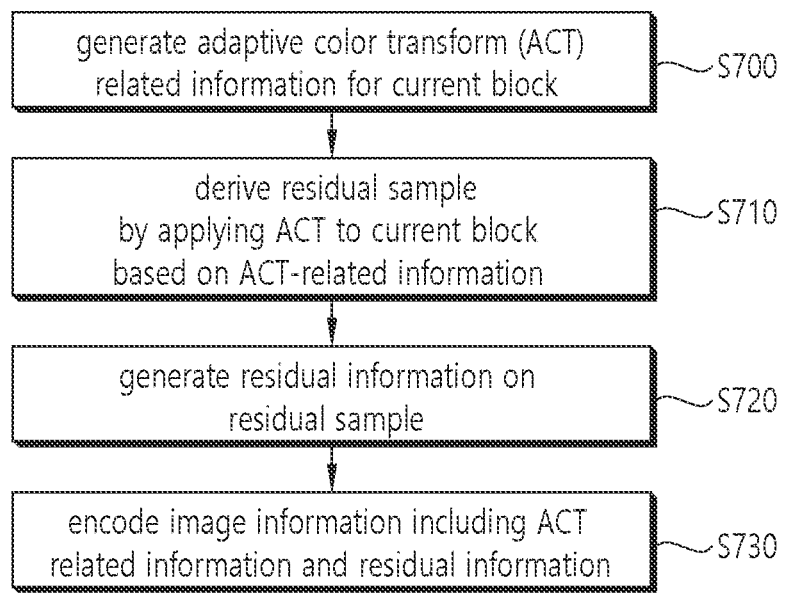
FIGS. 7 and 8 schematically illustrate a video/image encoding method and an example of related components according to embodiment(s) of the present document.
Figure 8:
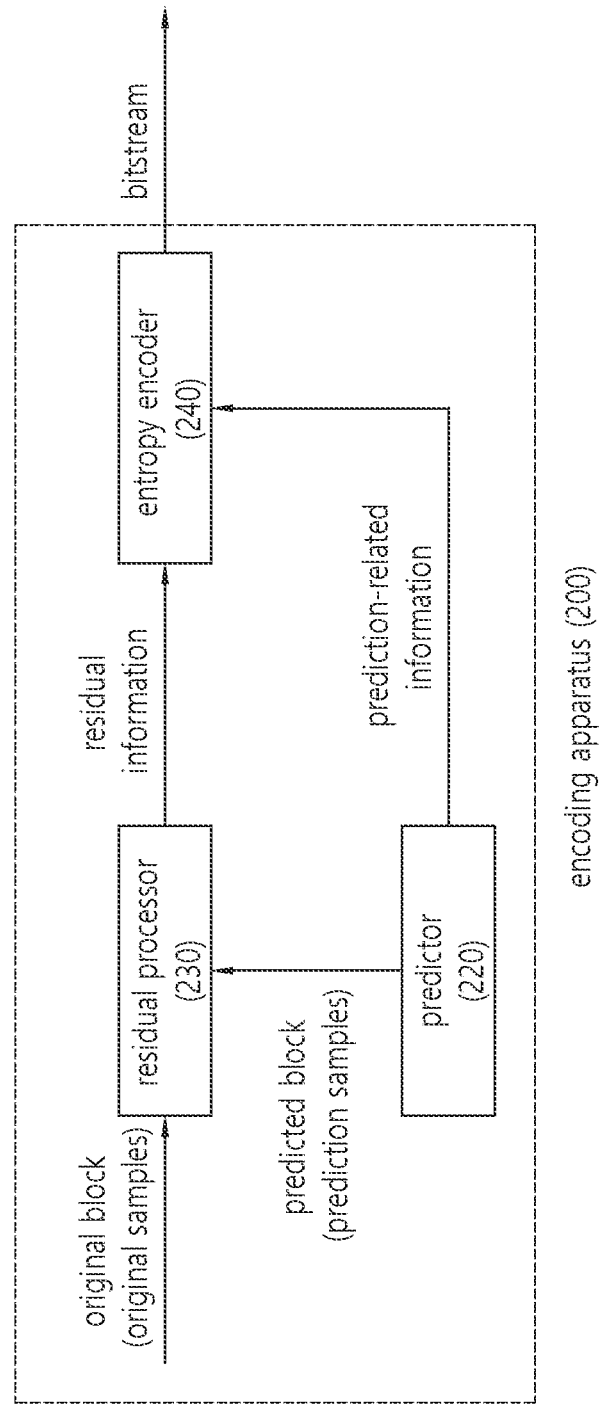

FIGS. 7 and 8 schematically represent an example of a video/image encoding method and associated components according to the embodiment(s) of this document.

The method disclosed in FIG. 7 may be performed by the encoding apparatus 200 disclosed in FIG. 2 or FIG. 8. Here, the encoding apparatus 200 disclosed in FIG. 8 is a simplified representation of the encoding apparatus 200 disclosed in FIG. 2. Specifically, steps S700 to S720 of FIG. 7 may be performed by the residual processor 230 disclosed in FIG. 2, and step S730 of FIG. 7 may be performed by the entropy encoder 240 disclosed in FIG. 2. In addition, although not shown, the process of deriving a prediction sample may be performed by the predictor 220 of the encoding apparatus 200; the process of generating a reconstructed sample and a reconstructed picture for the current block based on the residual sample and the prediction sample for the current block may be performed by the adder 250 of the encoding apparatus 200; and the process of encoding the prediction information for the current block may be performed by an entropy encoder 240 of the encoding apparatus 200. In addition, the method disclosed in FIG. 7 may be performed including the embodiments described above in this document. Accordingly, in FIG. 7, a detailed description of contents corresponding to the repetition of the above-described embodiments will be omitted or simplified.

Referring to FIG. 7, the encoding apparatus may generate adaptive color transform (ACT)-related information for the current block (S700).

The ACT-related information may include information on whether to apply ACT to the current block. For example, the information on whether to apply ACT to the current block may be the cu_act_enabled_flag syntax element described above, and may be included in the coding unit syntax and signaled. In an example, when the value of cu_act_enabled_flag is 1, it may be indicated that the ACT is applied to the current block (i.e., the current block's residual), which indicates coding in the YCGCO color space. When the value of cu_act_enabled_flag is 0, it may be indicated that the ACT is not applied to the current block (i.e., the residual of the current block), which indicates coding in the original color space. Here, the ACT refers to a method of deriving a residual using color space conversion, for example, may indicate a method of adaptively transforming a residual from one color space to the YCgCo color space as described above.

In addition, the ACT-related information may further include information on whether the ACT is enabled. For example, the information on whether the ACT is enabled may be the above-described sps_act_enabled_flag syntax element, and may be included in a sequence parameter set (SPS) and signaled. In an example, when the value of sps_act_enabled_flag is 1, it may be indicated that the ACT is enabled, and in this case, information indicating whether to apply the ACT to the current block (i.e., the residual of the current block) in the coding unit syntax may be present. When the value of sps_act_enabled_flag is 0, it may be indicated that the ACT is not enabled, and in this case, information indicating whether to apply the ACT to the current block (i.e., the residual of the current block) in the coding unit syntax may not be present.

In one embodiment, when the value of information indicating whether the ACT signaled/parsed through the SPS is enabled (e.g., sps_act_enabled_flag) is 1, information indicating whether to apply the ACT to the current block (i.e., the residual of the current block) (e.g., cu_act_enabled_flag) may be signaled/parsed through the coding unit syntax. Alternatively, when the value of information indicating whether the ACT signaled/parsed through the SPS is enabled (e.g., sps_act_enabled_flag) is 0, information indicating whether to apply the ACT to the current block (i.e., the residual of the current block) (e.g., cu_act_enabled_flag) may not be signaled/parsed through the coding unit syntax.

That is, the encoding apparatus may determine whether to apply the ACT to the current block, and may generate the ACT-related information (e.g., cu_act_enabled_flag, sps_act_enabled_flag, etc.) according to the determination.

The encoding apparatus may derive a residual sample by applying the ACT to the current block based on the ACT-related information (S710).

That is, the encoding apparatus may derive a residual sample by applying the ACT to the current block based on ACT-related information on applying the ACT to the current block. For example, when the value of information (e.g., cu_act_enabled_flag) indicating whether to apply ACT to the current block (i.e., the residual of the current block) is 1, the encoding apparatus may derive the residual sample by applying ACT to the current block.

As an embodiment, the encoding apparatus may derive a residual block (residual sample) based on a predicted block (prediction sample) derived through prediction. For example, first, the encoding apparatus may determine a prediction mode for the current block, and derive prediction samples. The encoding apparatus may determine whether to perform inter prediction or intra prediction on a current block, and may determine specific inter prediction mode or specific intra prediction mode based on RD cost. The encoding apparatus may derive prediction samples for the current block by performing prediction according to the determined prediction mode. In this case, various prediction methods disclosed in the present document, such as inter prediction or intra prediction, may be applied. Also, the encoding apparatus may generate and encode information (e.g., prediction mode information) related to prediction applied to the current block. In addition, the encoding apparatus may compare the prediction samples with original samples for the current block, and derive residual samples.

The encoding apparatus may apply the ACT to the residual sample derived as described above, based on ACT-related information (e.g., cu_act_enabled_flag). In one embodiment, the encoding apparatus may perform clipping on each of the luma residual sample for the luma component of the current block, the Cb chroma residual sample for the Cb chroma component of the current block, and the Cr chroma residual sample for the Cr chroma component of the current block, based on the clipping range. The encoding apparatus may derive a modified luma residual sample, a modified Cb chroma residual sample, and a modified Cr chroma residual sample by applying ACT based on the clipped luma residual sample, the clipped Cb chroma residual sample, and the clipped Cr chroma residual sample.

As described above, the ACT, for example, adaptively transforms a residual from one color space to a YCgCo color space by deriving a residual with color space conversion. According to an embodiment, any one of the methods of ACT color transform disclosed in Tables 41 to 54 above may be applied. Here, a detailed description of applying the ACT to the residual sample will be omitted.

Also, as an embodiment, in deriving the residual sample by applying the ACT, the encoding apparatus may determine a clipping range based on a bit depth, and may perform the clipping on the residual sample to have a value within the determined clipping range.

For example, the clipping range may have a value between a maximum value and a minimum value derived based on a value obtained by increasing the bit depth by 1. In this case, the minimum value of the clipping range may be a value derived by −(1<<(BitDepth+1)), and the maximum value of the clipping range may be a value derived by (1<<(BitDepth+1))−1. For example, as disclosed in Tables 56 to 59 above, the clipping may be performed on the residual sample ($r_Y$, $r_{Cb}$, $r_{Cr}$) of each color component based on the clipping range. In addition, a (modified) residual sample to which the ACT has been finally applied based on the clipped residual sample ($r_Y$, $r_{Cb}$, $r_{Cr}$) for each color component may be derived.

Alternatively, in an example, the clipping range may have a value between a maximum value and a minimum value derived based on a smaller value of a value obtained by increasing the bit depth by 1, and 16. For example, as disclosed in Tables 56 to 59 above, the clipping may be performed on the residual sample ($r_Y$, $r_{Cb}$, $r_{Cr}$) of each color component based on the clipping range. In addition, a (modified) residual sample to which the ACT has been finally applied based on the clipped residual sample ($r_Y$, $r_{Cb}$, $r_{Cr}$) for each color component may be derived.

Alternatively, in an example, the clipping range may be determined based on a fixed bit depth. For example, the fixed bit depth may be 16 bits. In this case, the clipping range may be between −(1<<16) and (1<<16)−1, or between −65536 and 65535. For example, as disclosed in Tables 60 to 61 above, the clipping may be performed on the residual sample ($r_Y$, $r_{Cb}$, $r_{Cr}$) of each color component based on the clipping range. In addition, a (modified) residual sample to which the ACT has been finally applied based on the clipped residual sample ($r_Y$, $r_{Cb}$, $r_{Cr}$) for each color component may be derived.

Alternatively, in an example, the clipping range may include clipping ranges for the luma component and the chroma component, and different clipping ranges may be set for the luma component and the chroma component, respectively. For example, the clipping range for the luma component may have a range between −(1<<BitDepth) and (1<<BitDepth)−1 derived based on the value of the bit depth, and the clipping range for the chroma component may have a range between −(1<<(BitDepth+1)) and (1<<(BitDepth+1))−1 derived based on a value obtained by increasing the bit depth by 1. For example, as disclosed in Tables 62 to 63 above, clipping may be performed on the residual sample ($r_Y$, $r_{Cb}$, $r_{Cr}$) of each color component based on the clipping ranges for the luma component and the chroma component. In addition, a (modified) residual sample to which the ACT has been finally applied based on the clipped residual sample ($r_Y$, $r_{Cb}$, $r_{Cr}$) for each color component may be derived.

The encoding apparatus may generate residual information on the residual sample (S720).

The residual information, which is information generated through a transform and/or quantization process with respect to a residual sample, may be information on quantized transform coefficients, and, for example, may include value information, location information, transform technique, transform kernel, quantization parameter, or the like of the quantized transform coefficients.

In an example, the encoding apparatus may derive transform coefficients through a transform process for residual samples, and may derive quantized transform coefficients by quantizing the derived transform coefficients. In this regard, the encoding apparatus may determine whether to apply the transform to the current block in consideration of coding efficiency. That is, the encoding apparatus may determine whether a transform is applied to the residual samples. For example, when no transform is applied to the residual samples, the encoding apparatus may derive the residual samples as transform coefficients. Alternatively, when transform is applied to the residual samples, the encoding apparatus may derive transform coefficients by performing transform on the residual samples. Here, the residual sample may refer to a residual sample modified by applying ACT as described above.

The encoding apparatus may encode image information (or video information) (S730).

Here, the image information may include the ACT-related information. Additionally, the image information may include residual information. Also, the image information may include information related to the prediction (e.g., prediction mode information) used to derive the prediction samples. That is, the image information may include various information derived from an encoding process, and may be encoded including such various information.

In an embodiment, the encoding apparatus may encode image information including the ACT-related information and the residual information.

Image information including various information as described above may be encoded and output in the form of a bitstream. The bitstream may be transmitted to the decoding apparatus through a network or a (digital) storage medium. Here, the network may include a broadcast network, a communication network and/or the like, and the digital storage medium may include various storage media, such as a universal serial bus (USB), secure digital (SD), a compact disk (CD), a digital video disk (DVD), Blu-ray, a hard disk drive (HDD), a solid state drive (SSD), and the like.

Figure 9:
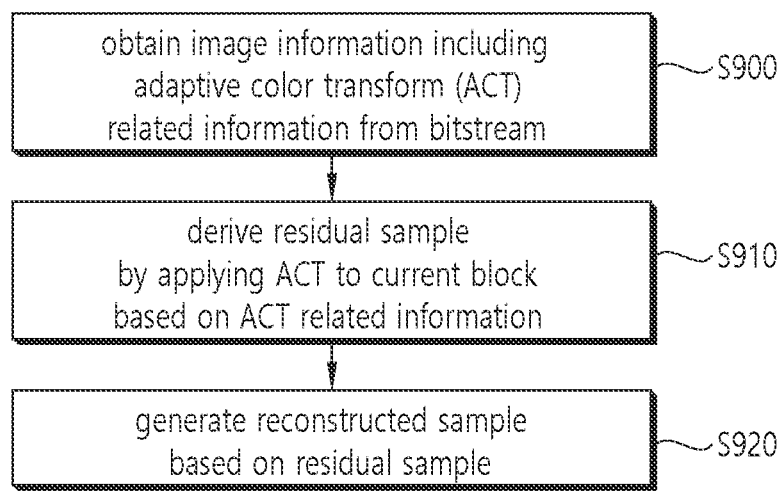
FIGS. 9 and 10 schematically illustrate a video/image decoding method and an example of related components according to embodiment(s) of the present document
Figure 10:
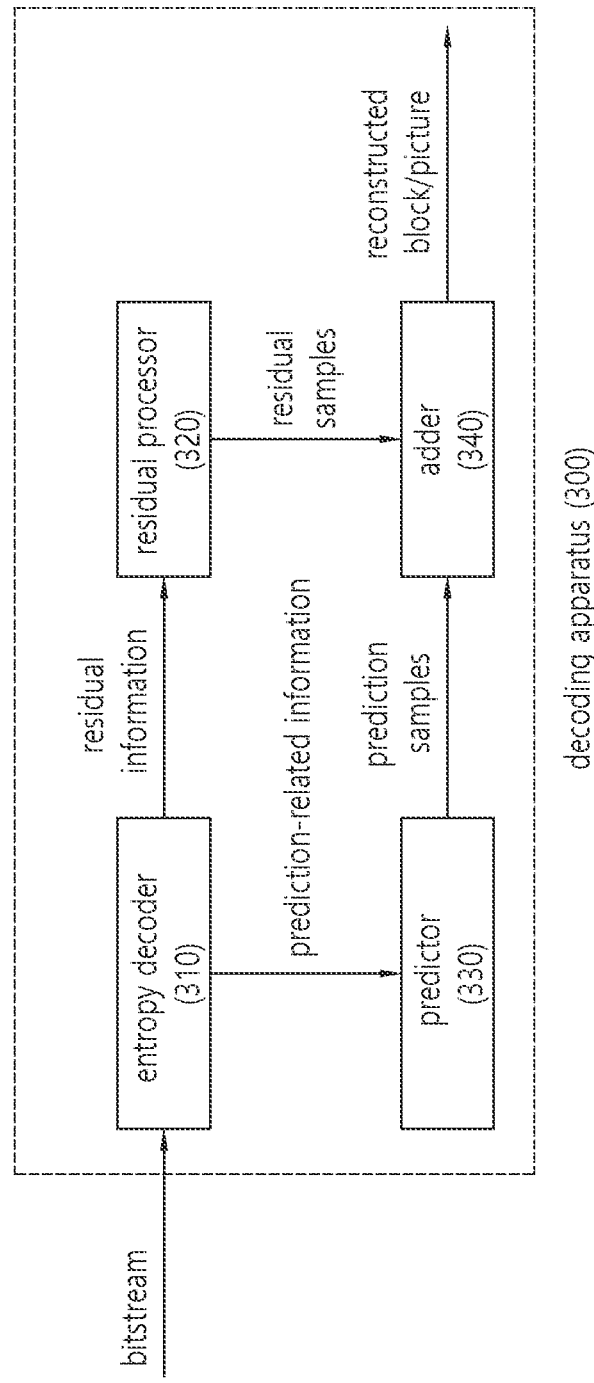

FIGS. 9 and 10 schematically represent an example of a video/image decoding method and associated components according to the embodiment(s) of this document.

The method disclosed in FIG. 9 may be performed by the decoding apparatus 300 disclosed in FIG. 3 or 10. Here, the decoding apparatus 300 disclosed in FIG. 10 is a simplified representation of the decoding apparatus 300 disclosed in FIG. 3. Specifically, step S900 of FIG. 9 may be performed by the entropy decoder 310 disclosed in FIG. 3; step S910 of FIG. 9 may be performed by the residual processor 320 disclosed in FIG. 3; and step S920 of FIG. 9 may be performed by the adder 340 disclosed in FIG. 3. In addition, although not shown, the process of receiving prediction information for the current block may be performed by the entropy decoder 310 of the decoding apparatus 300, and the process of deriving the prediction sample of the current block may be performed by the predictor 330 of the decoding apparatus 300. In addition, the method disclosed in FIG. 9 may be performed including the embodiments described above in this document. Accordingly, in FIG. 9, a detailed description of contents corresponding to the repetition of the above-described embodiments will be omitted or simplified.

Referring to FIG. 9, the decoding apparatus may receive image information (or video information) from a bitstream (S900).

For example, the decoding apparatus may parse the bitstream, and derive information (e.g., video/image information) required for image reconstruction (or picture reconstruction). In this case, the image information may include residual information, and the residual information may include value information, position information, a transform technique, transform kernel, a quantization parameter or the like of the quantized transform coefficients. Also, the image information may include prediction-related information (e.g., prediction mode information). Also, the image information may include adaptive color transform (ACT)-related information. That is, the image information may include various information required in the decoding process, and may be decoded based on a coding method such as exponential Golomb coding, CAVLC, or CABAC.

In an embodiment, the decoding apparatus may obtain image information including adaptive color transform (ACT) related information from a bitstream.

The ACT-related information may include information on whether to apply ACT to the current block. For example, the information on whether to apply ACT to the current block may be the cu_act_enabled_flag syntax element described above, and may be included in the coding unit syntax and signaled. In an example, when the value of cu_act_enabled_flag is 1, it may be indicated that the ACT is applied to the current block (i.e., the current block's residual), which indicates coding in the YCGCO color space. When the value of cu_act_enabled_flag is 0, it may be indicated that the ACT is not applied to the current block (i.e., the residual of the current block), which indicates coding in the original color space. Here, the ACT refers to a method of deriving a residual using color space conversion, for example, may indicate a method of adaptively transforming a residual from one color space to the YCgCo color space as described above.

In addition, the ACT-related information may further include information on whether the ACT is enabled. For example, the information on whether the ACT is enabled may be the above-described sps_act_enabled_flag syntax element, and may be included in a sequence parameter set (SPS) and signaled. In an example, when the value of sps_act_enabled_flag is 1, it may be indicated that the ACT is enabled, and in this case, information indicating whether to apply the ACT to the current block (i.e., the residual of the current block) in the coding unit syntax may be present. When the value of sps_act_enabled_flag is 0, it may be indicated that the ACT is not enabled, and in this case, information indicating whether to apply the ACT to the current block (i.e., the residual of the current block) in the coding unit syntax may not be present.

In one embodiment, when the value of information indicating whether the ACT signaled/parsed through the SPS is enabled (e.g., sps_act_enabled_flag) is 1, information indicating whether to apply the ACT to the current block (i.e., the residual of the current block) (e.g., cu_act_enabled_flag) may be signaled/parsed through the coding unit syntax. Alternatively, when the value of information indicating whether the ACT signaled/parsed through the SPS is enabled (e.g., sps_act_enabled_flag) is 0, information indicating whether to apply the ACT to the current block (i.e., the residual of the current block) (e.g., cu_act_enabled_flag) may not be signaled/parsed through the coding unit syntax.

That is, the decoding apparatus may obtain (parse) ACT-related information (e.g., cu_act_enabled_flag, sps_act_enabled_flag, etc.) from the bitstream.

The decoding apparatus may derive a residual sample by applying the ACT to the current block based on the ACT-related information (S910).

That is, the decoding apparatus may derive a residual sample by applying the ACT to the current block based on ACT-related information on applying the ACT to the current block. For example, when the value of information (e.g., cu_act_enabled_flag) indicating whether to apply ACT to the current block (i.e., the residual of the current block) is 1, the decoding apparatus may derive the residual sample by applying ACT to the current block.

In an embodiment, first, the decoding apparatus may obtain residual information included in image information. The residual information may include value information, position information, a transform technique, transform kernel, a quantization parameter or the like of the quantized transform coefficients, as described above. The decoding apparatus may derive quantized transform coefficients for the current block based on quantized transform coefficient information included in the residual information. The decoding apparatus may derive transform coefficients by applying a dequantization process to the quantized transform coefficients, and may derive residual samples of the current block by performing inverse transform on the transform coefficients. In this case, the decoding apparatus may obtain information indicating whether to apply the inverse transform to the current block (i.e., transform skip flag information), and may derive residual samples based on this information (i.e., transform skip flag information). For example, when the inverse transform is not applied to the transform coefficients (when the value of the transform skip flag information for the current block is 1), the decoding apparatus may derive the transform coefficients as residual samples of the current block. Alternatively, when inverse transform is applied to transform coefficients (when the value of transform skip flag information for the current block is 0), the decoding apparatus may derive residual samples of the current block by inverse transforming the transform coefficients.

The decoding apparatus may apply the ACT to the residual sample derived as described above, based on ACT-related information (e.g., cu_act_enabled_flag). In one embodiment, the decoding apparatus may perform clipping on each of the luma residual sample for the luma component of the current block, the Cb chroma residual sample for the Cb chroma component of the current block, and the Cr chroma residual sample for the Cr chroma component of the current block, based on the clipping range. The decoding apparatus may derive a modified luma residual sample, a modified Cb chroma residual sample, and a modified Cr chroma residual sample by applying ACT based on the clipped luma residual sample, the clipped Cb chroma residual sample, and the clipped Cr chroma residual sample.

As described above, the ACT, for example, adaptively transforms a residual from one color space to a YCgCo color space by deriving a residual with color space conversion. According to an embodiment, any one of the methods of ACT color transform disclosed in Tables 41 to 54 above may be applied. Here, a detailed description of applying the ACT to the residual sample will be omitted.

Also, as an embodiment, in deriving the residual sample by applying the ACT, the decoding apparatus may determine a clipping range based on a bit depth, and may perform the clipping on the residual sample to have a value within the determined clipping range.

For example, the clipping range may have a value between a maximum value and a minimum value derived based on a value obtained by increasing the bit depth by 1. In this case, the minimum value of the clipping range may be a value derived by $-(1<<(BitDepth+1))$, and the maximum value of the clipping range may be a value derived by $(1<<(BitDepth+1))-1$. For example, as disclosed in Tables 56 to 59 above, the clipping may be performed on the residual sample $(r_Y, r_{Cb}, r_{Cr})$ of each color component based on the clipping range. In addition, a (modified) residual sample to which the ACT has been finally applied based on the clipped residual sample $(r_Y, r_{Cb}, r_{Cr})$ for each color component may be derived.

Alternatively, in an example, the clipping range may have a value between a maximum value and a minimum value derived based on a smaller value of a value obtained by increasing the bit depth by 1, and 16. For example, as disclosed in Tables 56 to 59 above, the clipping may be performed on the residual sample $(r_Y, r_{Cb}, r_{Cr})$ of each color component based on the clipping range. In addition, a (modified) residual sample to which the ACT has been finally applied based on the clipped residual sample $(r_Y, r_{Cb}, r_{Cr})$ for each color component may be derived.

Alternatively, in an example, the clipping range may be determined based on a fixed bit depth. For example, the fixed bit depth may be 16 bits. In this case, the clipping range may be between $-(1<<16)$ and $(1<<16)-1$, or between $-65536$ and $65535$. For example, as disclosed in Tables 60 to 61 above, the clipping may be performed on the residual sample $(r_Y, r_{Cb}, r_{Cr})$ of each color component based on the clipping range. In addition, a (modified) residual sample to which the ACT has been finally applied based on the clipped residual sample $(r_Y, r_{Cb}, r_{Cr})$ for each color component may be derived.

Alternatively, in an example, the clipping range may include clipping ranges for the luma component and the chroma component, and different clipping ranges may be set for the luma component and the chroma component, respectively. For example, the clipping range for the luma component may have a range between $-(1<<BitDepth)$ and $(1<<BitDepth)-1$ derived based on the value of the bit depth, and the clipping range for the chroma component may have a range between $-(1<<(BitDepth+1))$ and $(1<<(BitDepth+1))-1$ derived based on a value obtained by increasing the bit depth by 1. For example, as disclosed in Tables 62 to 63 above, clipping may be performed on the residual sample $(r_Y, r_{Cb}, r_{Cr})$ of each color component based on the clipping ranges for the luma component and the chroma component. In addition, a (modified) residual sample to which the ACT has been finally applied based on the clipped residual sample $(r_Y, r_{Cb}, r_{Cr})$ for each color component may be derived.

The decoding apparatus may generate a reconstructed sample based on the residual sample (S920).

Here, the residual sample may refer to a residual sample modified by applying ACT as described above.

In an embodiment, the decoding apparatus may determine whether to perform inter prediction or intra prediction on the current block based on prediction information (e.g., prediction mode information) included in image information, and according to the determination, prediction may be performed to derive prediction samples for the current block. And, the decoding apparatus may generate reconstructed samples based on the prediction samples and the residual samples. In this case, depending on prediction mode, the decoding apparatus may use prediction samples directly as reconstructed samples, or may generate reconstructed samples by adding residual samples to prediction samples. Additionally, it may derive a reconstructed block or a reconstructed picture based on the reconstructed samples. Thereafter, as described above, the decoding apparatus may apply an in-loop filtering process such as deblocking filtering and/or an SAO process to the reconstructed picture in order to improve subjective/objective image quality, as needed.

Although methods have been described on the basis of a flowchart in which steps or blocks are listed in sequence in the above-described embodiments, the steps of the present document are not limited to a certain order, and a certain step may be performed in a different step or in a different order or concurrently with respect to that described above. Further, it will be understood by those ordinary skilled in the art that the steps of the flowcharts are not exclusive, and another step may be included therein or one or more steps in the flowchart may be deleted without exerting an influence on the scope of the present document.

The aforementioned method according to the present disclosure may be in the form of software, and the encoding apparatus and/or decoding apparatus according to the present document may be included in a device for performing image processing, for example, a TV, a computer, a smart phone, a set-top box, a display device, or the like.

When the embodiments of the present document are implemented by software, the aforementioned method may be implemented by a module (process or function) which performs the aforementioned function. The module may be stored in a memory and executed by a processor. The memory may be installed inside or outside the processor and may be connected to the processor via various well-known means. The processor may include Application-Specific Integrated Circuit (ASIC), other chipsets, a logical circuit, and/or a data processing device. The memory may include a Read-Only Memory (ROM), a Random Access Memory (RAM), a flash memory, a memory card, a storage medium, and/or other storage device. In other words, the embodiments according to the present document may be implemented and executed on a processor, a micro-processor, a controller, or a chip. For example, functional units illustrated in the respective figures may be implemented and executed on a computer, a processor, a microprocessor, a controller, or a chip. In this case, information on implementation (for example, information on instructions) or algorithms may be stored in a digital storage medium.

Further, the decoding apparatus and the encoding apparatus to which the present document is applied may be included in a multimedia broadcasting transceiver, a mobile communication terminal, a home cinema video device, a digital cinema video device, a surveillance camera, a video chat device, a real time communication device such as video communication, a mobile streaming device, a storage medium, a camcorder, a video on demand (VoD) service providing device, an over the top (OTT) video device, an Internet streaming service providing device, a three-dimensional (3D) video device, a virtual reality (VR) device, an augmented reality (AR: argumente reality) device, a video telephony video device, a transportation means terminal (e.g., a vehicle (including an autonomous vehicle) terminal, an aircraft terminal, a ship terminal, etc.) and a medical video device, and may be used to process a video signal or a data signal. For example, the over the top (OTT) video device may include a game console, a Blu-ray player, an Internet access TV, a home theater system, a smart phone, a tablet PC, a digital video recorder (DVR) and the like.

In addition, the processing method to which the embodiment(s) of the present document is applied may be produced in the form of a program executed by a computer and may be stored in a computer-readable recording medium. Multimedia data having a data structure according to the embodiment(s) of the present document may also be stored in the computer-readable recording medium. The computer readable recording medium includes all kinds of storage devices and distributed storage devices in which computer readable data is stored. The computer-readable recording medium may include, for example, a Bluray disc (BD), a universal serial bus (USB), a ROM, a PROM, an EPROM, an EEPROM, a RAM, a CD-ROM, a magnetic tape, a floppy disk, and an optical data storage device. The computer-readable recording medium also includes media embodied in the form of a carrier wave (for example, transmission over the Internet). In addition, a bitstream generated by the encoding method may be stored in the computer-readable recording medium or transmitted through a wired or wireless communication network.

In addition, the embodiment(s) of the present document may be embodied as a computer program product based on a program code, and the program code may be executed on a computer according to the embodiment(s) of the present document. The program code may be stored on a computer-readable carrier.

Figure 11:
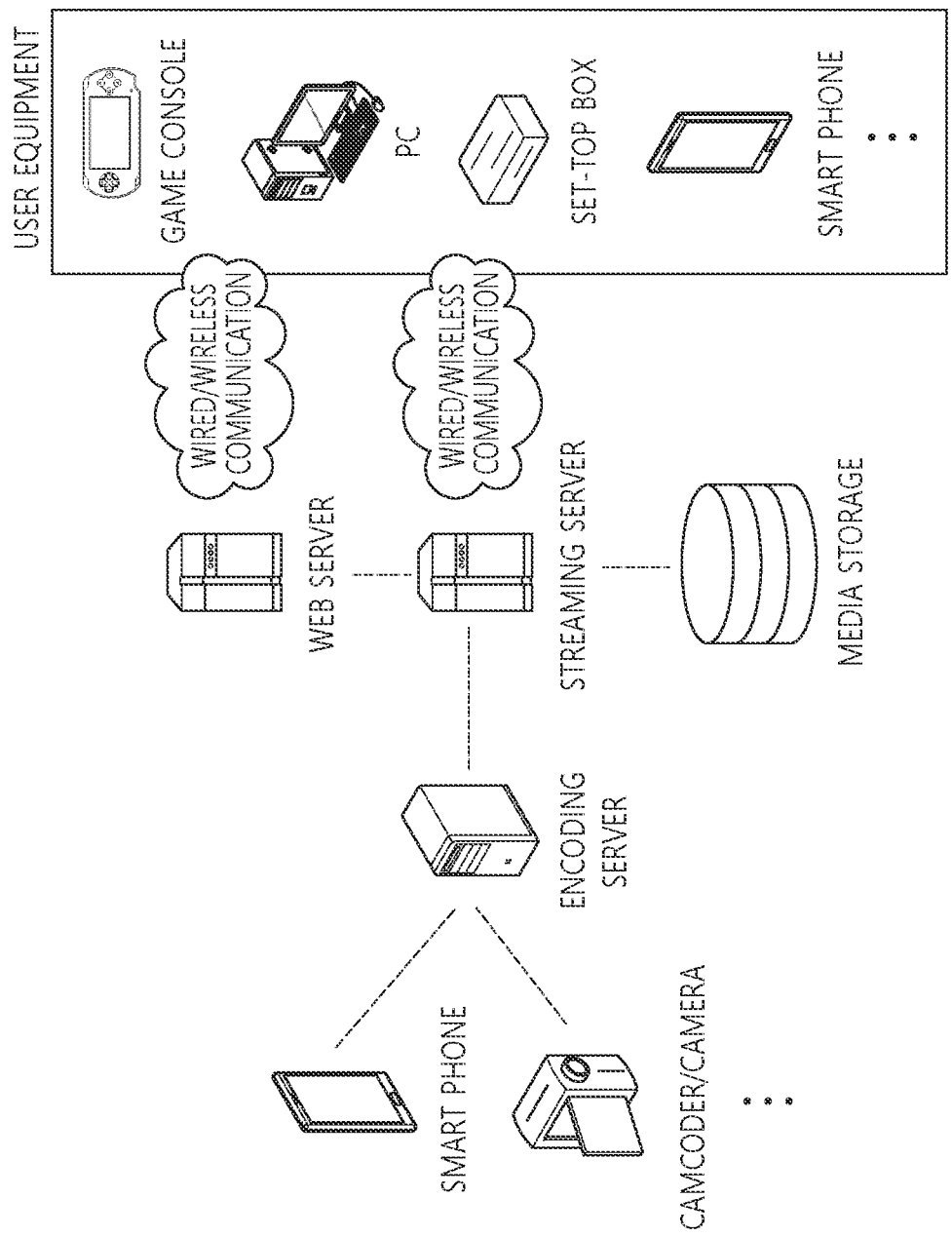
FIG. 11 illustrates an example of a content streaming system to which embodiments disclosed in the present document are applicable.

FIG. 11 represents an example of a contents streaming system to which the embodiment of the present document may be applied.

Referring to FIG. 11, the content streaming system to which the embodiments of the present document is applied may generally include an encoding server, a streaming.

The encoding server functions to compress to digital data the contents input from the multimedia input devices, such as the smart phone, the camera, the camcorder and the like, to generate a bitstream, and to transmit it to the streaming server. As another example, in a case where the multimedia input device, such as, the smart phone, the camera, the camcorder or the like, directly generates a bitstream, the encoding server may be omitted.

The bitstream may be generated by an encoding method or a bitstream generation method to which the embodiments of the present document is applied. And the streaming server may temporarily store the bitstream in a process of transmitting or receiving the bitstream.

The streaming server transmits multimedia data to the user equipment on the basis of a user's request through the web server, which functions as an instrument that informs a user of what service there is. When the user requests a service which the user wants, the web server transfers the request to the streaming server, and the streaming server transmits multimedia data to the user. In this regard, the contents streaming system may include a separate control server, and in this case, the control server functions to control commands/responses between respective equipment in the content streaming system.

The streaming server may receive contents from the media storage and/or the encoding server. For example, in a case the contents are received from the encoding server, the contents may be received in real time. In this case, the streaming server may store the bitstream for a predetermined period of time to provide the streaming service smoothly.

For example, the user equipment may include a mobile phone, a smart phone, a laptop computer, a digital broadcasting terminal, a personal digital assistant (PDA), a portable multimedia player (PMP), a navigation, a slate PC, a tablet PC, an ultrabook, a wearable device (e.g., a watch-type terminal (smart watch), a glass-type terminal (smart glass), a head mounted display (HMD)), a digital TV, a desktop computer, a digital signage or the like.

Each of servers in the contents streaming system may be operated as a distributed server, and in this case, data received by each server may be processed in distributed manner.

Claims in the present document can be combined in a various way. For example, technical features in method claims of the present document can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. An image decoding method performed by a decoding apparatus, the method comprising:
obtaining image information including adaptive color transform (ACT)-related information from a bitstream;
deriving a residual sample by applying ACT for a current block based on the ACT-related information; and
generating a reconstructed sample based on the residual sample,
wherein the ACT-related information includes information on whether to apply the ACT to the current block,
wherein based on the ACT-related information on applying the ACT to the current block, the residual sample is derived by clipping based on a clipping range,
wherein the clipping range is determined based on a bit depth (BitDepth),
wherein the clipping range has a value between a maximum value and a minimum value derived based on a value obtained by increasing the bit depth by 1, and
wherein the maximum value of the clipping range is equal to (1<<(BitDepth+1))−1.

2. An image encoding method performed by an encoding apparatus, the method comprising:
  generating adaptive color transform (ACT)-related information for a current block;
  deriving a residual sample by applying ACT to the current block based on the ACT-related information;
  generating residual information on the residual sample; and
  encoding image information including the ACT-related information and the residual information,
  wherein the ACT-related information includes information on whether to apply the ACT to the current block,
  wherein based on the ACT-related information on applying the ACT to the current block, the residual sample is derived by clipping based on a clipping range,
  wherein the clipping range is determined based on a bit depth (BitDepth),
  wherein the clipping range has a value between a maximum value and a minimum value derived based on a value obtained by increasing the bit depth by 1, and
  wherein the maximum value of the clipping range is equal to (1<<(BitDepth+1))−1.

3. A non-transitory computer-readable storage medium storing a bitstream generated by the image encoding method of claim 2.

4. A transmission method of data for an image, the transmission method comprising:
  obtaining a bitstream for the image, wherein the bitstream is generated based on generating adaptive color transform (ACT)-related information for a current block, deriving a residual sample by applying ACT to the current block based on the ACT-related information, generating residual information on the residual sample, and encoding image information including the ACT-related information and the residual information; and
  transmitting the data comprising the bitstream,
  wherein the ACT-related information includes information on whether to apply the ACT to the current block,
  wherein based on the ACT-related information on applying the ACT to the current block, the residual sample is derived by clipping based on a clipping range,
  wherein the clipping range is determined based on a bit depth (BitDepth),
  wherein the clipping range has a value between a maximum value and a minimum value derived based on a value obtained by increasing the bit depth by 1, and
  wherein the maximum value of the clipping range is equal to (1<<(BitDepth+1))−1.

* * * * *